US009577496B2

(12) United States Patent
Kato et al.

(10) Patent No.: US 9,577,496 B2
(45) Date of Patent: Feb. 21, 2017

(54) ROTOR AND BRUSHLESS MOTOR WITH ROTATION POSITION DETECTION

(71) Applicant: ASMO CO., LTD., Shizuoka-ken (JP)

(72) Inventors: Shigemasa Kato, Toyohashi (JP); Yoji Yamada, Hamamatsu (JP); Koji Mikami, Kosai (JP); Seiya Yokoyama, Toyohashi (JP)

(73) Assignee: ASMO CO., LTD., Shizuoka-ken (JP)

( * ) Notice: Subject to any disclaimer, the term of this patent is extended or adjusted under 35 U.S.C. 154(b) by 454 days.

(21) Appl. No.: 14/075,942

(22) Filed: Nov. 8, 2013

(65) Prior Publication Data
US 2014/0139079 A1    May 22, 2014

(30) Foreign Application Priority Data

Nov. 13, 2012 (JP) .................. 2012-249191
Nov. 28, 2012 (JP) .................. 2012-259684
(Continued)

(51) Int. Cl.
*H02K 11/00* (2016.01)
*H02K 21/12* (2006.01)
(Continued)

(52) U.S. Cl.
CPC ........... *H02K 11/0021* (2013.01); *H02K 1/272* (2013.01); *H02K 1/2706* (2013.01);
(Continued)

(58) Field of Classification Search
CPC .................. H02K 1/27; H02K 1/30
(Continued)

(56) References Cited

U.S. PATENT DOCUMENTS 2,651,733 A    9/1953  Stark
3,553,510 A    1/1971  Howey
(Continued)

FOREIGN PATENT DOCUMENTS

JP    S40-2927 U    1/1965
JP    S 54-26615 U    7/1977
(Continued)

OTHER PUBLICATIONS

Japanese Office Action of JP 2012-249191 dated Mar. 7, 2016 with its English Translation.
(Continued)

*Primary Examiner* — Jose Gonzalez Quinones
(74) *Attorney, Agent, or Firm* — Christensen Fonder P.A.

(57) ABSTRACT

A rotor includes a first rotor core, a second rotor core, a field magnet, and a detected portion. The first rotor core includes a first core base and a plurality of first claw-shaped magnetic pole portions. The second rotor core includes a second core base and a plurality of second claw-shaped magnetic pole portions. The first and second core bases face to each other, and the first and second claw-shaped magnetic pole portions are alternately arranged in the circumferential direction. The field magnet is located between the first and second core bases in the axial direction. The field magnet has the first claw-shaped magnetic pole portion function as a first magnetic pole and has the second claw-shaped magnetic pole portion function as a second magnetic pole. A detected portion, which generates a magnetic flux, is arranged at an outer axial end surface of the first rotor core.

19 Claims, 36 Drawing Sheets

(30) Foreign Application Priority Data

| Jan. 24, 2013 | (JP) | 2013-011388 |
| Jan. 29, 2013 | (JP) | 2013-014651 |
| Feb. 12, 2013 | (JP) | 2013-024712 |
| Mar. 21, 2013 | (JP) | 2013-058146 |
| Mar. 26, 2013 | (JP) | 2013-064340 |

(51) Int. Cl.

| H02K 21/14 | (2006.01) |
| H02K 21/16 | (2006.01) |
| H02K 29/08 | (2006.01) |
| H02K 1/27 | (2006.01) |

(52) U.S. Cl.
CPC ........... *H02K 1/2713* (2013.01); *H02K 21/16* (2013.01); *H02K 29/08* (2013.01)

(58) Field of Classification Search
USPC ............... 310/68 B, 156.08, 310/156.66, 310/156.71–156.73, 156.05, 156.06, 310/156.07
See application file for complete search history.

(56) References Cited

U.S. PATENT DOCUMENTS

| 4,388,545 | A | | 6/1983 | Honsinger et al. |
| 4,882,515 | A | | 11/1989 | Radomski |
| 5,148,070 | A | | 9/1992 | Frye et al. |
| 5,955,807 | A | * | 9/1999 | Kajiura ............... H02K 21/044 310/156.66 |
| 6,013,967 | A | | 1/2000 | Ragaly et al. |
| 6,157,111 | A | | 12/2000 | Asao |
| 6,337,529 | B1 | | 1/2002 | Higashino et al. |
| 6,396,177 | B1 | | 5/2002 | Shin et al. |
| 2001/0002095 | A1 | | 5/2001 | Sakamoto |
| 2006/0055270 | A1 | | 3/2006 | Petersen |
| 2007/0170809 | A1 | | 7/2007 | Itoh et al. |
| 2008/0053407 | A1 | | 3/2008 | Maier et al. |
| 2009/0184599 | A1 | | 7/2009 | Kanazawa et al. |
| 2009/0230803 | A1 | | 9/2009 | Nakayama et al. |
| 2010/0084215 | A1 | * | 4/2010 | Sakatani ............... G01L 3/104 180/444 |
| 2012/0112585 | A1 | | 5/2012 | Kajiura et al. |
| 2012/0187794 | A1 | | 7/2012 | Inoue et al. |
| 2013/0057102 | A1 | | 3/2013 | Yamada et al. |
| 2013/0106208 | A1 | * | 5/2013 | Yamada ............... H02K 1/2706 310/43 |

FOREIGN PATENT DOCUMENTS

| JP | S53-135512 U | 10/1978 |
| JP | H 1-101166 U | 7/1989 |
| JP | H03-117357 U | 12/1991 |
| JP | H04-325863 A | 11/1992 |
| JP | H3-39355 U | 4/1993 |
| JP | 5-43749 U | 6/1993 |
| JP | H05-168278 A | 7/1993 |
| JP | H06-22481 A | 1/1994 |
| JP | H06-070526 A | 3/1994 |
| JP | H06-133478 A | 5/1994 |
| JP | H06-245461 A | 9/1994 |
| JP | H11-150902 A | 6/1999 |
| JP | H11206052 A | 7/1999 |
| JP | H11-275831 A | 10/1999 |
| JP | 2000-209800 A | 7/2000 |
| JP | 2001-211619 A | 8/2001 |
| JP | 2001-218403 A | 8/2001 |
| JP | 2001-314071 A | 11/2001 |
| JP | 2002-051525 A | 2/2002 |
| JP | 2002-136091 A | 5/2002 |
| JP | 2002-209370 A | 7/2002 |
| JP | 2002-247817 A | 8/2002 |
| JP | 2003-204660 A | 7/2003 |
| JP | 2008045556 A | 2/2008 |
| JP | 2008-109773 A | 5/2008 |
| JP | 2008-312402 A | 12/2008 |
| JP | 2009-219309 A | 9/2009 |
| JP | 2009-261056 A | 11/2009 |
| JP | 2009-261154 A | 11/2009 |
| JP | 4468033 B2 | 3/2010 |
| JP | 2010-136588 A | 6/2010 |
| JP | 2010-199622 A | 9/2010 |
| JP | 2012-115085 A | 6/2012 |
| JP | 2013-005627 A | 1/2013 |
| WO | 2011/040247 A1 | 7/2011 |

OTHER PUBLICATIONS

The Office Action of U.S. Appl. No. 14/075,958 dated May 2, 2016.
The Japanese Office Action of JP 2013-011217 dated May 24, 2016 along with its English Translation.
The Japanese Office Action of JP 2013-011388 dated May 10, 2016 along with its English Translation.
The Japanese Office Action of JP 2013-024712 dated May 10, 2016 along with its English Translation.
The Japanese Office Action of JP 2013-064340 dated Jun. 28, 2016 along with its English Translation.
Japanese Office Action of JP 2013-064339 dated Aug. 2, 2016 along with its English Translation.
The Japanese Office Action of JP 2013-024711, dated Jul. 12, 2016.
The Japanese Office Action of JP 2013-157994, dated Jul. 12, 2016 along with its English Translation.

* cited by examiner

ROTOR AND BRUSHLESS MOTOR WITH ROTATION POSITION DETECTION

BACKGROUND OF THE INVENTION

The present disclosure relates to a rotor and a brushless motor.

A rotor having a so-called Lundell-type structure using a permanent magnet field is one type of a rotor for a brushless motor (for example, refer to Japanese Laid-Open Patent Publication No. 2012-115085 and Japanese Laid-Open Utility Model Publication No. 5-43749). Such a rotor includes two rotor cores that are combined with each other. Each rotor core includes a plurality of claw-shaped magnetic pole portions arranged in the circumferential direction. A field magnet is arranged between the rotor cores and magnetized in the axial direction. The field magnet functions claw-shaped magnetic pole portions alternately as different magnetic poles.

In the brushless motor, the rotation position (angle) of the rotor is detected and drive current is supplied to the windings of a stator in accordance with the rotation position. This generates a rotating field, and the rotating field rotates and drives the rotor.

In a structure for detecting the rotation position of a rotor, for example, a sensor magnet may be arranged on a rotor core, and a magnetic sensor may be arranged on a stator side to detect the magnetic field of the sensor magnet.

In such a brushless motor, it is desirable that the magnetic sensor accurately detect the rotation position (angle) of the rotor.

SUMMARY OF THE INVENTION

It is an object of the present disclosure to provide a rotor and a brushless motor capable of detecting the rotation position (angle) with high accuracy.

To achieve the above object, a rotor according to one aspect of the present disclosure includes a first rotor core, a second rotor core, a field magnet, and a detected portion. The first rotor core includes a substantially disk-shaped first core base and a plurality of first claw-shaped magnetic pole portions arranged in a circumferential portion of the first core base at equal intervals. Each of the first claw-shaped magnetic pole portions project radially outward and extend in an axial direction. The second rotor core includes a substantially disk-shaped second core base and a plurality of second claw-shaped magnetic pole portions arranged in a circumferential portion of the second core base at equal intervals. Each of the second claw-shaped magnetic pole portions project radially outward and extend in the axial direction, the first and second core bases face to each other. The first and second claw-shaped magnetic pole portions are alternately arranged in a circumferential direction. The field magnet is arranged between the first and second core bases in the axial direction. The field magnet is magnetized in the axial direction so that the first claw-shaped magnetic pole portions function as first magnetic poles and the second claw-shaped magnetic pole portions function as second magnetic poles. The detected portion generates magnetic flux for detecting rotation positions of the first rotor core and the second rotor core. Each of the first rotor core and the second rotor core includes an inner axial end surface, which faces the field magnet in the axial direction, and an outer axial end surface, which is located at an opposite side of the inner axial end surface. The detected portion is arranged at the outer axial end surface of the first rotor core.

BRIEF DESCRIPTION OF THE DRAWINGS

The invention, together with objects and advantages thereof, may best be understood by reference to the following description of the presently preferred embodiments together with the accompanying drawings in which:

FIG. 13(a) is an electric angle-magnetic flux density characteristic diagram for only the sensor magnet, FIG. 13(b) is an electric angle-magnetic flux density characteristic diagram for the entire rotor, and FIG. 13(c) is an electric angle-detection signal characteristic diagram;

FIG. 19(a) is an electric angle-magnetic flux density characteristic diagram for only the sensor magnet, FIG. 19(b) is an electric angle-magnetic flux density characteristic diagram for the entire rotor, and FIG. 19(c) is an electric angle-detection signal characteristic diagram;

DETAILED DESCRIPTION OF THE PREFERRED EMBODIMENTS

A first embodiment of a brushless motor will now be described with reference to FIGS. 1 to 4.

Figure 1:
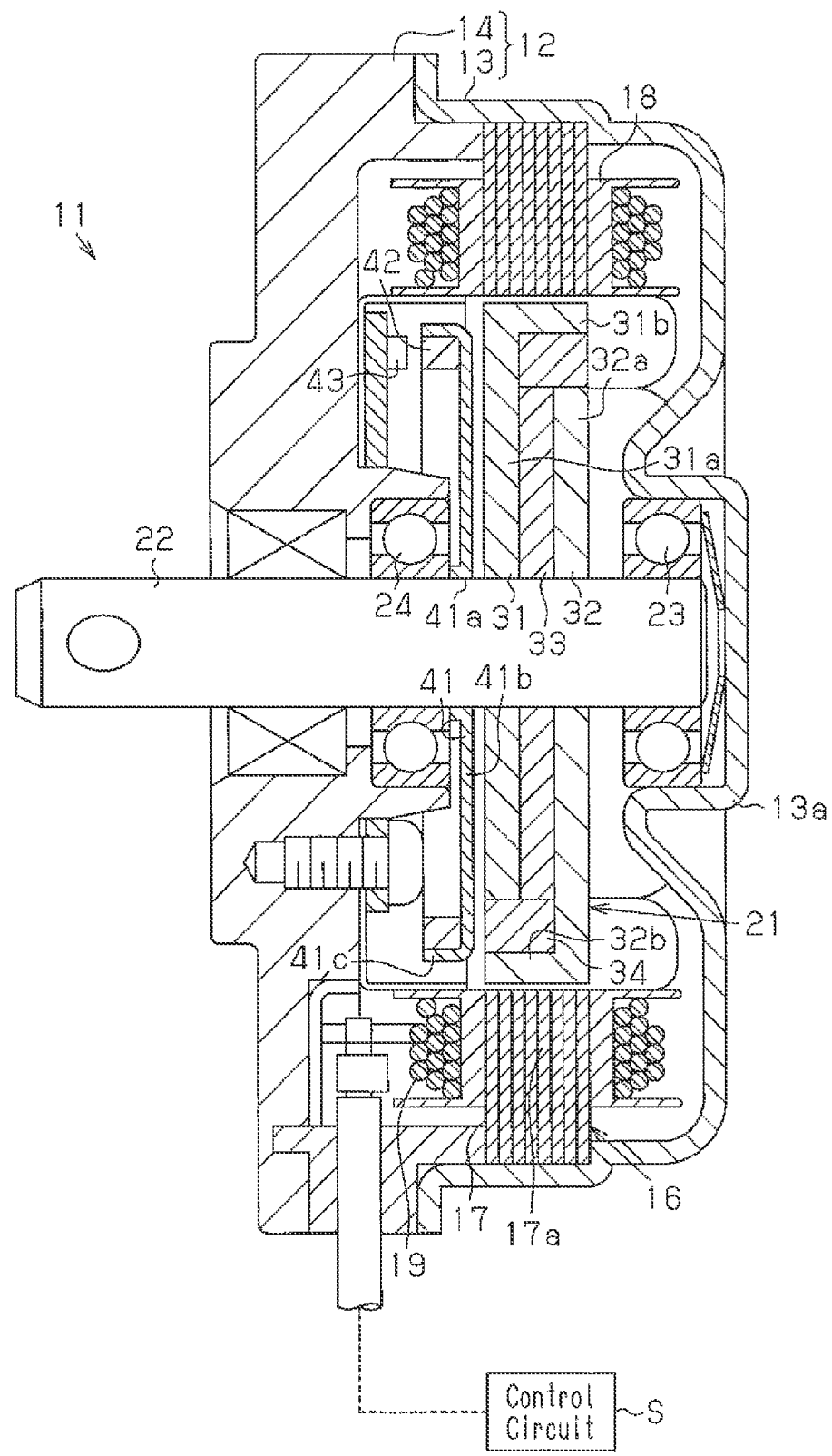
FIG. 1 is a cross-sectional view of a brushless motor according to a first embodiment of the present disclosure.

As shown in FIG. 1, a motor case 12 of a brushless motor 11 includes a cylindrical housing 13, which includes a closed end, and a front end plate 14, which closes a front open side (left side in FIG. 1) of the cylindrical housing 13.

As shown in FIG. 1, a stator 16 is fixed to an inner circumferential surface of the cylindrical housing 13. The stator 16 includes an armature core 17 having a plurality of (twelve in the present embodiment) teeth 17a, which serves as concentrated winding teeth extending radially inward, and windings 19, which are wound around the teeth 17a of the armature core 17 with an insulator 18 arranged in between. When drive current is supplied from an external control circuit S to the windings 19, the stator 16 generates a rotating field.

As shown in FIG. 1, a rotor 21 of the brushless motor 11 includes a rotation shaft 22, and the rotor 21 is located in the stator 16. The rotation shaft 22 is a non-magnetic metal shaft. The rotation shaft 22 is supported to be rotatable by bearings 23 and 24, which are supported by a bottom portion 13a of the cylindrical housing 13 and the front end plate 14.

Figure 2:
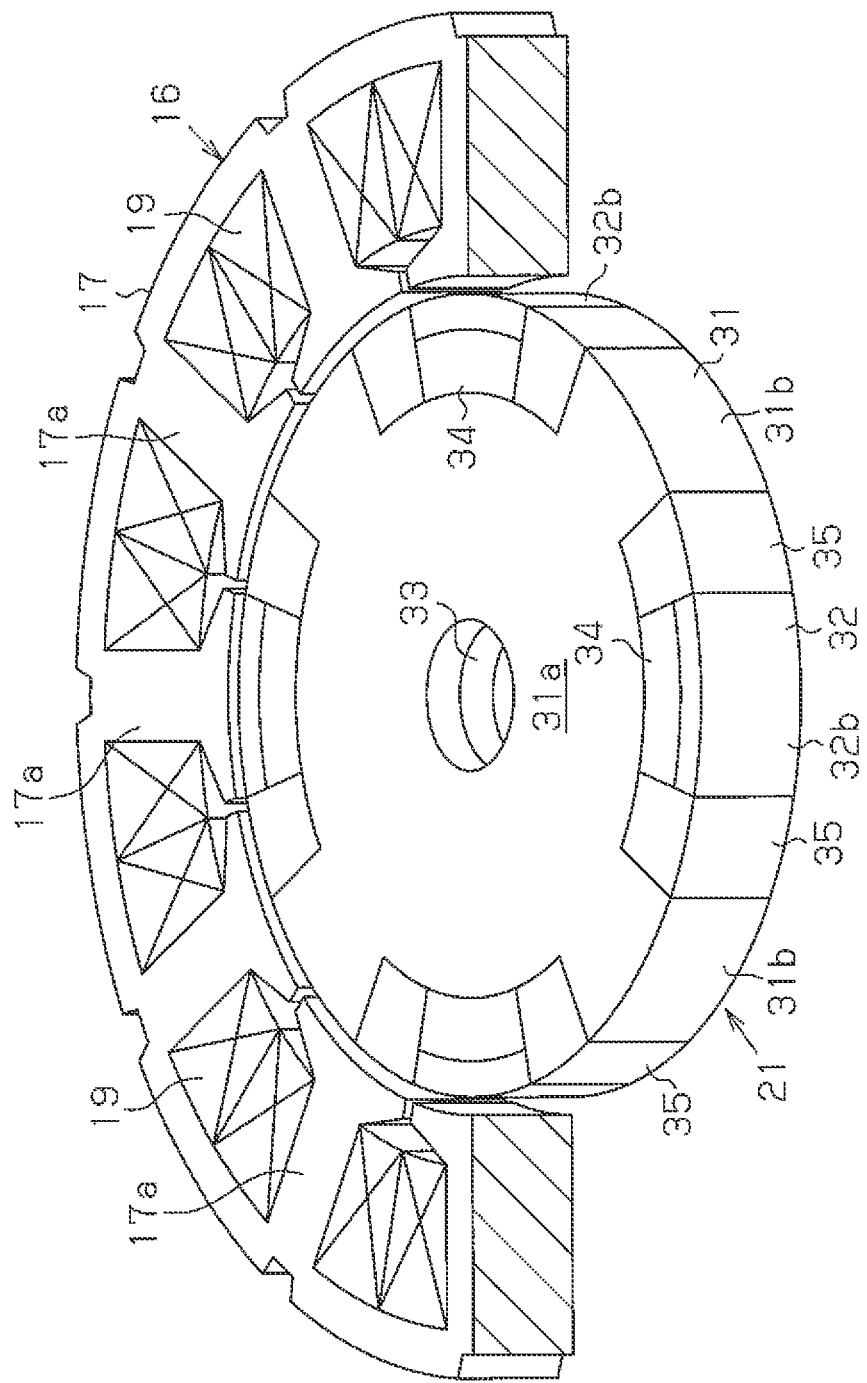
FIG. 2 is a partially cross-sectional perspective view of the brushless motor shown in FIG. 1.

As shown in FIGS. 1 and 2, the rotor 21 includes first and second rotor cores 31 and 32, which are fitted to the rotation shaft 22, and an annular magnet 33, which serves as a field magnet.

The first rotor core 31 includes a substantially disk-shaped first core base 31a and a plurality of (four in the present embodiment) first claw-shaped magnetic pole portions 31b. The first claw-shaped magnetic pole portions 31b are arranged on a circumferential portion of the first core base 31a and arranged at equal intervals. Each of the first claw-shaped magnetic pole portions 31b projects radially outward and extends in the axial direction.

The second rotor core 32 includes a substantially disk-shaped second core base 32a having the same shape as that of the first rotor core 31 and a plurality of second claw-shaped magnetic pole portions 32b. The second claw-shaped magnetic pole portions 32b are arranged on a circumferential portion of the second core base 32a at equal intervals. Each of the second claw-shaped magnetic pole portions 32b projects radially outward and extends in the axial direction. The second rotor core 32 is coupled to the first rotor core 31 so that the second claw-shaped magnetic pole portions 32b are located between adjacent ones of the first claw-shaped magnetic pole portions 31b in the circumferential direction. The annular magnet 33 is arranged between (sandwiched by) the first core base 31a and the second core base 32a in the axial direction. In the present embodiment, the first and second core bases 31a and 32a are fixed to the annular magnet 33 by an adhesive.

Specifically, the first rotor core 31 includes an inner axial end surface, which faces the annular magnet 33 in the axial direction, and an outer axial end surface, which is located at an opposite side of the inner axial end surface. The second rotor 32 includes an inner axial end surface, which faces the annular magnet 33 in the axial direction, and an outer axial end surface, which is located at an opposite side of the inner axial end surface.

The annular magnet 33 is magnetized in the axial direction so that each of the first claw-shaped magnetic pole portions 31b functions as a first magnetic pole (north pole in the present embodiment) and each of the second claw-shaped magnetic pole portions 32b functions as a second magnetic pole (south pole in the present embodiment). In this manner, the rotor 21 of the present embodiment is a rotor of a so-called Lundell-type structure using the annular magnet 33 as a field magnet. In the rotor 21, the four first claw-shaped magnetic pole portions 31b, which are north poles, and the four second claw-shaped magnetic pole portions 32b, which are south poles, are located alternately in the circumferential direction, and the number of poles is eight (number of pairs of poles is four). That is, in the present embodiment, the number of poles of the rotor 21 is set to 2×n (here, n is a natural number), and the number of teeth 17a of the stator 16 is set to 3×n. More specifically, the number of poles of the rotor 21 is set to "eight", and the number of the teeth 17a of the stator 16 is set to "twelve".

The rotor 21 of the present embodiment includes back surface auxiliary magnets 34 provided on radially inner sides (back surfaces) of the first and second claw-shaped magnetic pole portions 31b and 32b. The back surface auxiliary magnets 34 are magnetized in the radial direction to limit magnetic flux leakage (short circuit) at the corresponding portions.

The rotor 21 of the present embodiment further includes an interpolar magnet 35 arranged between the first and second claw-shaped magnetic pole portions 31b and 32b in the circumferential direction. The interpolar magnet 35 is magnetized in the circumferential direction to limit magnetic flux leakage at the corresponding portions.

As shown in FIG. 1, a sensor magnet 42, which serves as a detected portion, is arranged on the rotor 21 with a substantially disk-shaped magnet fixing member 41 located in between. The sensor magnet 42 generates a magnetic flux for detecting a rotation position of the rotor 21. More specifically, the magnet fixing member 41 includes a disk portion 41b and a cylindrical portion 41c extending from an outer edge of the disk portion 41b in the form of a cylinder. A boss 41a is formed in a central portion of the disk portion 41b. The annular sensor magnet 42 is fixed to the magnet fixing member 41 so that the sensor magnet 42 abuts against an inner circumferential surface of the cylindrical portion 41c and a surface of the disk portion 41b. The magnet fixing member 41 (sensor magnet 42) is arranged at the outer axial end surface of the first rotor core 31. More specifically, the magnet fixing member 41 is located at a position deviated from the first and second rotor cores 31 and 32 in the axial direction and proximal to the first rotor core 31. The boss 41a is fitted to the rotation shaft 22. In other words, the magnet fixing member 41 (sensor magnet 42) of the present embodiment is fixed to the rotation shaft 22 at a position where the magnet fixing member 41 and the second rotor 32 sandwich the first rotor core 31.

In a front end plate 14, a hall IC 43, serving as a magnetic sensor, is arranged at a position facing the sensor magnet 42 in the axial direction. In other words, the hall IC 43 is fixed to the front end plate 14 at a position where the hall IC 43 and the first rotor core 31 sandwich the sensor magnet 42. When the hall IC 43 detects magnetic fields of the north pole and south pole, the hall IC 43 outputs a High level detection signal and a Low level detection signal to the control circuit S.

Figure 3:
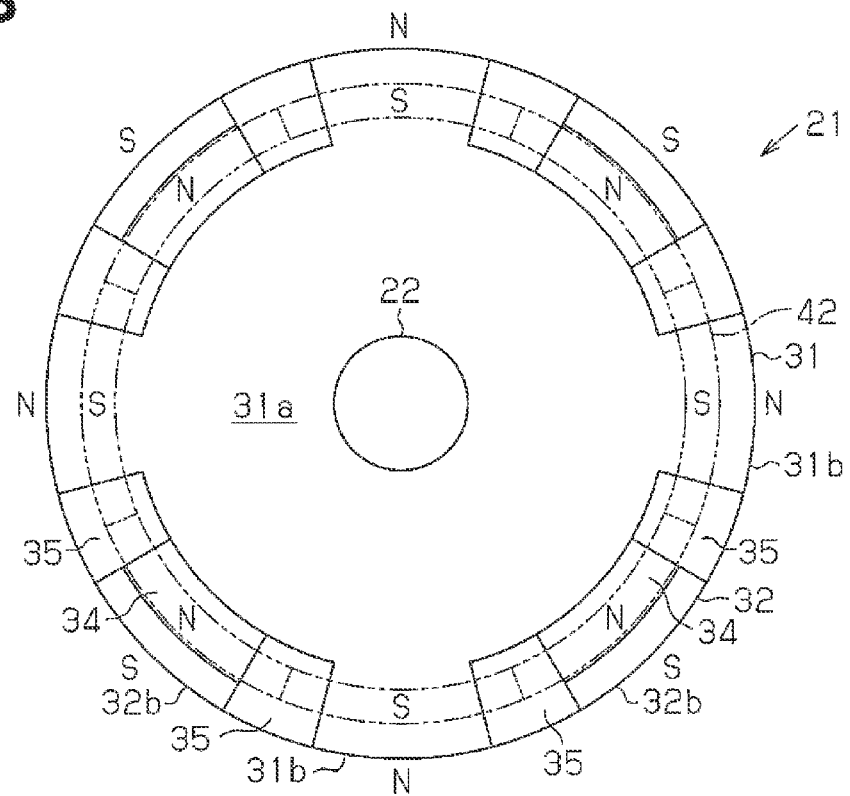
FIG. 3 is a partial plan view of a rotor shown in FIG. 1.
Figure 4:
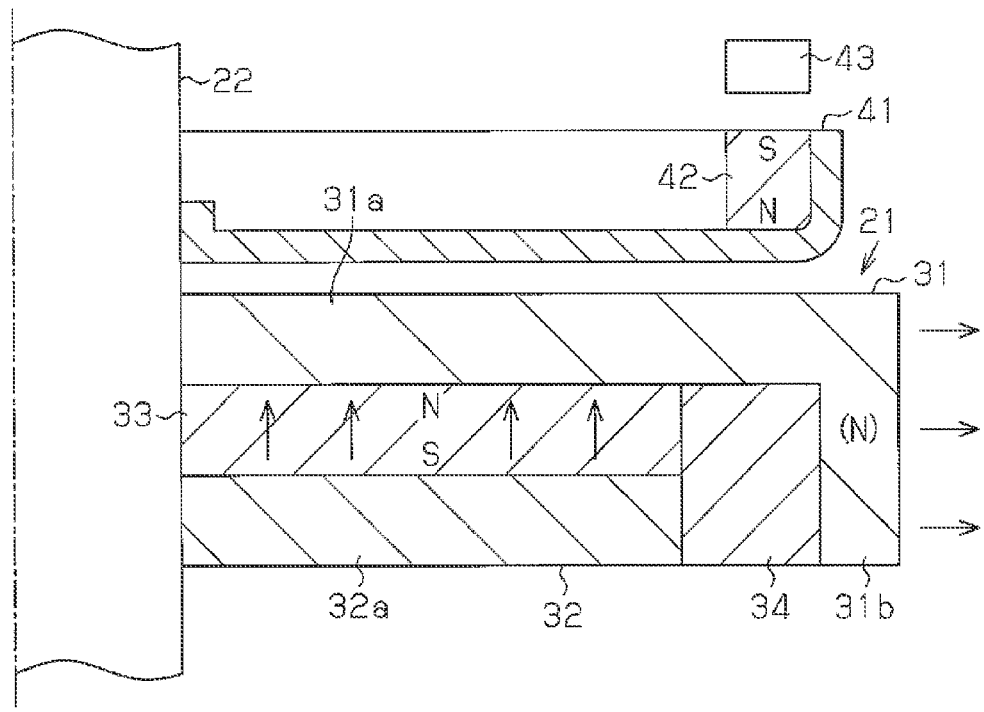
FIG. 4 is a partially cross-sectional view of the brushless motor shown in FIG. 1.

Here, as shown in FIGS. 3 and 4, the sensor magnet 42 has an inner diameter that is larger than outer diameters of the first and second core bases 31a and 32a and the annular magnet 33. The sensor magnet 42 includes a first sensor magnet portion, which faces the first and second claw-shaped magnetic pole portions 31b and 32b in the axial direction, and a second sensor magnet portion, which is located at an opposite side of the first sensor magnet portion in the axial direction. The first sensor magnet portion includes a plurality of first magnetic pole portions and a plurality of second magnetic pole portion which are alternately located in the circumferential direction. The first magnetic pole portions and the second magnetic pole portions have different magnetic poles. The magnetic poles of the first magnetic pole portions and the magnetic poles of the second magnetic pole portions are same as magnetic poles of the first and second claw-shaped magnetic pole portions 31b and 32b that face the first magnetic pole portions and the second magnetic pole portions.

More specifically, the sensor magnet 42 is formed so that magnetized directions in the axial direction differ alternately in the circumferential direction. In the present embodiment, the magnetized directions differ at equal angular (45°) intervals. In FIG. 3, reference characters N and S denote magnetic poles located toward the upper side of the plane of the drawing in the sensor magnet 42. As shown in FIG. 4, the sensor magnet 42 is formed so that at circumferential positions facing the first claw-shaped magnetic pole portions 31b that function as north poles, magnetic poles of portions of the sensor magnet 42 facing the first claw-shaped magnetic pole portions 31b are north poles, and magnetic poles of portions of the sensor magnet 42 not facing the first claw-shaped magnetic pole portions 31b (in FIG. 3, near side of the paper sheet) are south poles. Further, the sensor magnet 42 is formed so that at circumferential positions facing the second claw-shaped magnetic pole portions 32b that function as south poles, magnetic poles of portions of the sensor magnet 42 facing the second claw-shaped magnetic pole portions 32b are south poles, and magnetic poles of portions of the sensor magnet 42 not facing the second claw-shaped magnetic pole portions 32b are north poles. The sensor magnet 42 of the present embodiment is formed so that circumferential centers of the magnetic poles (first and second magnetic pole portions) of the first sensor magnet portion, which face the first and second claw-shaped magnetic pole portions 31b and 32b, are aligned with circumferential centers of the first and second claw-shaped magnetic pole portions 31b and 32b.

Next, the operation of the brushless motor 11 having the above-described structure will be described.

When three-phase drive current is supplied from the control circuit S to the windings 19, a rotating field is generated in the stator 16 thereby rotating and driving the rotor 21. At this time, when the sensor magnet 42 facing the hall IC 43 rotates, the level of the detection signal output from the hall IC 43 is switched in accordance with a rotation angle (position) of the rotor 21. Based on the detection signal, the supply of the three-phase drive current from the control circuit S to the windings 19 is switched at optimal timings. Thus, a satisfactory rotating field is generated, and the rotor 21 is continuously rotated and driven in a satisfactory manner.

The advantages of the first embodiment will now be described.

(1) Each of the first rotor core 31 and the second rotor 32 includes the inner axial end surface facing the annular magnet 33 in the axial direction and the outer axial end surface located at an opposite side of the inner axial end surface. The sensor magnet 42 is arranged at the outer axial end surface of the first rotor core 31. That is, the sensor magnet 42 is arranged at a position separated from the circumferential surface of the rotor 21 where the magnetic field and magnetic flux for driving the rotor 21 are located (space between stator 16 and first and second claw-shaped magnetic pole portions 31b and 32b). This reduces the influence on the hall IC 43 from the stator 16 and the first and second claw-shaped magnetic pole portions. Thus, the hall IC 43 is able to accurately detect the rotation position (angle) of the rotor 21.

(2) The inner diameter of the sensor magnet 42 is larger than the outer diameters of the first and second core bases 31a and 32a. The sensor magnet 42 includes the plurality of portions that face the first and second claw-shaped magnetic pole portions 31b and 32b and have the same magnetic poles as the faced claw-shaped magnetic pole portions. Thus, axial magnetic flux leakage from the first and second claw-shaped magnetic pole portions 31b and 32b to the sensor magnet 42 is limited. This reduces the influence of the magnetic flux leakage from the first and second claw-shaped magnetic pole portions 31b and 32b on the magnetic flux of the sensor magnet 42 at the hall IC 43, and thereby allows for the hall IC 43 to accurately detect the rotation position (angle) of the rotor 21.

(3) The sensor magnet 42 is formed so that magnetized directions in the axial direction differ at equal angular) (45° intervals in the circumferential direction, and circumferential centers of the magnetic poles on the side facing the first and second claw-shaped magnetic pole portions 31b and 32b are aligned with circumferential centers of the first and second claw-shaped magnetic pole portions 31b and 32b. Thus, a level of the detection signal detected by the hall IC 43 is switched at equal pitches.

The first embodiment may be modified as described below.

The first and second rotor cores 31 and 32 of the first embodiment are fitted to the rotation shaft 22. More specifically, the first and second rotor cores 31 and 32 are formed so that the rotation shaft 22 is press fitted into the center holes of the first and second core bases 31a and 32a. Instead, a cylindrical boss may be formed on an inner circumferential edge of the core base into which the rotation shaft 22 is press fitted.

Figure 5:
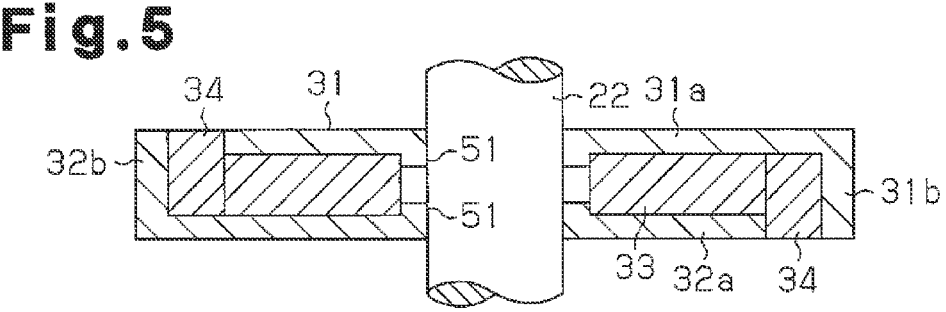
FIGS. 5 to 8 are cross-sectional views illustrating other examples of the first embodiment.

For example, the first and second rotor cores 31 and 32 may be changed as shown in FIG. 5. Inward extending bosses 51 into which the rotation shaft 22 is press fitted are formed on inner circumferential edges of the first and second core bases 31a and 32a of this example. In the first and second core bases 31a and 32a, the inward extending bosses 51 and the claw-shaped magnetic pole portions (first claw-shaped magnetic pole portion 31b in the first core base 31a extend in the same axial direction as the second claw-shaped magnetic pole portions 32b in the second core base 32a). That is, the inward extending boss 51 of the first core base 31a and the inward extending boss 51 of the second core base 32a extend toward each other. In this example, the inner diameter of the annular magnet 33 is substantially equal to the outer diameter of the inward extending boss 51, and a gap is arranged between the inward extending bosses 51.

This enlarges the press fitting range in the axial direction and allows for the first and second rotor cores 31 and 32 to be rigidly fixed to the rotation shaft 22. An arrangement space for the bosses is not required outside the first and second core bases 31a and 32a. This differs from a case in which bosses extend in opposite directions (outward in the axial direction).

Figure 6:
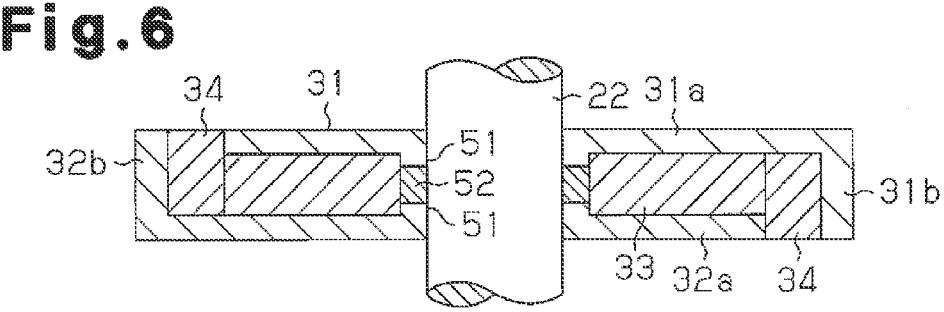

The first and second rotor cores 31 and 32 may be changed as shown in FIG. 6, for example. In this example, an inner auxiliary magnet 52 for reducing magnetic flux leakage is arranged in the other example (see FIG. 5) between the inward extending boss 51 of the first rotor core 31 and the inward extending boss 51 of the second rotor 32 in the axial direction. Thus, magnetic flux leakage is reduced between the inward extending bosses 51, and deterioration in motor efficiency can be suppressed. This inner auxiliary magnet 52 may be a ferrite magnet or a bond magnet. If a bond magnet is used, the inner auxiliary magnet 52 may be brought into close contact with the inward extending bosses 51 without the high dimensional accuracy.

Figure 7:
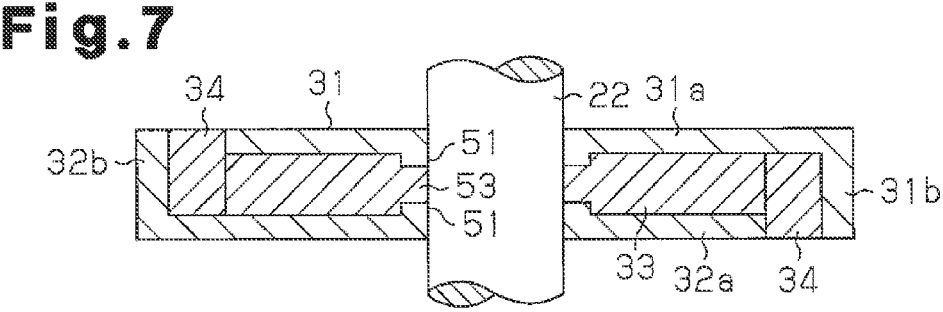

The first and second rotor cores 31 and 32 may be changed as shown in FIG. 7, for example. In this example, an inner auxiliary magnet portion 53, which functions as an inner auxiliary magnet for suppressing magnetic flux leakage, is arranged in the other example (see FIG. 5) between the inward extending boss 51 of the first rotor core 31 and the inward extending boss 51 of the second rotor 32 in the axial direction. The inner auxiliary magnet portion 53 is formed integrally with the annular magnet 33. Thus, magnetic flux leakage is reduced between the inward extending bosses 51, and deterioration in motor efficiency may be suppressed.

Figure 8:
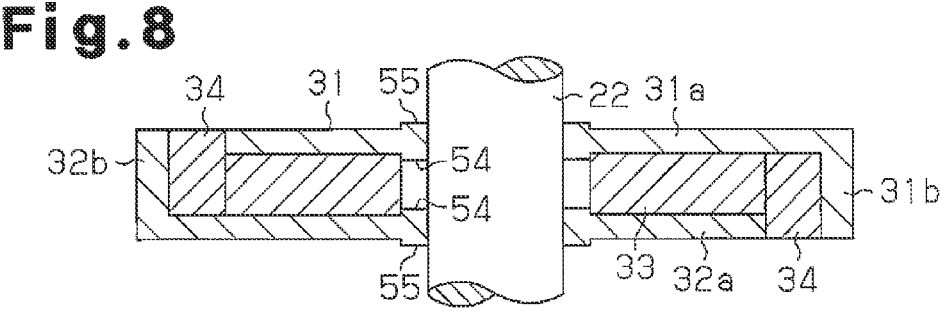

The first and second rotor cores 31 and 32 may be changed as shown in FIG. 8, for example. In this example, inward extending bosses 54 are formed. The inward extending bosses 54 project in the axial direction for a smaller amount than the inward extending bosses 51 in the other example (see FIG. 5). Further, outward extending bosses 55 project from inner circumferential edges of the first and second core bases 31a and 32a in a direction opposite to the inward extending bosses 54.

This enlarges a press fitting range in the axial direction and allows for the first and second rotor cores 31 and 32 to be rigidly fixed to the rotation shaft 22. The arrangement space for the bosses outside the first and second core bases 31a and 32a may be reduced as compared with when there are only bosses extending in opposite directions (outward direction in axial direction). This allows for an increase in the distance between the inward extending bosses 51 as compared with the other example (see FIG. 5) while obtaining the same fixing strength. Further, magnetic flux leakage between the inward extending bosses 51 may be reduced.

Obviously, the inward extending boss 51 may be formed in either one of the first and second core bases 31a and 32a, and a boss extending only in the outward direction may be used without arranging the inward extending boss 51.

In the first embodiment, the rotor 21 includes the back surface auxiliary magnets 34, which are arranged radially inward from the first and second claw-shaped magnetic pole portions 31b and 32b and magnetized in the radial direction. However, the back surface auxiliary magnets 34 may be omitted from the rotor 21.

In the first embodiment, the rotor 21 includes the interpolar magnet 35 provided between the first and second claw-shaped magnetic pole portions 31b and 32b in the circumferential direction and magnetized in the circumferential direction. However, the interpolar magnet 35 may be omitted from the rotor 21.

A second embodiment of a brushless motor will now be described with reference to FIGS. 9 to 13. The brushless motor of the second embodiment is partially in common with the brushless motor 11 of the first embodiment. Therefore, only portions of the brushless motor that differ from the first embodiment will be described in detail, and the common portions will not be described for the sake of convenience.

Figure 9:
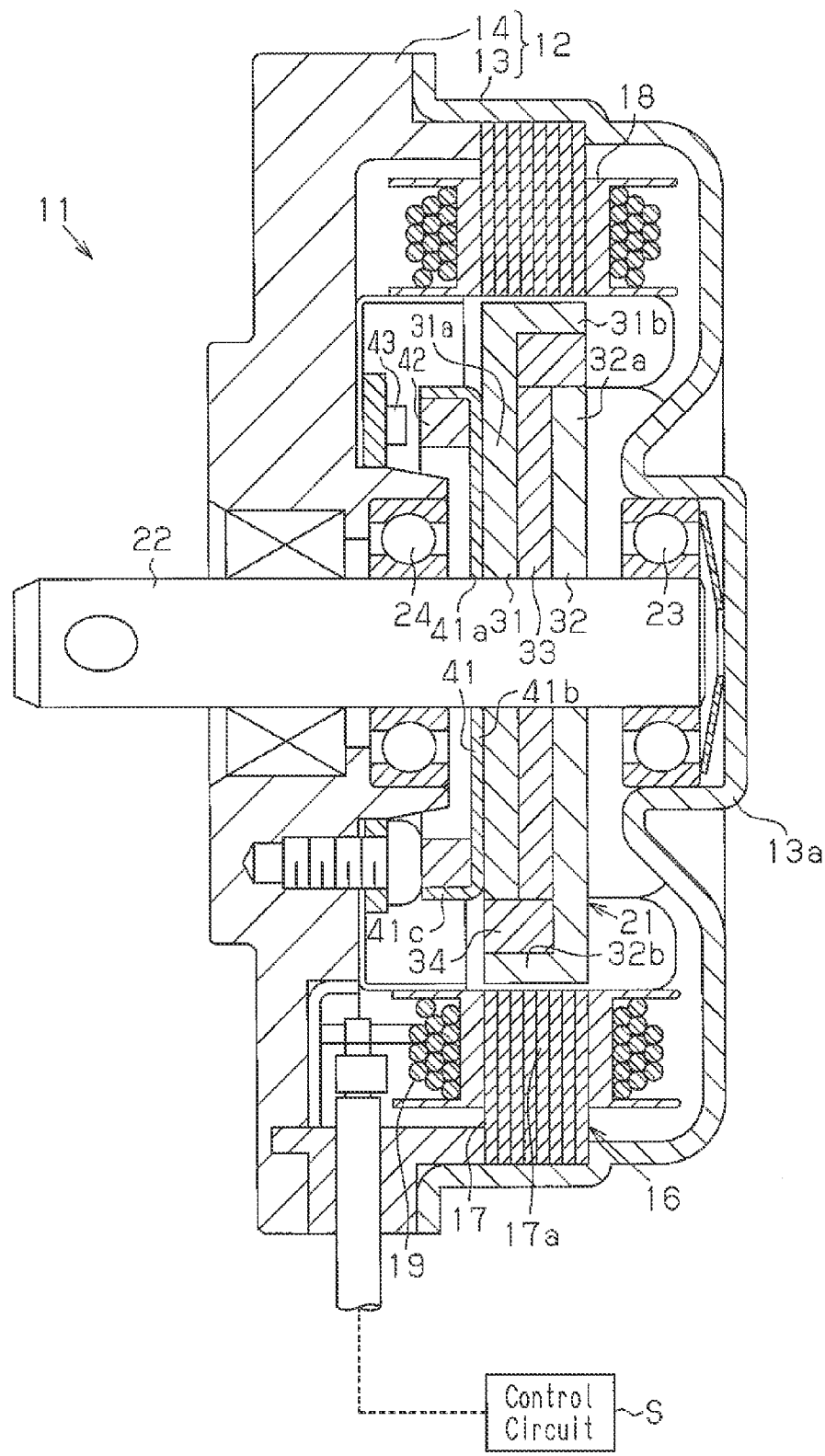
FIG. 9 is a cross-sectional view of a brushless motor according to a second embodiment of the present disclosure.
Figure 10:
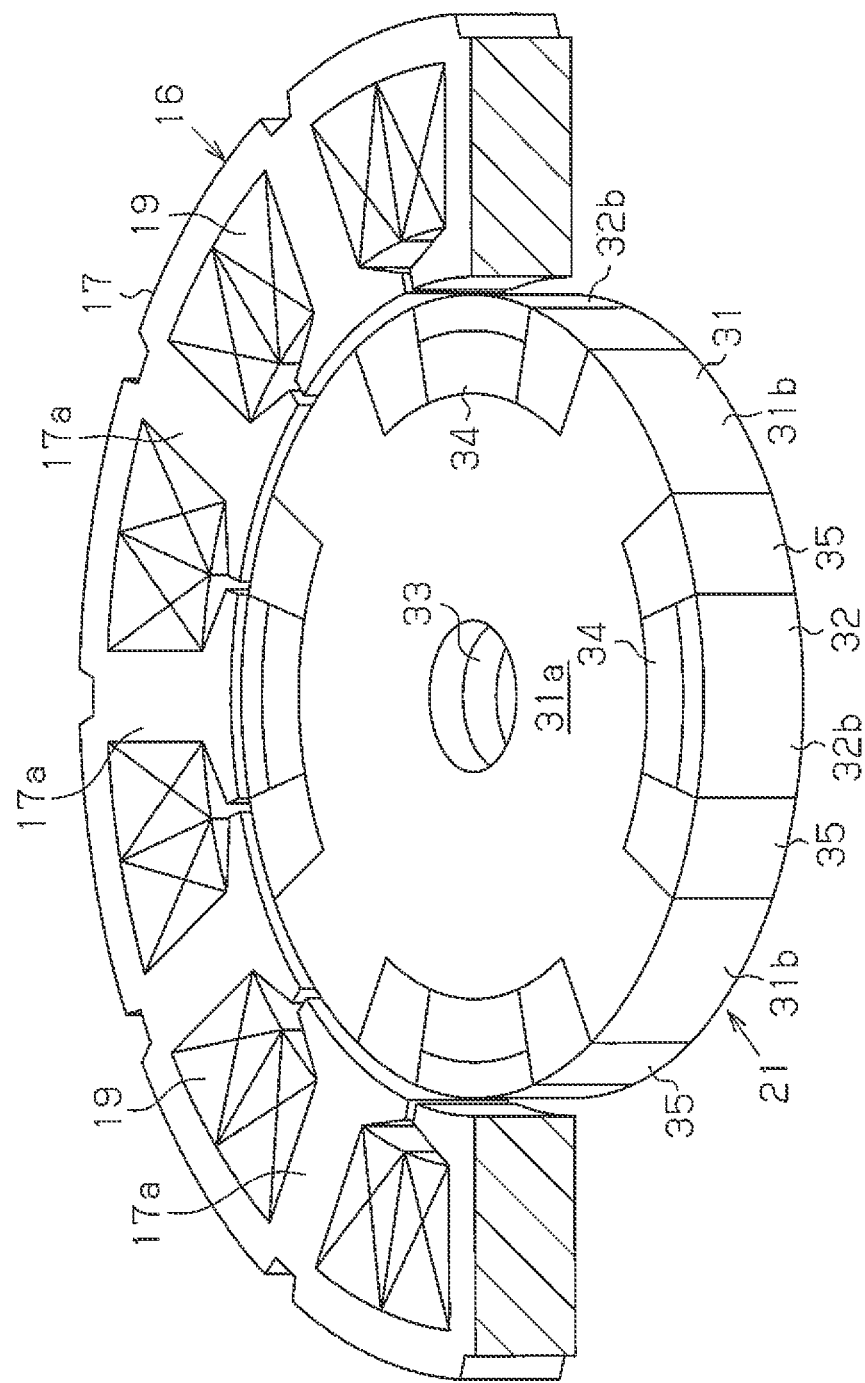
FIG. 10 is a partially cross-sectional perspective view of the brushless motor shown in FIG. 9.

As shown in FIG. 9, a sensor magnet 42 serving as a detected portion is arranged on a rotor 21 of the present embodiment with a substantially disk-shaped magnet fixing member 41 arranged in between. More specifically, the magnet fixing member 41 includes a disk portion 41b and a cylindrical portion 41c extending from an outer edge of the disk portion 41b in the form of a cylinder. A center hole 41a is formed in the disk portion 41b. An annular sensor magnet 42 is fixed to the magnet fixing member 41 so that the sensor magnet 42 abuts against an inner circumferential surface of the cylindrical portion 41c and a surface of the disk portion 41b. The magnet fixing member 41 is fitted to a rotation shaft 22 so that the center hole 41a is located at an opposite side of a second core base 32a relative to a first core base 31a. In other words, the magnet fixing member 41 (sensor magnet 42) is fixed to the rotation shaft 22 at a position where the magnet fixing member 41 and the second core base 32a sandwich the first core base 31a.

Here, the sensor magnet 42 is formed so that magnetic poles (north poles and south poles) differ alternately in the circumferential direction. That is, the sensor magnet 42 includes first magnetic pole portions, having magnetic poles (north poles) that are the same as portions of the annular magnet 33 proximal to the sensor magnet 42, and second magnetic pole portions, having magnetic poles (south poles) that are the same as portions of the annular magnet 33 distal from the sensor magnet 42.

Figure 11:
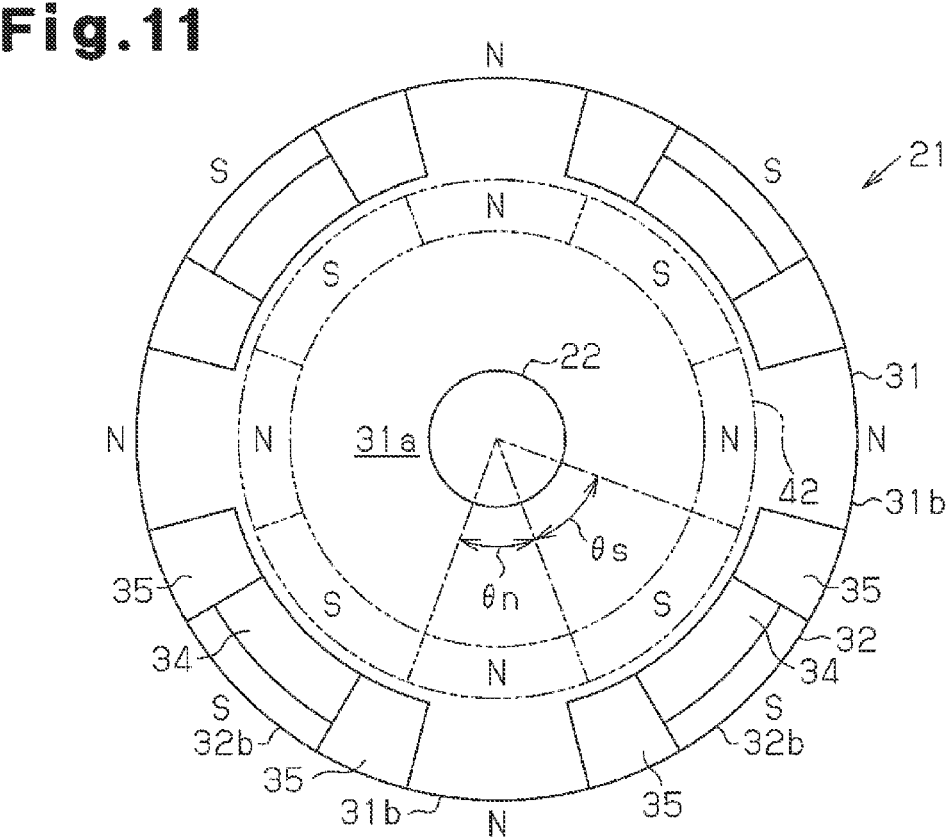
FIG. 11 is a partial plan view of a rotor shown in FIG. 9.
Figure 12:
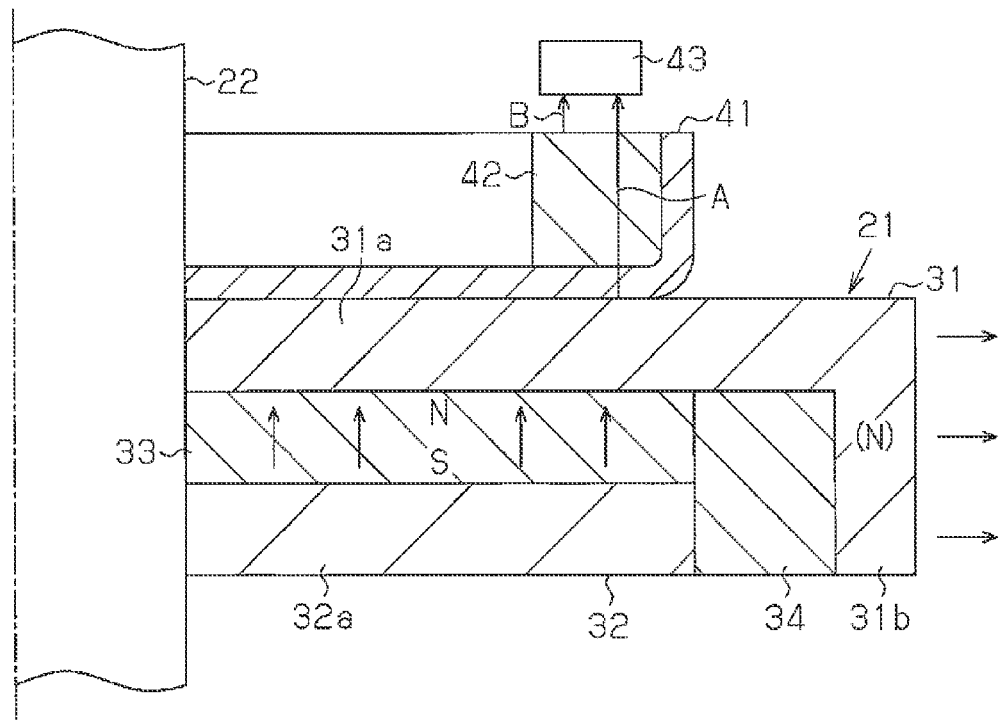
FIG. 12 is a partially cross-sectional view of the brushless motor shown in FIG. 9.

As shown in FIGS. 11 and 12, an angle θn of the first magnetic pole portions is set to be smaller than an angle θs of the second magnetic pole portions. That is, in the second embodiment, the portions of the annular magnet 33 proximal to the sensor magnet 42 are the north poles. Thus, the angle θn at which the north pole of the sensor magnet 42 is formed is set to be smaller than the angle θs at which the south pole is formed. The angles θn and θs at which the magnetic poles (north pole and south pole) in the sensor magnet 42 are formed are set so that levels of detection signals detected by the hall IC 43 are switched at equal pitches (180° in terms of electric angle).

As shown in FIG. 11, the sensor magnet 42 of the second embodiment is positioned in the circumferential direction and arranged so that a circumferential center of each of the magnetic poles (north pole and south pole) of the sensor magnet 42 is aligned with a circumferential center of the one of the first and second claw-shaped magnetic pole portion 31b or 32b having the same magnetic pole.

Next, the operation of the brushless motor 11 having the above-described structure will be described.

Figure 13:
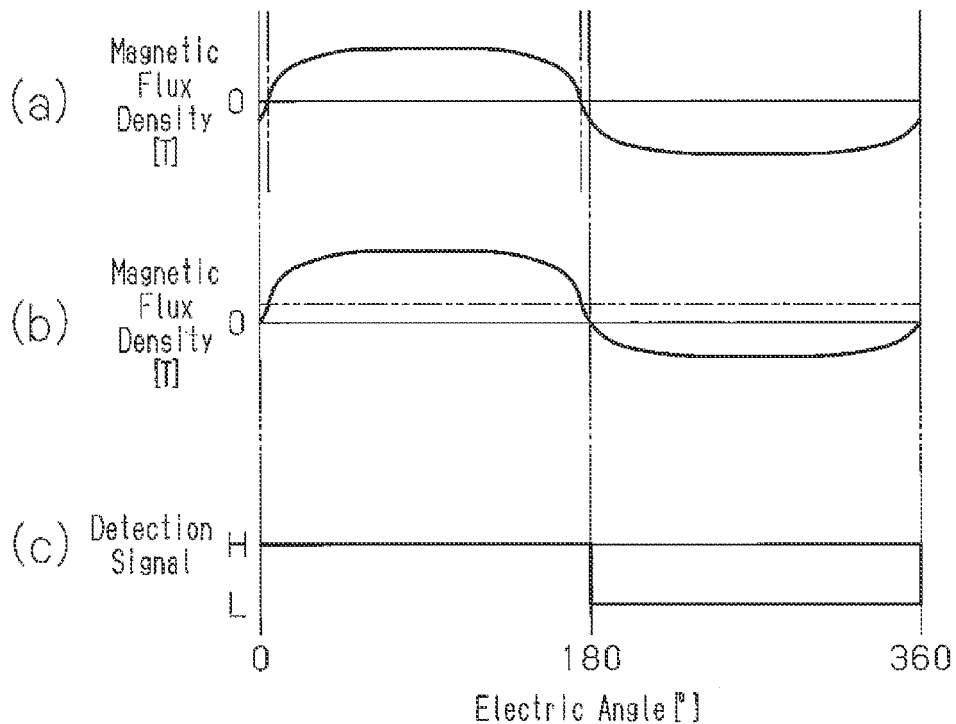
FIG. 13 is a characteristic diagram for the second embodiment, where

As shown in (a) of FIG. 13 for example, if the sensor magnet 42 is solely rotated, since the angle θn at which the north pole of the sensor magnet 42 is formed is smaller than the angle θs at which the south pole is formed, the magnetic flux density at the position of the hall IC 43 does not traverse 0 at an equal pitch (180° in terms of electric angle) but traverses 0 at an uneven pitch.

As shown in FIG. 12 and (b) in FIG. 13, if the entire rotor 21 is rotated, magnetic flux leakage (arrow A in FIG. 12) from the first rotor core 31 caused by the annular magnet 33 is superimposed on a magnetic flux (arrow B in FIG. 12) from the sensor magnet 42. Therefore, the magnetic flux density at the position of the hall IC 43 is entirely shifted to a higher level, and the magnetic flux traverses 0 at an equal pitch (180° in terms of electric angle).

Thus, the levels of detection signals detected by the hall IC 43 are switched at an equal pitch as shown in (c) in FIG. 13. Hence, the rotation position (angle) of the rotor 21 is detected with high accuracy, and three-phase drive current switched at an optimal timing is supplied from the control circuit S to the windings 19 based on the detection signal thereby generating a rotating field. This rotates and drives the rotor 21.

The advantages of the second embodiment in addition to above advantage (1) will now be described.

(4) The sensor magnet 42 includes the first magnetic pole portions, which have magnetic poles (north poles) that are the same as portions of the annular magnet 33 proximal to the sensor magnet 42, and the second magnetic pole portions, which have magnetic poles (south poles) that are the same as portions of the annular magnet 33 distal from the sensor magnet 42. The angle θn of the first magnetic pole portion is set to be smaller than the angle θs of the second magnetic pole portion. Hence, the rotor 21 is formed taking into consideration the influence of magnetic flux leakage from the first rotor core 31 (first core base 31a) caused by the annular magnet 33. That is, magnetic flux leakage (see arrow A in FIG. 12) from the first rotor core 31 caused by the annular magnet 33 is superimposed on a magnetic flux (arrow B in FIG. 12) from the sensor magnet 42. Therefore, a magnetic flux including the magnetic flux leakage is switched at an equal pitch. Hence, levels of detection signals detected by the hall IC 43 are switched at an equal pitch. This allows for the rotation position (angle) of the rotor 21 to be detected with high accuracy and thereby limits output decreases and vibration noise caused by magnetic flux leakage.

(5) The sensor magnet 42 is positioned in the circumferential direction so that a circumferential center of each of the first and second magnetic pole portions (north pole and south pole) of the sensor magnet 42 is aligned with a circumferential center of the claw-shaped magnetic pole portion which is the same as that of the first and second claw-shaped magnetic pole portion 31b or 32b. This limits disturbance in the magnetic flux from the sensor magnet 42 caused by magnetic flux leakage from the first and second claw-shaped magnetic pole portions 31b and 32b. That is, if the sensor magnet 42 is not positioned in the circumferential direction and a circumferential center of each of the first and second magnetic pole portions of the sensor magnet 42 is not aligned with a circumferential center of the claw-shaped magnetic pole portion which is the same as that of the first and second claw-shaped magnetic pole portion 31b or 32b, magnetic flux leakage from the first and second claw-shaped magnetic pole portions 31b and 32b may disturb the magnetic flux from the sensor magnet 42 depending upon the arrangement angle. The structure of the second embodiment limits disturbance in the magnetic flux.

(6) The angles θn and θs at which the first and second magnetic pole portions (north pole and south pole) in the sensor magnet 42 are formed are set so that levels of detection signals detected by the hall IC 43 are switched at an equal pitch. This allows for the rotation position (angle) to be detected with high accuracy, and easily supplies drive current to the windings 19 at optimal timings based on the detection signal and thereby limits output decreases and vibration noise caused by magnetic flux leakage.

(7) The rotor 21 includes the back surface auxiliary magnets 34 that are located radially inward from the first and second claw-shaped magnetic pole portions 31b and 32b and magnetized in the radial direction. Thus, magnetic flux leakage is decreased at these portions. This allows for the efficiency to be increased. Further, the rotor 21 includes the interpolar magnet 35 arranged between the first and second claw-shaped magnetic pole portions 31b and 32b in the circumferential direction and magnetized in the circumferential direction. Thus, magnetic flux leakage is decreased at that portion. This further increases efficiency.

The second embodiment may be modified as described below.

In the second embodiment, the sensor magnet 42 is fixed to the rotor 21 through the magnet fixing member 41. Instead, the sensor magnet 42 may be fixed by another structure.

Figure 14:
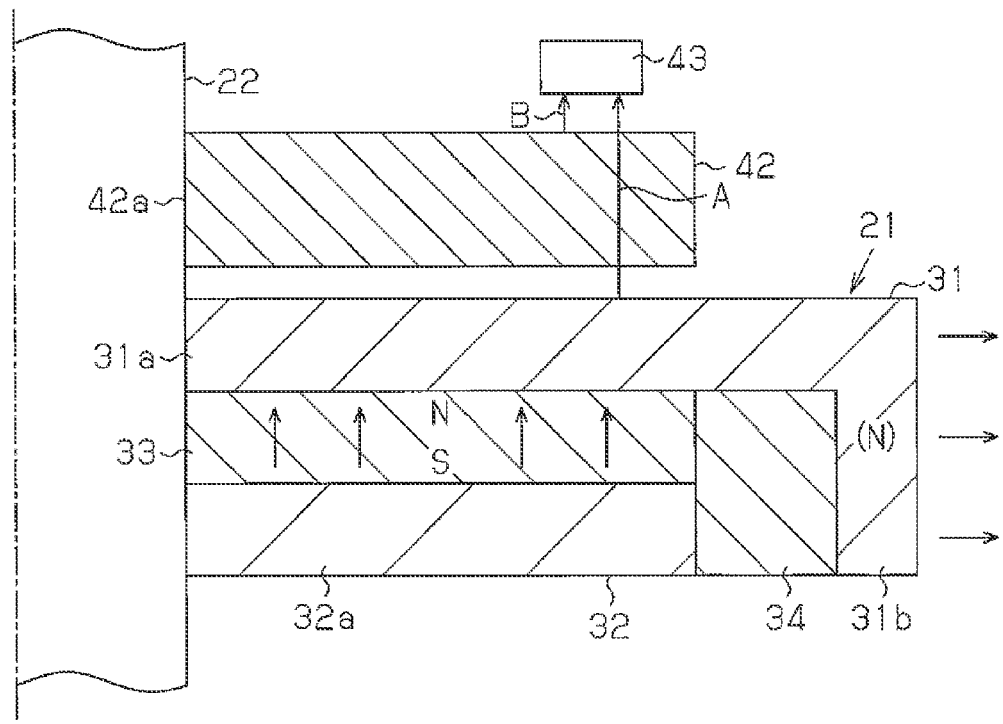
FIG. 14 is a partially cross-sectional view of a brushless motor in another example of the second embodiment.

As shown in FIG. 14 for example, the sensor magnet 42 and a fixing member 41 may be changed to a structure in which the rotation shaft 22 is press fitted into a center hole 42a of the disk-shaped sensor magnet 42. Obviously, in this sensor magnet 42, the angles θn and θs of the magnetic pole portions at which the magnetic poles (north pole and south pole) are formed are also set to the same values as the second embodiment.

In the second embodiment, the sensor magnet 42 is positioned in the circumferential direction so that the circumferential center of each of the first and second magnetic pole portions (north pole and south pole) of the sensor magnet 42 is aligned with the circumferential center of the claw-shaped magnetic pole which is the same as that of the first and second claw-shaped magnetic pole portion 31b or 32b. However, for example, the sensor magnet 42 does not have to be positioned in the circumferential direction in which case the circumferential center of each of the first and second magnetic pole portions (north pole and south pole) of the sensor magnet 42 and circumferential centers of the first and second claw-shaped magnetic pole portions 31b and 32b are not aligned with each other.

In the second embodiment, the angles θn and θs of the first and second magnetic pole portions (north pole and south pole) in the sensor magnet 42 are set so that the levels of detection signals detected by the hall IC 43 are switched at an equal pitch. Instead, the angles θn and θs do not have to be set in such a strict manner. That is, as long as the angle θn is set to be smaller than the angle θs, the levels of detection signals are switched at a pitch close to the equal pitch.

In the second embodiment, the rotor 21 includes the back surface auxiliary magnets 34 located radially inward from the first and second claw-shaped magnetic pole portions 31b and 32b and magnetized in the radial direction. However, the back surface auxiliary magnets 34 may be omitted from the rotor 21.

In the second embodiment, the rotor 21 includes the interpolar magnet 35 arranged between the first and second claw-shaped magnetic pole portions 31b and 32b in the circumferential direction and magnetized in the circumferential direction. However, the interpolar magnet 35 may be omitted from the rotor 21.

A third embodiment of a brushless motor will now be described with reference to FIGS. 15 to 19. The brushless motor of the third embodiment is partially in common with the brushless motor 11 of the first embodiment. Therefore, only portions of the brushless motor that differ from the first embodiment will be described in detail, and the common portions will not be described for the sake of convenience.

Figure 15:
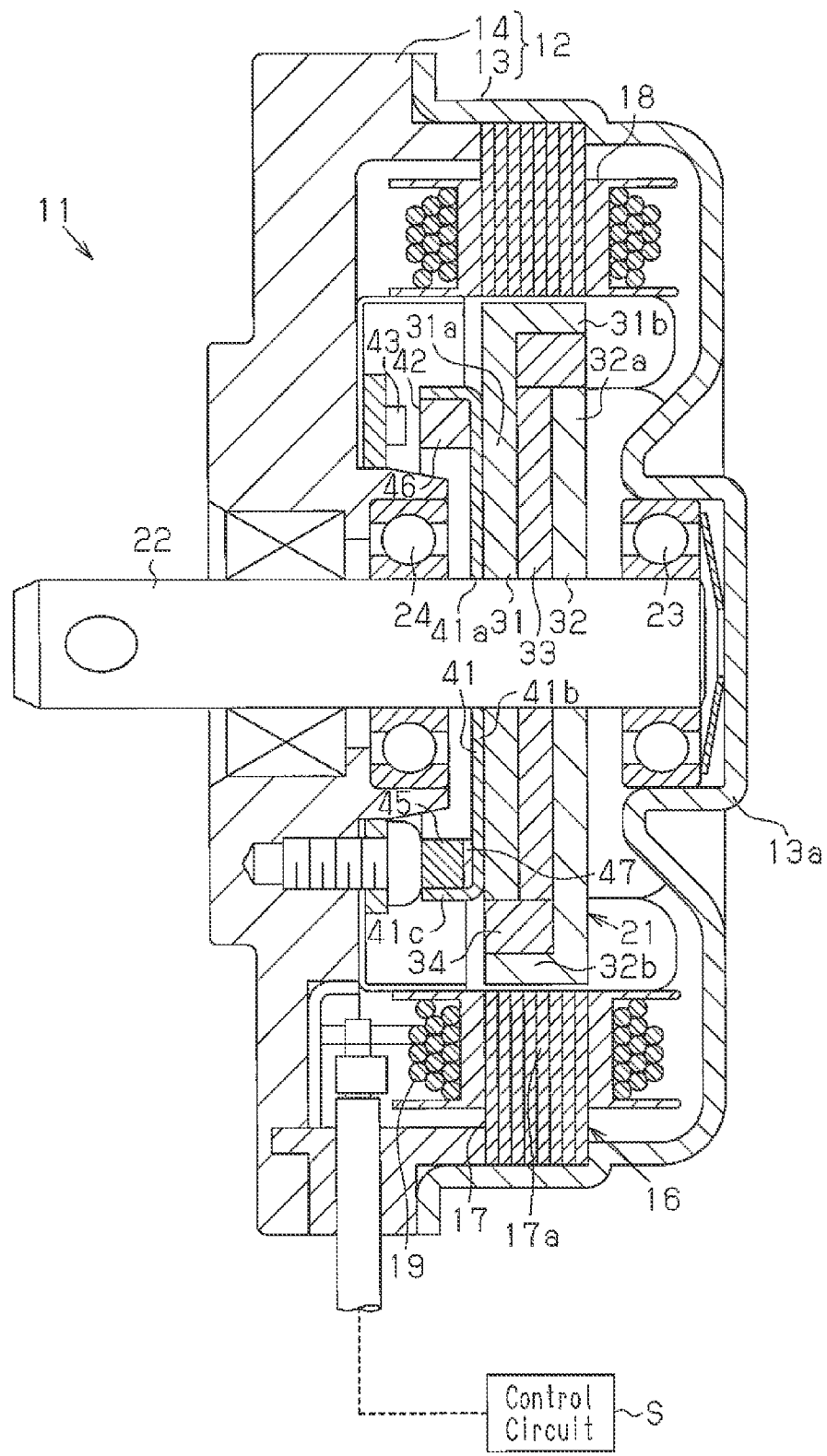
FIG. 15 is a cross-sectional view of a brushless motor according to a third embodiment of the present disclosure.

As shown in FIG. 15, a sensor magnet 42 serving as a detected portion is arranged on a rotor 21 of the third embodiment with a substantially disk-shaped magnet fixing member 41 arranged in between. More specifically, the magnet fixing member 41 includes a disk portion 41b and a cylindrical portion 41c extending from an outer edge of the disk portion 41b in the form of a cylinder. A center hole 41a is formed in the disk portion 41b. An annular sensor magnet 42 is fixed to the magnet fixing member 41 so that the sensor magnet 42 abuts against an inner circumferential surface of the cylindrical portion 41c and a surface of the disk portion 41b. The magnet fixing member 41 is fitted to a rotation shaft 22 so that the center hole 41a is located at an opposite side of a second core base 32a relative to a first core base 31a. In other words, the magnet fixing member 41 (sensor magnet 42) is fixed to the rotation shaft 22 at a position where the magnet fixing member 41 (the sensor magnet 42) and the second core base 32a sandwich the first core base 31a.

Here, the sensor magnet 42 is formed so that magnetic pole portions (north poles and south poles), which are magnetized in the axial direction, alternately differ in the axial direction.

Figure 16:
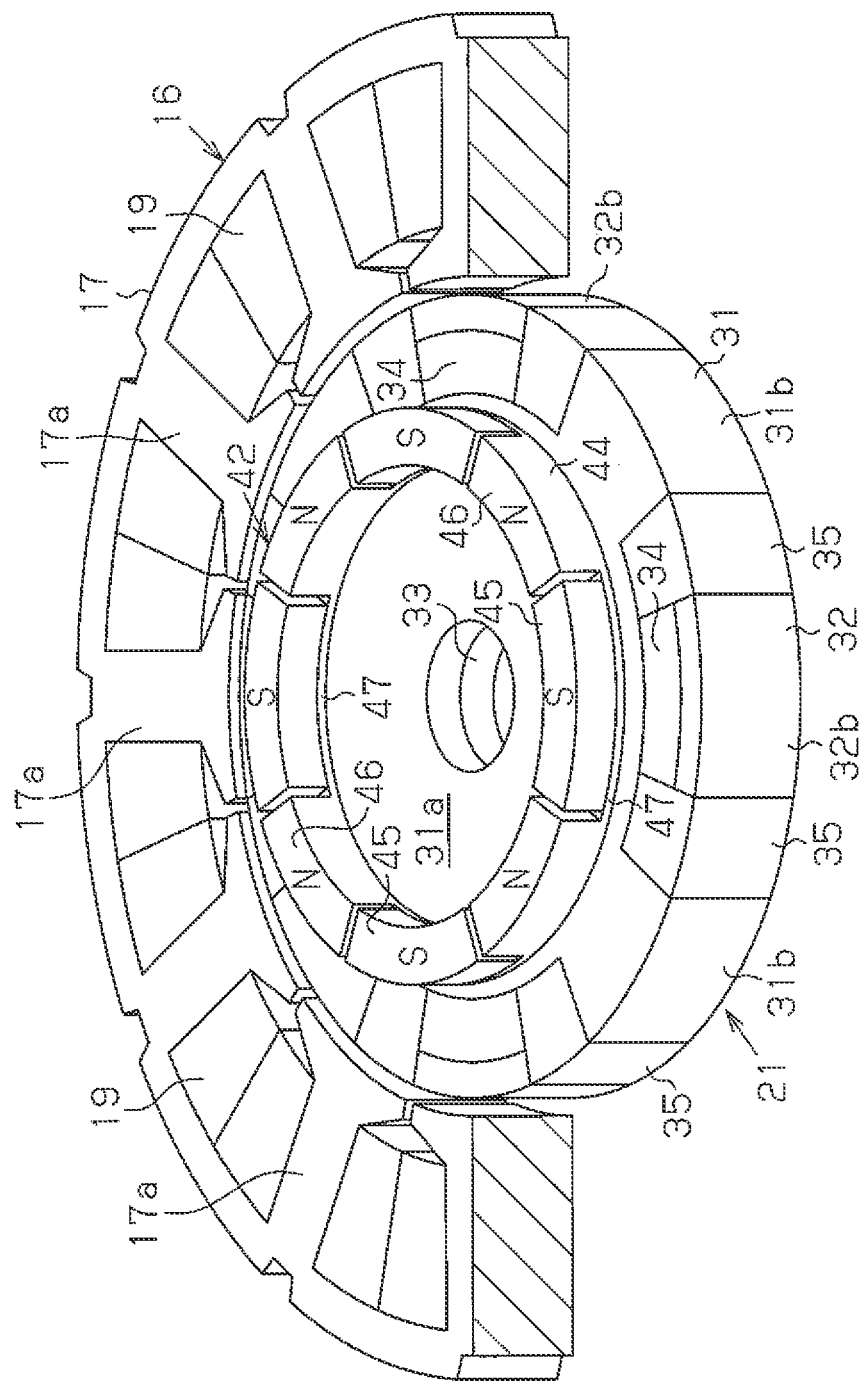
FIG. 16 is a partially cross-sectional perspective view of the brushless motor shown in FIG. 15.

As shown in FIG. 16, the sensor magnet 42 includes an annular core member 44, having a plurality of iron core portions 46 arranged along a circumferential direction of the sensor magnet 42, and a plurality of permanent magnets 45, which are located on the core member 44 and having first magnetic poles (south poles). Each of the permanent magnets 45 having the first magnetic pole (south pole) is located between two adjacent ones of iron core portions 46. Thus, the iron core portion 46 functions as a second magnetic pole (north pole). In the sensor magnet 42, the first magnetic poles (south poles) and the second magnetic poles (north poles) are alternately arranged. FIG. 16 shows a state in which the magnet fixing member 41 is removed. More specifically, the sensor magnet 42 includes the core member 44 and the plurality of permanent magnets 45. The core member 44 is made of magnetic metal and has an annular shape. The core member 44 includes the four iron core portions 46, arranged in the circumferential direction and projecting in the axial direction, and a plurality of thin portions 47, which are located between the adjacent iron core portions 46 in the circumferential direction and connect the iron core portions 46 to each other. The iron core portion 46 has a sectoral shape as viewed from the axial direction. The permanent magnet 45 is located on and adhered to the thin portion 47. The permanent magnet 45 is has a sectoral shape as viewed from the axial direction, and the sectoral shape has a width in the circumferential direction which is slightly smaller than the distance between the iron core portions 46 in the circumferential direction. The permanent magnet 45 is formed so that it has a slight gap from the iron core portion 46 in the circumferential direction when positioned, and the permanent magnet 45 and the iron core portion 46 have the same heights in the axial direction. The permanent magnet 45 includes a first permanent magnet portion facing the first core base 31a of the first rotor core 31. The annular magnet 33 includes a first field magnet portion facing the permanent magnet 45. The first permanent magnet portion has the same magnetic pole as the first field magnet portion (north pole). Thus, the magnetic pole of the iron core portion 46, more specifically, magnetic pole of a portion of the iron core portion 46 facing the hall IC 43, functions as the north pole.

Figure 17:
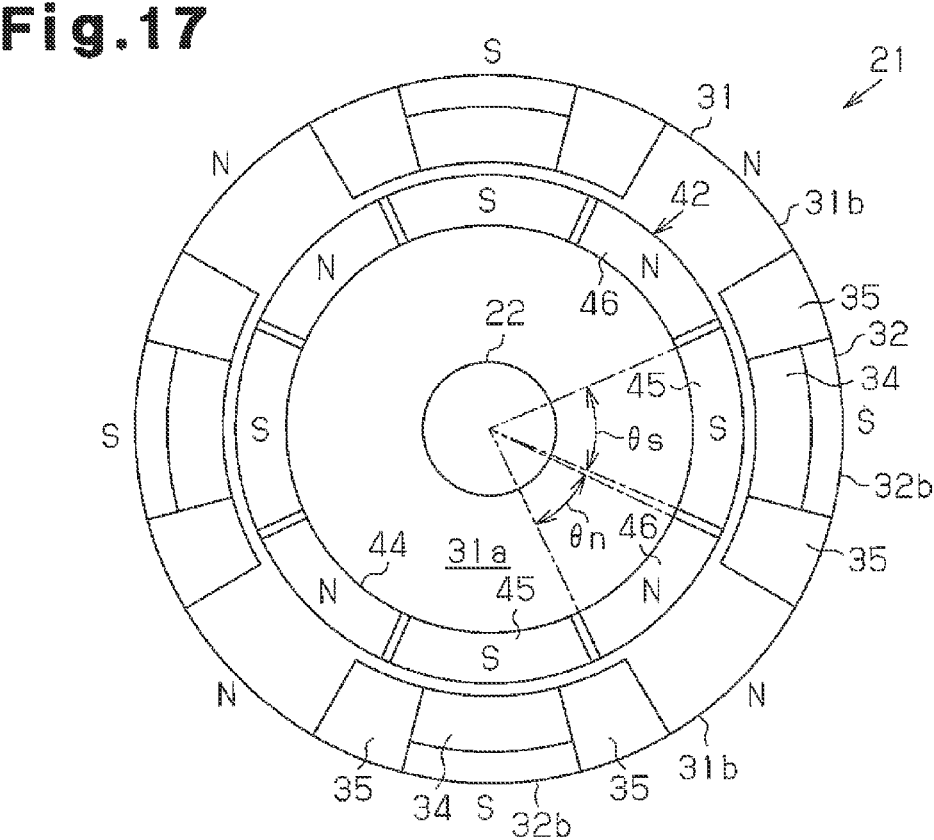
FIG. 17 is a partial plan view of a rotor shown in FIG. 15.

As shown in FIG. 17, the angle θn of the iron core portion 46 (north pole) in the sensor magnet 42 is set to be smaller than the angle θs of the permanent magnet 45 (south pole and permanent magnet magnetic pole portion). This is because an axial magnetic flux leakage from the first rotor core 31 (first core base 31a) caused by the annular magnet 33 is superimposed on a magnetic flux from the iron core portion 46 caused by the permanent magnet 45 is taken into consideration. The angles θn and θs of the magnetic pole portions (north pole and south pole) in the sensor magnet 42 are set so that the levels of the detection signals detected by the hall IC 43 are switched at an equal pitch (180° in terms of electric angle).

As shown in FIG. 17, the sensor magnet 42 of the third embodiment is positioned in the circumferential direction so that a circumferential center of each of the magnetic pole portions (north pole and south pole) of the sensor magnet 42 is aligned with a circumferential center of a magnetic pole having the same pole as that of the first and second claw-shaped magnetic pole portion 31b or 32b.

Next, the operation of the brushless motor 11 of the third embodiment having the above-described structure will be described.

Figure 19:
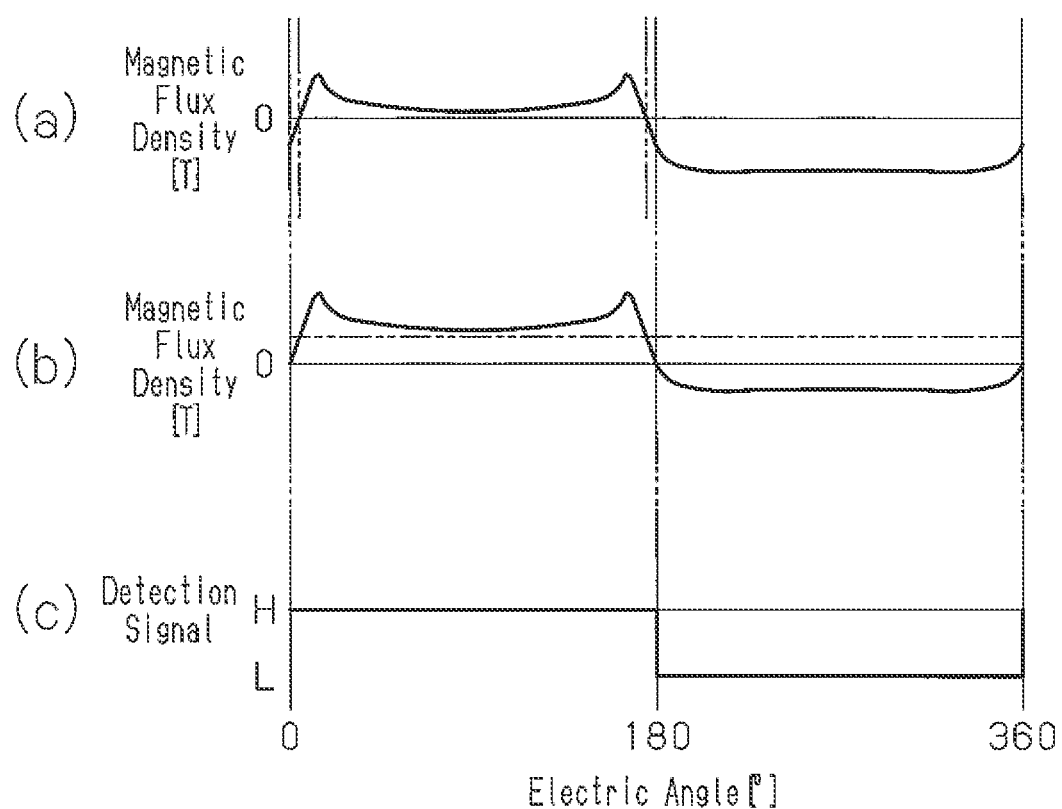
FIG. 19 is a characteristic diagram for the third embodiment, where

As shown in (a) in FIG. 19, if the sensor magnet 42 is solely rotated, since the angle θn of the iron core portion 46 (north pole) of the sensor magnet 42 is smaller than the angle θs of the permanent magnet 45 (south pole), the magnetic flux density at the position of the hall IC 43 does not traverse 0 at an equal pitch (180° in terms of electric angle) and traverses 0 at an uneven pitch. That is, a detection range (range in which magnetic flux density exceeds 0) based on a magnetic flux from the iron core portion 46 (north pole) becomes smaller than 180° in terms of electric angle (see left side in (a) in FIG. 19). If the magnetic flux from the iron core portion 46 is separated from the permanent magnet 45 in the circumferential direction, the magnetic flux becomes weak in structure. Hence, it is apparent that at an angle (angle of about 90° in (a) in FIG. 19) at which a circumferential center position of the iron core portion 46 faces the hall IC 43, the magnetic flux density is close to 0.

Figure 18:
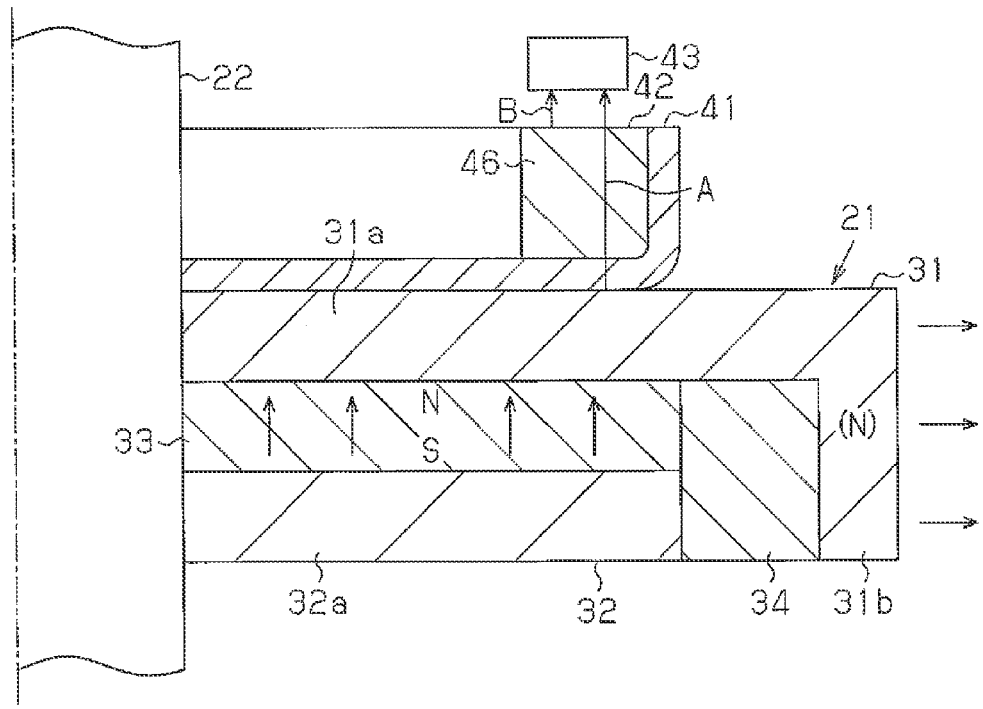
FIG. 18 is a partially cross-sectional view of the brushless motor shown in FIG. 15.

As shown in FIG. 18 and (b) in FIG. 19, if the entire rotor 21 is rotated, since the magnetic flux leakage (arrow A in FIG. 18) from the first rotor core 31 caused by the annular magnet 33 is superimposed on the magnetic flux (arrow B in FIG. 18) from the sensor magnet 42, the magnetic flux density at the position of the hall IC 43 is entirely shifted to be higher, and the magnetic flux traverses 0 at an equal pitch (180° in terms of electric angle). Even with an angle (angle of about 90° in FIG. 19(b)) at which the circumferential center position of the iron core portion 46 faces the hall IC 43, the magnetic flux density may be sufficiently higher than 0.

Thus, levels of detection signals detected by the hall IC 43 are switched at an equal pitch as shown in FIG. 19(c). Hence, the rotation position (angle) of the rotor 21 is detected with high accuracy, and three-phase drive current switched at optimal timings is supplied from the control circuit S to the windings 19 based on the detection signal thereby generating a rotating field. This rotates and drives the rotor 21.

The advantages of the third embodiment in addition to above advantage (1) will now be described.

(8) The sensor magnet 42 includes the annular core member 44, having the plurality of iron core portions 46 arranged in the circumferential direction, and the plurality of permanent magnets 45, which are located on the core member 44 and each having the first magnetic pole (south pole). Each of the permanent magnets 45 having the first magnetic pole (south pole) is located between two adjacent ones of the iron core portions 46. Thus, the iron core portion 46 functions as a second magnetic pole (north pole). In the sensor magnet 42, the first magnetic poles (south poles) and the second magnetic poles (north poles) are alternately arranged. This allows for the used amount of the permanent magnets to be reduced.

(9) The permanent magnet 45 of the sensor magnet 42 includes the first permanent magnet portion facing the first core base 31a of the first rotor core 31. The annular magnet 33 includes a first field magnet portion facing the permanent magnet 45. The first permanent magnet portion has the same magnetic pole as the first field magnet portion (north pole). Hence, an axial magnetic flux leakage from the first rotor core 31 (first core base 31a) caused by the annular magnet 33 is superimposed on a magnetic flux from the iron core portion 46. Although the magnetic flux from the iron core portion 46 becomes weak if the magnetic flux is separated from the permanent magnet 45 in the circumferential direction, since the magnetic flux leakage is superimposed on the magnetic flux, the magnetic flux may be strengthened as a whole. Hence, it is possible to enhance determination accuracy when the switching of magnetic poles is detected. That is, even with an angle (about 90° in FIG. 19(a)) at which a circumferential center position of the iron core portion 46 faces the hall IC 43, the magnetic flux density may be sufficiently higher than 0, and erroneous detection may be reduced.

(10) The angle θn of the iron core portion 46 (north pole) is set to be smaller than the angle θs of the permanent magnet 45 (south pole). Hence, the rotor 21 is formed so that influence of magnetic flux leakage from the first rotor core 31 (first core base 31a) caused by the annular magnet 33 is taken into consideration. That is, the axial magnetic flux leakage from the first rotor core 31 caused by the annular magnet 33 is superimposed on the magnetic flux from the sensor magnet 42. The magnetic flux including the magnetic flux leakage is switched at a pitch close to an equal pitch. Hence, levels of detection signals detected by the hall IC 43 are switched at a pitch close to an equal pitch. This allows for the rotation position (angle) to be detected with high accuracy and thereby limits output decreases and vibration noise caused by magnetic flux leakage.

(11) The circumferential center of each of the magnetic poles (north pole and south pole) of the sensor magnet 42, that is, the circumferential centers of the permanent magnet 45 and the iron core portion 46 are located so that they are aligned with circumferential centers of the first and second claw-shaped magnetic pole portions 31b and 32b. Thus, magnetic flux leakage from the first and second claw-shaped magnetic pole portions 31b and 32b that disturbs a magnetic flux from the sensor magnet 42 may be reduced. That is, if the sensor magnet 42 is located without being positioned in the circumferential direction so that a circumferential center of each of the magnetic pole portions of the sensor magnet 42 is not aligned with circumferential centers of the first and second claw-shaped magnetic pole portions 31b and 32b, the magnetic flux leakage from the first and second claw-shaped magnetic pole portions 31b and 32b may disturb the magnetic flux from the sensor magnet 42 depending on the arrangement angle. However, the structure of the third embodiment allows for disturbance in magnetic flux to be reduced.

(12) The angles θn and θs of each of the magnetic pole portions (north pole and south pole) in the sensor magnet 42, more specifically, the angle θn of the iron core portion 46 and the angle θs of the permanent magnet 45 are set so that levels of detection signals detected by the hall IC 43 are switched at an equal pitch. Hence, the rotation position (angle) may be detected with high accuracy thereby easily limiting, for example, output decreases and vibration noise.

The third embodiment may be modified as described below.

In the third embodiment, the permanent magnet 45 of the sensor magnet 42 includes the first permanent magnet portion facing the first core base 31a of the first rotor core 31. The annular magnet 33 includes a first field magnet portion facing the permanent magnet 45. The first permanent magnet portion has the same magnetic pole as the first field magnet portion (north pole). Instead, the rotor 21 may be formed so that magnetic poles of the first permanent magnet portion and the first field magnet portion are opposite to the above structure. In this case, the permanent magnet 45 may sufficiently be separated from the first rotor core 31 in the axial direction while taking into consideration axial magnetic flux leakage from the first rotor core 31 (first core base 31*a*) caused by the superimposed annular magnet 33.

In the third embodiment, the angle θn of the iron core portion 46 (north pole) is set to be smaller than the angle θs of the permanent magnet 45 (south pole). Instead, the angles θn and θs may have the same values.

In the third embodiment, the sensor magnet 42 is located so that the circumferential center of each of the magnetic pole (north pole and south pole) of the sensor magnet 42 is aligned with circumferential centers of the first and second claw-shaped magnetic pole portions 31*b* and 32*b*. Instead, the sensor magnet 42 may be arranged without being positioned in the circumferential direction so that the circumferential center of each of the magnetic pole portions (north pole and south pole) of the sensor magnet 42 and the circumferential centers of the first and second claw-shaped magnetic pole portions 31*b* and 32*b* are not aligned with each other. Thus, it becomes easy to produce the rotor 21 for example.

In third embodiment, the angles θn and θs of the magnetic pole portions (north pole and south pole) in the sensor magnet 42 are set so that levels of detection signals detected by the hall IC 43 are switched at an equal pitch. However, the angles θn and θs does not have to be set in such a strict manner. That is, if the angle θn is set to be smaller than the angle θs, the levels of detection signals are switched at a pitch close to the equal pitch.

In the third embodiment, the rotor 21 includes the back surface auxiliary magnets 34 provided radially inward of the first and second claw-shaped magnetic pole portions 31*b* and 32*b* and magnetized in the radial direction. The back surface auxiliary magnets 34 limit magnetic flux leakage at that portion. However, the rotor 21 does not have to include the back surface auxiliary magnets 34.

In the third embodiment, the rotor 21 includes the interpolar magnet 35 arranged between the first and second claw-shaped magnetic pole portions 31*b* and 32*b* in the circumferential direction and magnetized in the circumferential direction. The interpolar magnet 35 limits magnetic flux leakage at that portion. However, the rotor 21 does not have to include the interpolar magnet 35.

A fourth embodiment of a brushless motor will now be described with reference to FIGS. 20 to 28. The brushless motor of the fourth embodiment is partially in common with the brushless motor 11 of the first embodiment. Therefore, only portions of the brushless motor that differ from the first embodiment will be described in detail, and the common portions will not be described for the sake of convenience.

Figure 20:
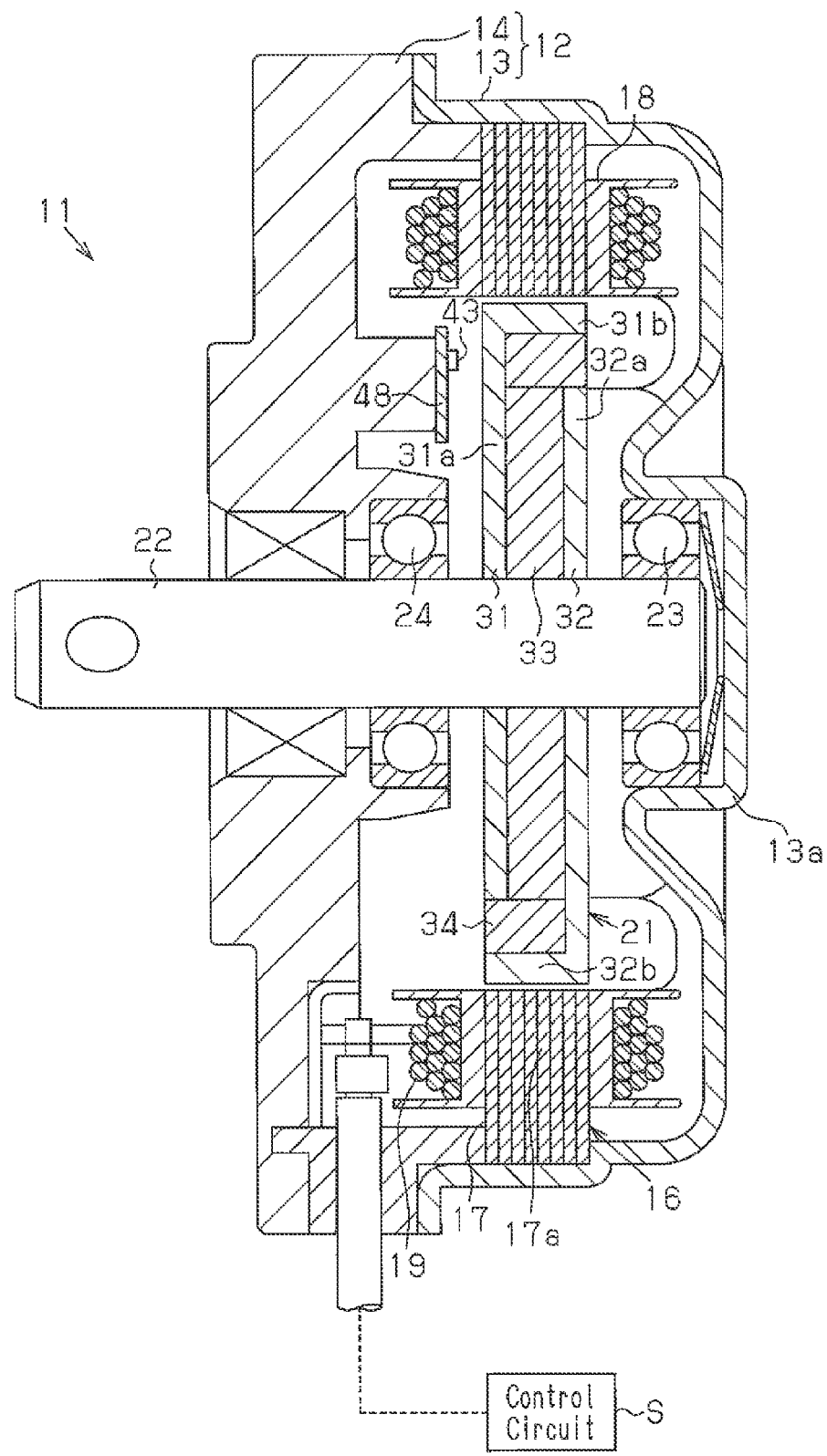
FIG. 20 is a cross-sectional view of a brushless motor according to a fourth embodiment of the present disclosure.
Figure 21:
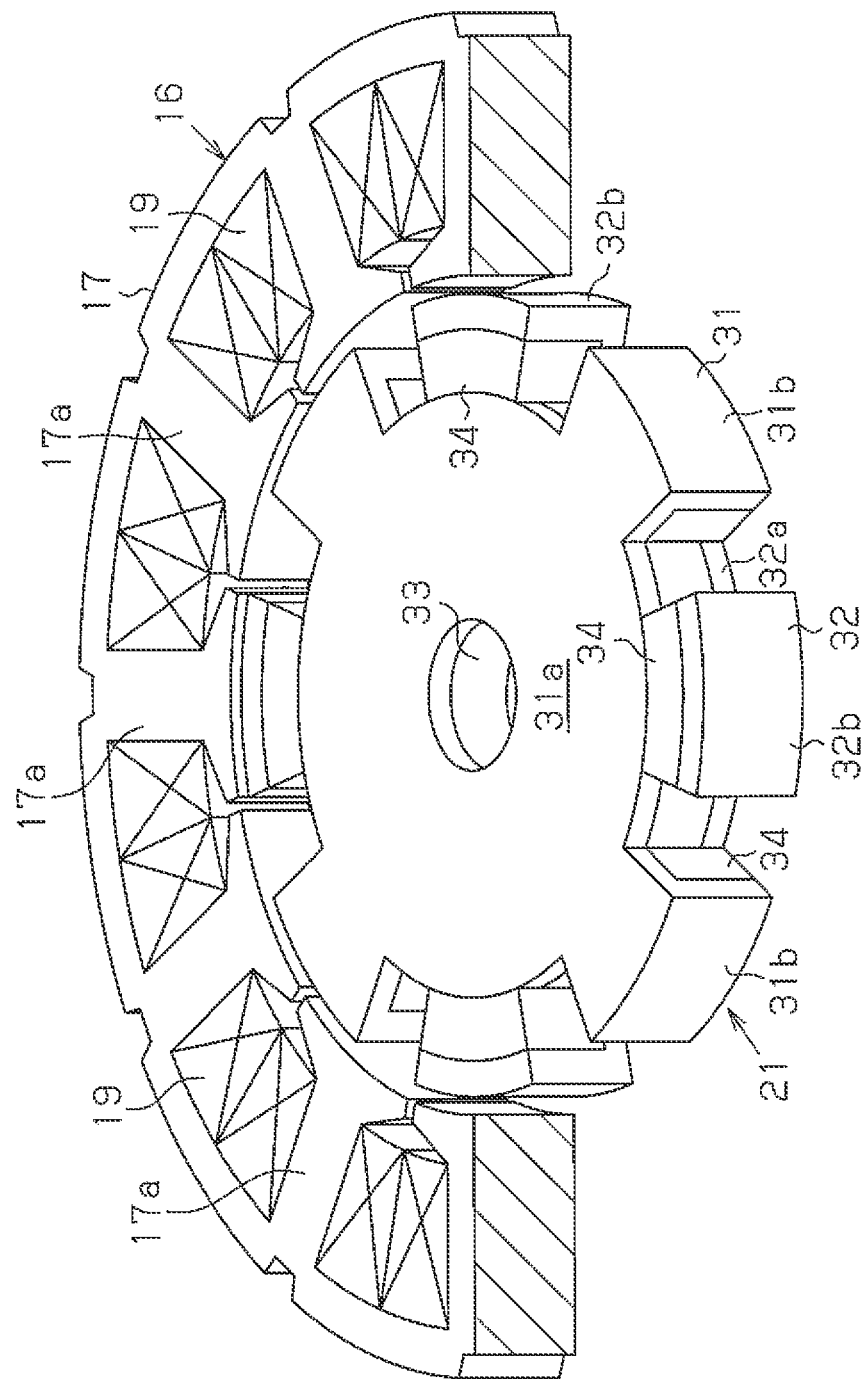
FIG. 21 is a partially cross-sectional perspective view of the brushless motor shown in FIG. 20.

As shown in FIG. 20, in a front end plate 14, a hall IC 43 serving as a magnetic sensor mounted on a substrate 48 is located at a position facing a rotor 21 in the axial direction and aligned with first and second claw-shaped magnetic pole portions 31*b* and 32*b* in a radial direction of the front end plate 14. Specifically, the hall IC 43 of the fourth embodiment is located at a position facing a part of the first claw-shaped magnetic pole portions 31*b* that projects radially outward from a first core base 31*a*. More specifically, the hall IC 43 is located so that a gap of 2 mm is formed in the axial direction between the hall IC 43 and a radial center position of where the first claw-shaped magnetic pole portions 31*b* project radially outward. The hall IC 43 outputs a High level detection signal and a Low level detection signal to a control circuit S in accordance with the direction of a magnetic flux (magnetic flux leakage from rotor 21) that passes through the hall IC 43 itself.

Next, the operation of the brushless motor 11 having the above-described structure will be described.

Figure 22A:
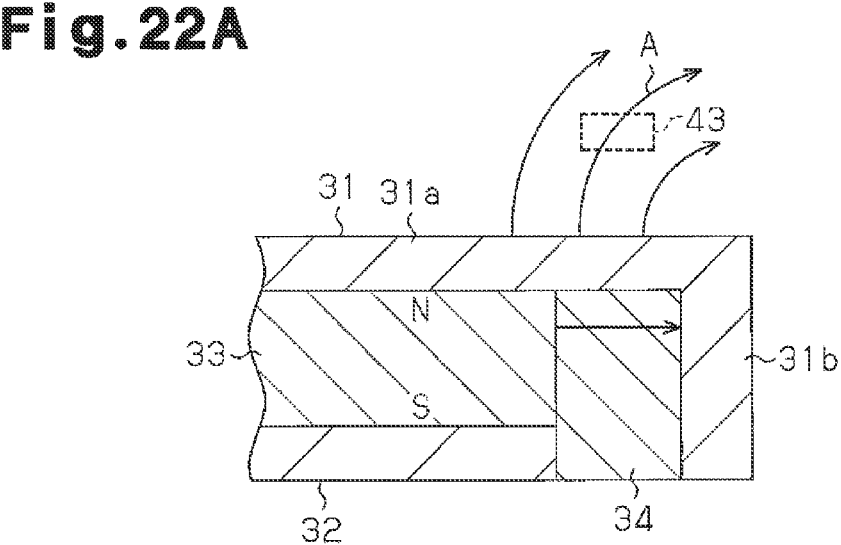
FIG. 22A is a schematic diagram illustrating the magnetic flux when a circumferential position of a first claw-shaped magnetic pole portion is aligned with a hall IC.

As shown in FIG. 22A, for example, as the rotor 21 rotates, when a circumferential position of the first claw-shaped magnetic pole portions 31*b* of the first rotor core 31 is aligned with the hall IC 43, magnetic flux leakage (magnetic flux leakage extending upward in the drawing, see arrow A) extending axially outward from an axial end surface of the first claw-shaped magnetic pole portions 31*b* passes through the hall IC 43.

Figure 22B:
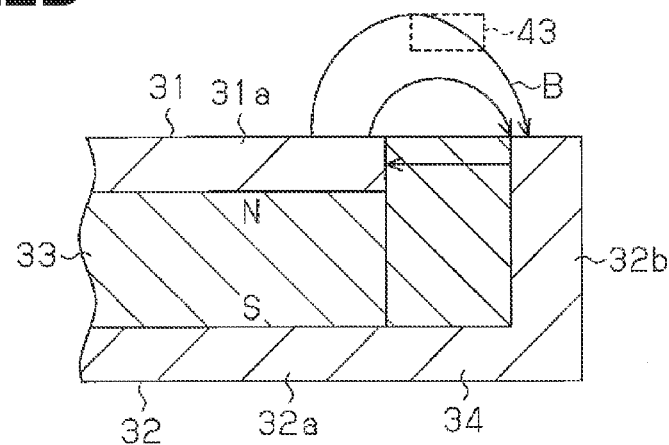
FIG. 22B is a schematic diagram illustrating the magnetic flux when a circumferential position of a second claw-shaped magnetic pole portion is aligned with the hall IC.

As shown in FIG. 22B, for example, when a circumferential position of the second claw-shaped magnetic pole portion 32*b* of the second rotor 32 is aligned with the hall IC 43, magnetic flux leakage (magnetic flux leakage extending downward in the drawings, see arrow B) which extends toward an axial end surface of the second claw-shaped magnetic pole portion 32*b* after the magnetic flux leakage extends axially outward from the axial end surface of the first core base 31*a* passes through the hall IC 43.

In this manner, in the fourth embodiment, a portion of the rotor 21 facing the hall IC 43 functions as a detected portion. More specifically, a portion of the first claw-shaped magnetic pole portions 31*b* facing the hall IC 43, portions of the first core base 31*a* and the second claw-shaped magnetic pole portion 32*b* facing the hall IC 43, and a portion of the back surface auxiliary magnets 34 facing the hall IC 43 function as the detected portions.

Figure 23:
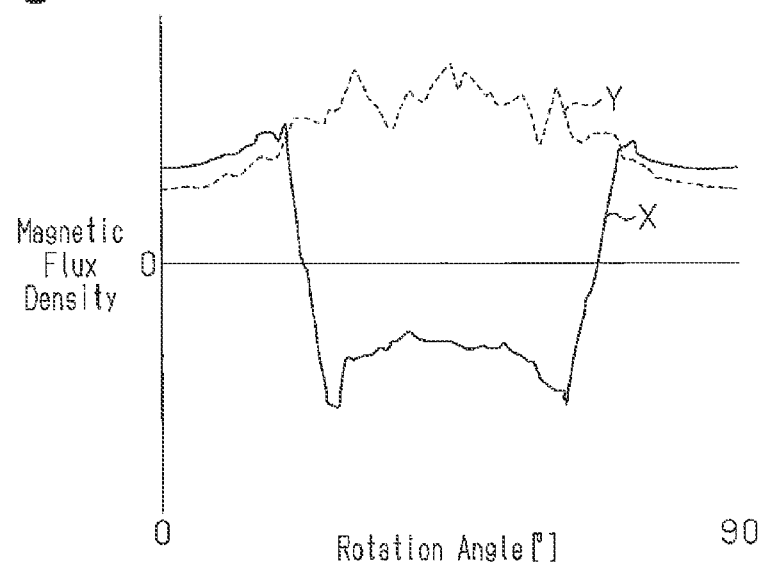
FIG. 23 is a rotation angle-magnetic flux density characteristic diagram for the fourth embodiment.

FIG. 23 shows characteristics X that are results of measurement of a magnetic flux density at a position of the hall IC 43 of the fourth embodiment. From FIG. 23, it may be understood that magnetic poles (direction of magnetic flux leakage) are switched in approximately 45° intervals. Characteristics Y are results of measurement of a magnetic flux density at a radial position facing the first core base 31*a*. In this case, it may be understood that magnetic poles (direction of magnetic flux leakage) are not switched.

Thus, in the fourth embodiment, levels of detection signals output from the hall IC 43 are switched in accordance with a rotation angle (position) of the rotor 21 and based on the detection signal, three-phase drive current switched at optimal timing is supplied from the control circuit S to the windings 19, and a rotating field is generated to continuously rotate and drive the rotor 21 in a satisfactory manner.

The advantages of the fourth embodiment in addition to above advantage (1) will now be described.

(13) The hall IC 43 is located at a position facing the rotor 21 in the axial direction and at a position aligned with the first and second claw-shaped magnetic pole portions 31*b* and 32*b* in the radial direction. Hence, the hall IC 43 can detect the rotation position of the rotor 21 without having to use a sensor magnet. In this structure, when the rotor 21 rotates, the direction of magnetic flux leakage passing through the hall IC 43 differs between when the hall IC 43 is aligned with the circumferential position of the first claw-shaped magnetic pole portions 31*b* and when the hall IC 43 is aligned with the circumferential position of the second claw-shaped magnetic pole portion 32*b*. Hence, the hall IC 43 can detect the rotation position of the rotor 21 without using a sensor magnet. Thus, the motor characteristics are not affected by a sensor magnet, and, for example, the rotor 21 may be easily designed.

The fourth embodiment may be modified as described below.

That is, a surface of the first claw-shaped magnetic pole portions 31*b* in the fourth embodiment facing the hall IC 43 may be provided with a projection.

Figure 24:
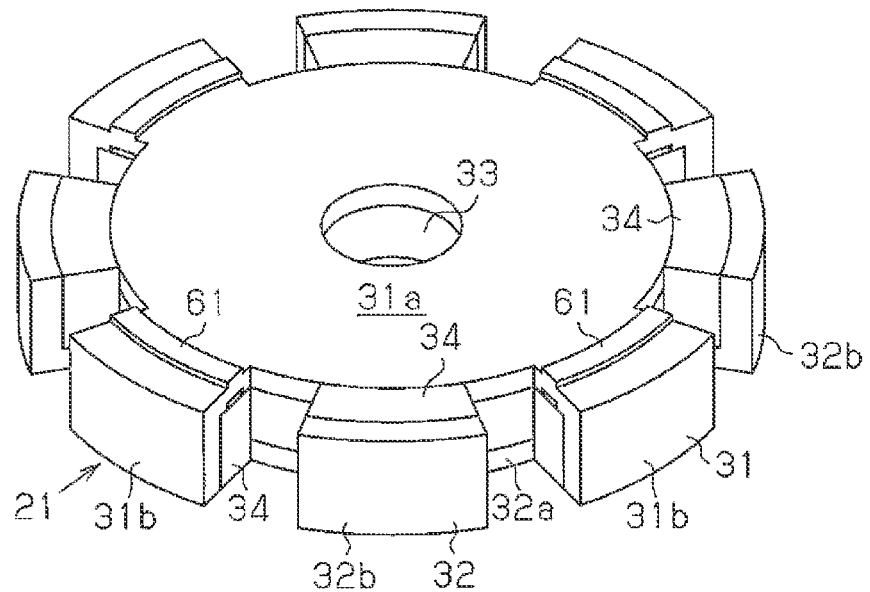
FIGS. 24 to 27 are perspective views of rotors in other examples of the fourth embodiment.

The rotor 21 may be changed as shown in FIG. 24, for example. Projections 61 of this example are integrally formed on the first claw-shaped magnetic pole portions 31*b* (first rotor core 31). The projections 61 in this example are formed through a drawing process. In the drawing processing, pressure is applied to surfaces of the first claw-shaped magnetic pole portions 31*b* that do not face the hall IC 43, and a portion of the first claw-shaped magnetic pole portions 31*b* is moved to form the projections 61.

Each of the projections 61 in this example is formed at a radial position of the first claw-shaped magnetic pole portions 31*b* facing the hall IC 43. More specifically, the projection 61 is formed at a radially center position of a portion of the first claw-shaped magnetic pole portions 31*b* that projects radially outward from the first core base 31*a*. The projection 61 in the present embodiment extends in a form of an arc from one circumferential end to another circumferential end of the first claw-shaped magnetic pole portions 31*b*.

If the projections 61 are provided in this manner, the direction of the magnetic flux leakage that passes through the hall IC 43 when a circumferential position of the projection 61 is aligned with the hall IC 43 becomes outstanding. This allows for the rotation position of the rotor 21 to be detected with further accuracy and stability.

Since the projection 61 is formed integrally with the first claw-shaped magnetic pole portions 31*b*, the number of components and assembling steps may be reduced as compared to when fixing projections as discrete members. When the projections are fixed as discrete members, the flow of magnetic flux may become unstable depending on the assembling accuracy. However, when the projections 61 are formed integrally, the flow of magnetic flux is stabilized. This allows for the rotation position of the rotor 21 to be detected with further accuracy and stability.

The projection 61 extends in a form of an arc from one circumferential end to another circumferential end of the first claw-shaped magnetic pole portions 31*b* at a radial position of the first claw-shaped magnetic pole portions 31*b* facing the hall IC 43. Hence, in a range in which a circumferential position of the first claw-shaped magnetic pole portions 31*b* is aligned with the hall IC 43, the direction of magnetic flux leakage that passes through the hall IC 43 is always outstanding.

Figure 25:
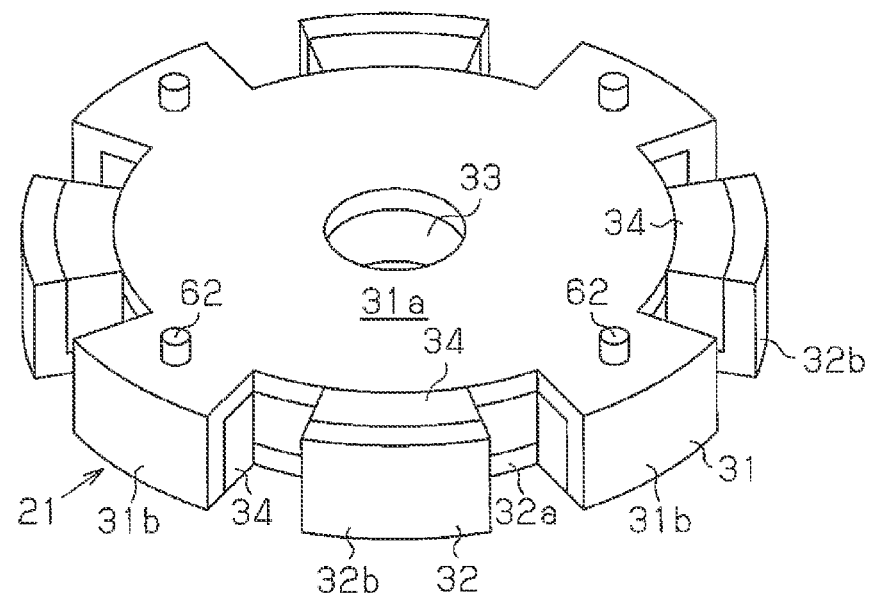

The rotor 21 may be changed as shown in FIG. 25, for example. Projections 62 in this example are fixed to the first claw-shaped magnetic pole portions 31*b* (through adhesive for example). Each of the projections 62 in this example is cylindrical, and one end of the projection 62 is fixed to a circumferentially center position of the first claw-shaped magnetic pole portions 31*b*.

Even if the projections 62 are provided in this manner, the direction of the magnetic flux leakage that passes through the hall IC 43 when a circumferential position of the projection 62 is aligned with the hall IC 43 becomes outstanding. This allows for the rotation position of the rotor 21 to be detected with further accuracy and stability.

Since the projections 62, which are discrete members, are fixed to the first claw-shaped magnetic pole portions 31*b*, the first and second rotor cores 31 and 32 may be common parts. Hence, the number of common parts can be increased as compared with a rotor (see FIG. 24 in the other example) in which projections are integrally formed on the first claw-shaped magnetic pole portions 31*b* of one of the first and second rotor cores 31 and 32. The projections 61 may also be formed integrally with the second claw-shaped magnetic pole portions 32*b* of the second rotor core 32 in the other example (see FIG. 24), and the first and second rotor cores 31 and 32 may be common parts.

Figure 26:
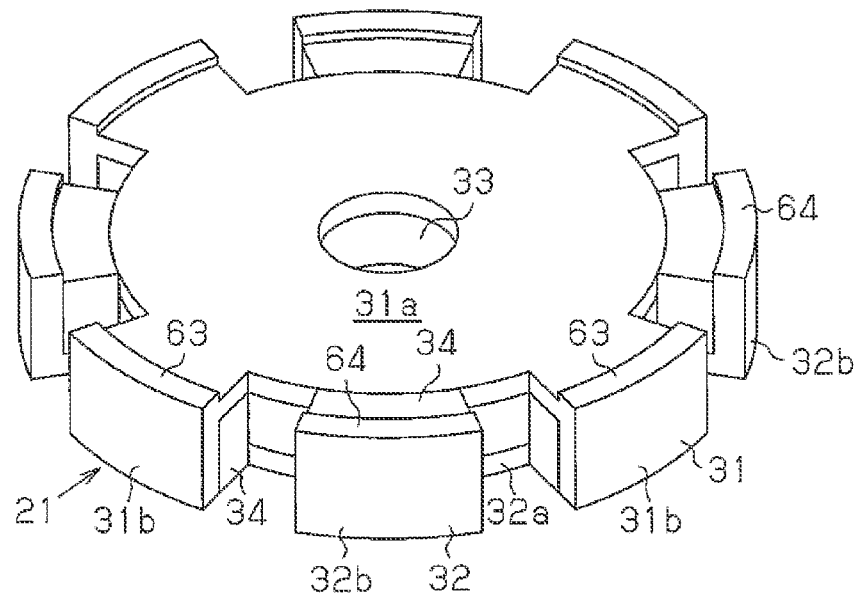

The rotor 21 may be changed as shown in FIG. 26, for example. Projections 63 and 64 in this example are formed at aligned positions in the radial direction and with portions of the first and second claw-shaped magnetic pole portions 31*b* and 32*b* that extend in the axial direction. That is, the projections 63 are located at positions aligned in the radial direction with portions of the first claw-shaped magnetic pole portions 31*b* that extend in the axial direction, and the projections 63 project to a side opposite from the portion that extends in the axial direction. The projections 64 are provided at positions aligned in the radial direction with portions of the second claw-shaped magnetic pole portions 32*b* that extend in the axial direction. Each of the projections 64 further extends from a distal end of the portion that extends and projects in the axial direction. In this example, projecting amounts, that is, heights of the projections 63 and 64 are the same. Obviously, the hall IC 43 in this example is located at a position aligned with the projections 63 and 64 in the radial direction, and at a position facing the projections 63 and 64.

If the projections 63 and 64 are provided in this manner, the direction of the magnetic flux leakage that passes through the hall IC 43 becomes outstanding due to the projections 63 and 64. This allows for the rotation position of the rotor 21 to be detected with further accuracy and stability.

Figure 27:
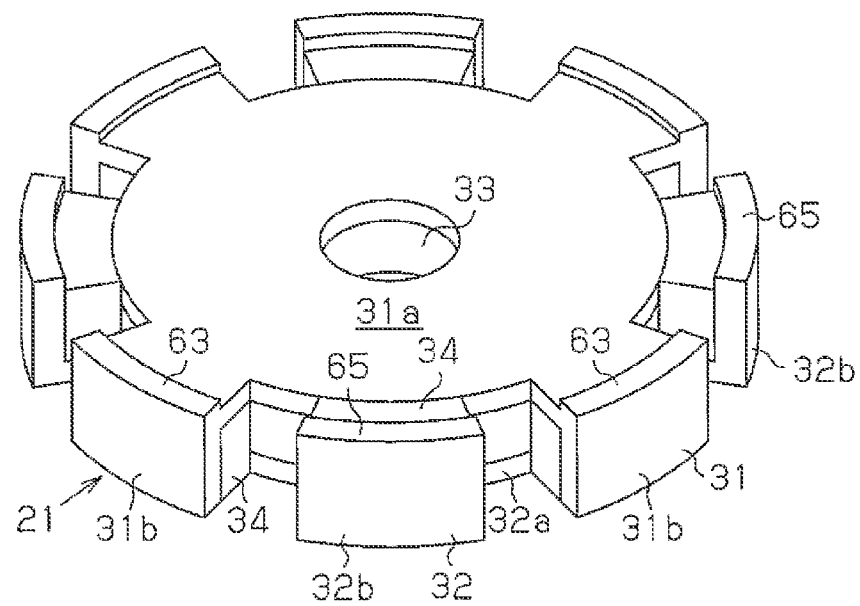

The rotor 21 may be changed as shown in FIG. 27 for example. Heights of projections 63 and 65 are not the same. This differs from the projections 63 and 64 in the other example (see FIG. 26). That is, the heights of the projections 63 differ from the heights of the projections 65 so that the magnetic flux density at the hall IC 43 is switched in a substantially uniform manner. More specifically, in this example, the heights of the projections 65 of the second claw-shaped magnetic pole portions 32*b*, located on the side of the rotor 21 that does not face the hall IC 43 and function as south poles, are higher than the projections 63 of the first claw-shaped magnetic pole portions 31*b*, which function as north poles.

Figure 28:
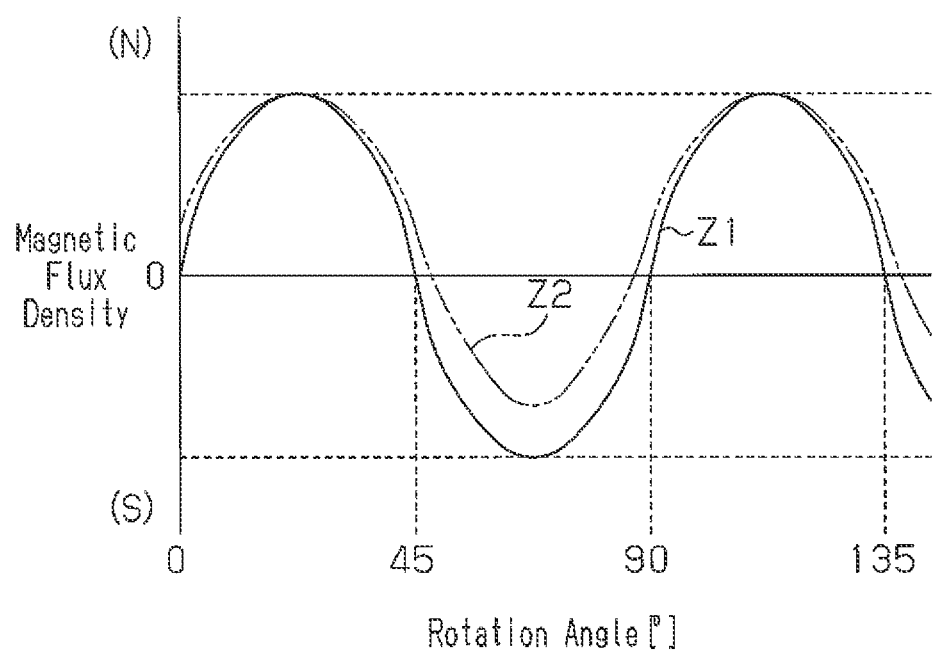
FIG. 28 is a rotation angle-magnetic flux density characteristic diagram of the further example shown in FIG. 27.

According to this structure, as shown by diagrammatic characteristics Z1 in FIG. 28, magnetic poles of the magnetic flux density (direction of magnetic flux leakage) are substantially switched in 45° intervals at the position of the hall IC 43, and the amplitude of the magnetic flux density becomes substantially uniform. Diagrammatic characteristics Z2 in FIG. 28 show the magnetic flux density of the other example (see FIG. 26) including projections 63 and 64 having constant heights. That is, when the projections 63 and 64 having the same heights are used as shown in FIG. 26, magnetic flux density at the hall IC 43 is not uniformly switched. This differs from the diagrammatic characteristics Z2. In this case, if the projections 63 and 65 have different heights as shown in FIG. 27, the magnetic flux density at the hall IC 43 is switched in a substantially uniform manner (with a uniform amplitude in equal angular intervals). This allows for drive current to be supplied to the windings 19 of the stator 16 at a further optimal timing based on the detection signal of the hall IC 43.

Although not particularly mentioned in the description of the fourth embodiment, the first and second rotor cores 31 and 32 may be formed by undergoing a forging process or a pressing process. The first and second rotor cores 31 and 32 may also be formed by laminating a plurality of core sheets in the axial direction. The projections 63 to 65 may be formed integrally by undergoing a forging process or a pressing process. The projections 63 to 65 may also be formed by laminating a plurality of projection core sheets in the axial direction.

In the fourth embodiment, the hall IC 43 is arranged so that the gap of 2 mm is formed in the axial direction between the hall IC 43 and a radially center position of a portion of the first claw-shaped magnetic pole portions 31b that projects radially outward from the first core base 31a. However, the position of the hall IC 43 and a size of the gap may be changed as long as the hall IC 43 is located at a position facing the rotor 21 in the axial direction and at a position aligned with the first and second claw-shaped magnetic pole portions 31b and 32b in the radial direction. For example, the hall IC 43 may be located at a position aligned in the radial direction with portions of the first and second claw-shaped magnetic pole portions 31b and 32b that extend in the axial direction. Alternatively, the hall IC 43 may be arranged so that a gap of 1 mm is formed between the hall IC 43 and the first claw-shaped magnetic pole portions 31b in the axial direction. The size of the gap may also be 3 mm.

In the fourth embodiment, the rotor 21 includes the back surface auxiliary magnets 34 which are located radially inward from the first and second claw-shaped magnetic pole portions 31b and 32b and magnetized in the radial direction. However, the rotor 21 does not have to include the back surface auxiliary magnets 34.

The rotor 21 of the fourth embodiment may include an interpolar magnet located between the first and second claw-shaped magnetic pole portions 31b and 32b in the circumferential direction and magnetized in the circumferential direction.

A brushless motor of a fifth embodiment will now be described in accordance with FIGS. 29 to 36.

Figure 29:
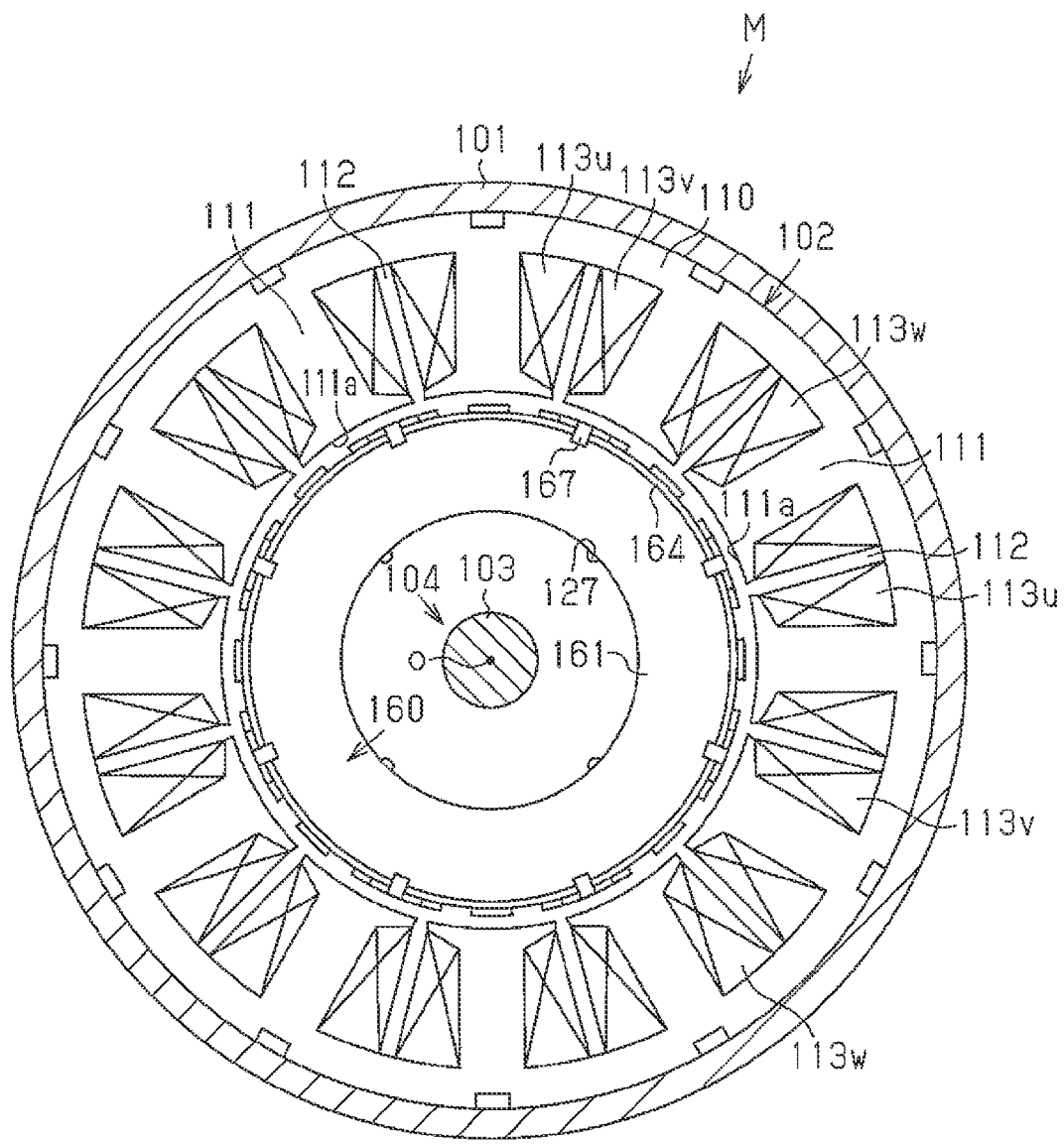
FIG. 29 is a cross-sectional view of a brushless motor according to a fifth embodiment of the present disclosure as viewed from an axial direction of the motor.

As shown in FIG. 29, a brushless motor M includes a motor housing 101, and a stator 102 is fixed to an inner circumferential surface of the motor housing 101. A rotor 104 having a so-called Lundell-type structure is arranged in the stator 102 and fixed to a rotation shaft 103 to rotate integrally with the rotation shaft 103. The rotation shaft 103 is a stainless steel shaft made of non-magnetic material, and the rotation shaft 103 is supported by bearings (not shown) provided on the motor housing 101 so that the rotation shaft 103 is rotatable relative to the motor housing 101.

The stator 102 includes a cylindrical stator core 110, and an outer circumferential surface of the stator core 110 is fixed to an inner surface of the motor housing 101. A plurality of teeth 111 are formed at an inner side of the stator core 110 in the axial direction. The teeth 111 are arranged in the circumferential direction at an equal pitch. The teeth 111 extend radially inward. Each tooth 111 is T-shaped, and an inner circumferential surface 111a of the tooth 111 in the radial direction is arcuate and extends in the axial direction about a center axis O of the rotation shaft 103.

Slots 112 are formed between the teeth 111. In the fifth embodiment, the number of teeth 111 is twelve, and the number of slots 112 is also twelve like the teeth 111. Three-phase windings, namely, U-phase windings 113u, V-phase windings 113v, and W-phase windings 113w are sequentially wound as concentrated windings around the twelve teeth 111 in the circumferential direction.

Three-phase power-supply voltage is applied to the wound three-phase windings 113u, 113v and 113w to form a rotating field in the stator 102, and the rotor 104 fixed to the rotation shaft 103 located in the stator 102 is rotated in the forward direction (clockwise direction in FIG. 29) and the reverse direction (counterclockwise direction in FIG. 29).

Figure 30:
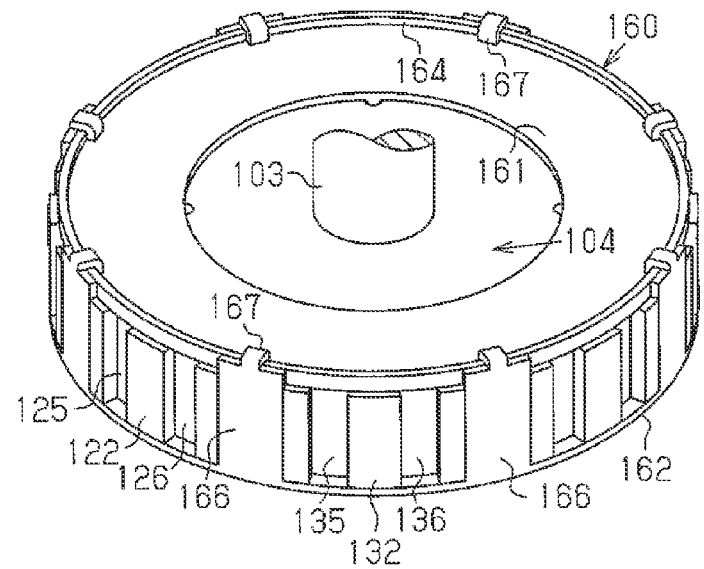
FIG. 30 is a perspective view of a rotor shown in FIG. 29 to which a rotor cover is attached.
Figure 31:
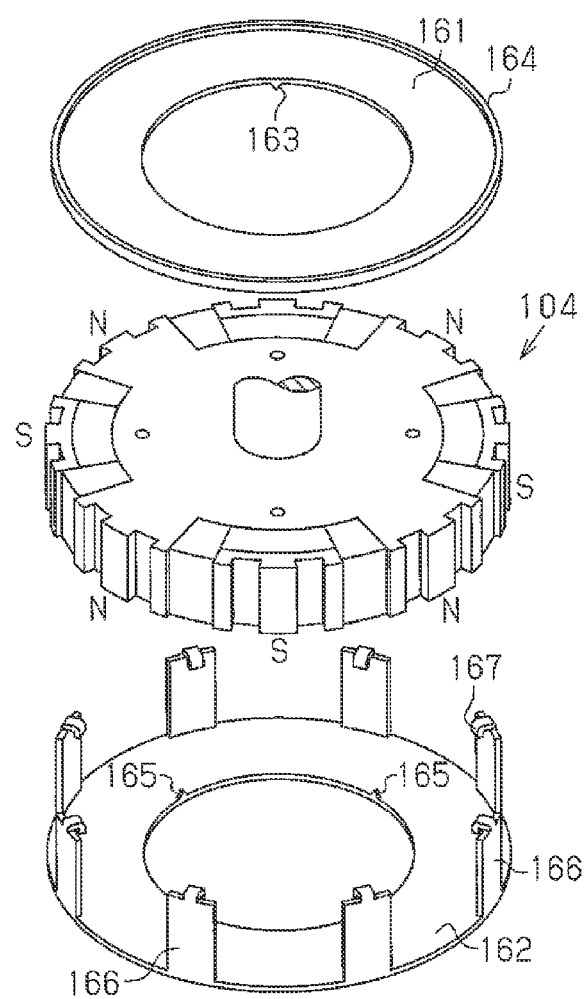
FIG. 31 is an exploded perspective view of the rotor cover shown in FIG. 30.

As shown in FIGS. 32A to 35, the rotor 104 located in the stator 102 includes first and second rotor cores 120 and 130 and a field magnet 140. As shown in FIGS. 30 and 31, a rotor cover 160 is attached to the rotor 104.

Figure 35:
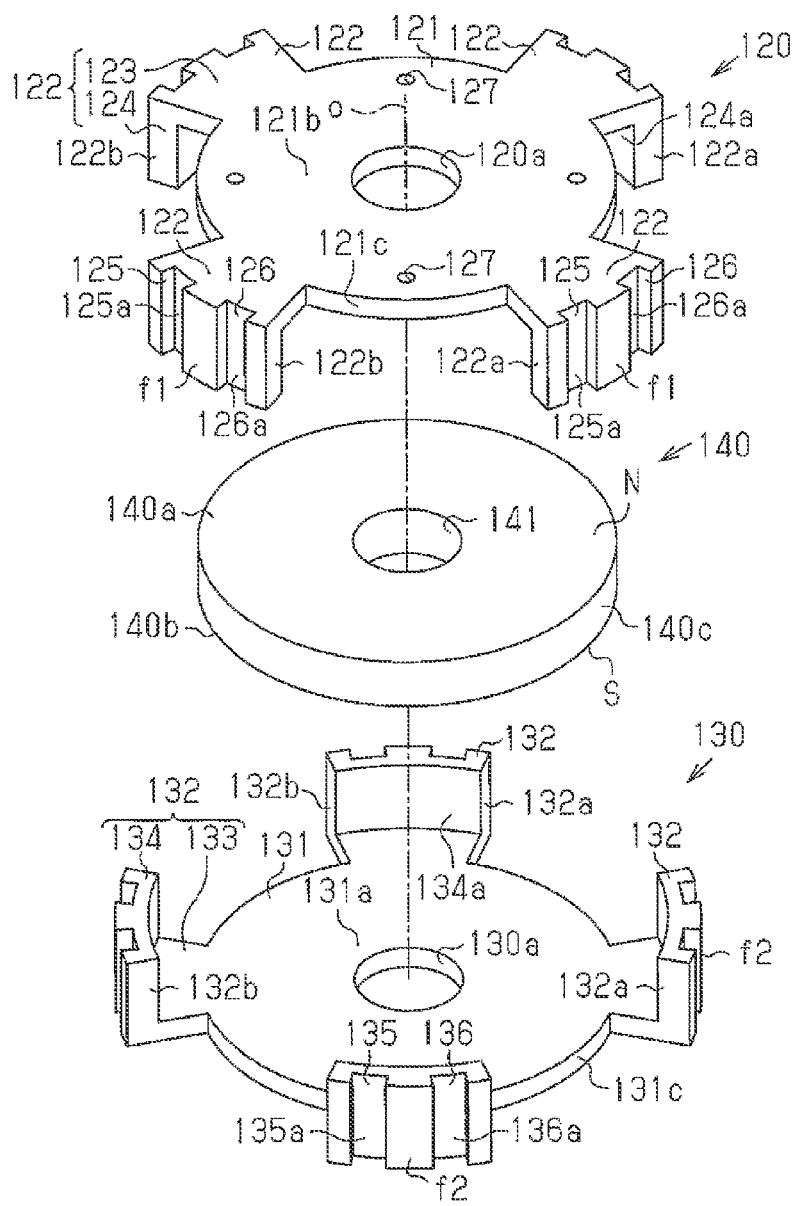
FIG. 35 is an exploded perspective view of the rotor shown in FIG. 31 without an interpolar magnet and a back surface auxiliary magnet.

As shown in FIG. 35, the first rotor core 120 includes a disk-shaped first core base 121 made of magnetic steel sheet which is soft magnetic material. A through hole 120a is formed in the first core base 121. The rotation shaft 103 is inserted through and fixed to the through hole 120a. A plurality of (four in fifth embodiment) first claw-shaped magnetic pole portions 122 project radially outward from an outer circumferential surface 121c of the first core base 121 at equal intervals. The first claw-shaped magnetic pole portions 122 extend in the axial direction. Here, a portion of each of the first claw-shaped magnetic pole portions 122 that project radially outward from the outer circumferential surface 121c of the first core base 121 is referred to as a first base portion 123, and a distal end of the first claw-shaped magnetic pole portion 122 bent in the axial direction is referred to as a first magnetic pole portion 124.

Two circumferential end surfaces 122a and 122b of the first claw-shaped magnetic pole portion 122 formed by the first base portion 123 and the first magnetic pole portion 124 are radially extending flat surfaces (not inclined relative to radial direction as viewed from axial direction). The angle of each of the first claw-shaped magnetic pole portions 122 in the circumferential direction, that is, the angle between the two end surfaces 122a and 122b in the circumferential direction is set to be smaller than the angle of a gap between adjacent ones of the first claw-shaped magnetic pole portions 122 in the circumferential direction.

The cross-section of a radially outer surface f1 of the first magnetic pole portion 124 in a direction perpendicular to the axis has an arcuate shape extending about the center axis O of the rotation shaft 103, and the radially outer surface f1 has two grooves, namely, a first auxiliary groove 125 and a second auxiliary groove 126.

Figure 33:
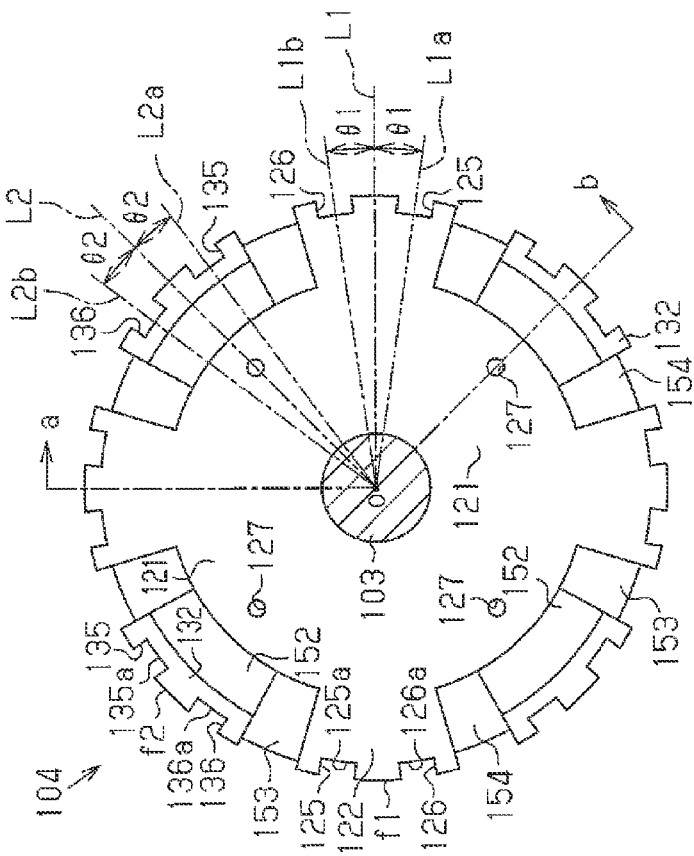
FIG. 33 is a front view of the rotor shown in FIG. 31 as viewed in the axial direction.

More specifically, as shown in FIG. 33, a straight line extending from the center axis O of the rotation shaft 103 and through a circumferentially intermediate position of the radially outer surface f1 of the first magnetic pole portion 124 is defined as a center line L1. Straight lines extending from the center axis O and extending through positions separated from the center line L1 by an angle $\theta 1$ in a clockwise direction and a counterclockwise direction are defined as a first straight line L1a and a second straight line L1b, respectively.

Here, angle $\theta 1$ was obtained using the following equation based on a cogging torque cycle (angle $\phi$)

$$\theta 1 = (\frac{1}{2} + n) \times \phi$$

Here, n represents an integer and, in the present embodiment, n=0.

The cycle $\phi$ of the cogging torque is a value obtained by dividing 360° by a least common multiple of the number of magnetic poles of the rotor 104 and the number of slots of the stator 102.

Here, the number of magnetic poles of the rotor 104 is eight and the number of slots of the stator 102 is twelve. Thus, the least common multiple is 24. The cycle $\phi$ of the cogging torque is 15 (=360/24) degrees.

Accordingly, angle $\theta 1$ is 7.5 (=15/2) degrees.

The first straight line L1a and the second straight line L1b extend through positions deviated from the center line L1 by 7.5° in the clockwise direction and the counterclockwise direction. Grooves having constant widths are formed in the radially outer surface f1, and the first straight line L1a and the second straight line L1b are circumferentially intermediate positions of the grooves.

The groove having the circumferentially intermediate position corresponding to the first straight line L1a is the first auxiliary groove 125, and the groove having the circumferentially intermediate position corresponding to the second straight line L1b is the second auxiliary groove 126. Therefore, an angle between the first auxiliary groove 125 and the second auxiliary groove 126 about the center axis O of the rotation shaft 103 conforms to the cycle φ=(15°) of the cogging torque.

That is, an angle between the center line L1 and the first straight line L1a and an angle between the center line L1 and the second straight line L1b are equal to one half a cycle (=7.5°) of the cogging torque, and the first auxiliary groove 125 and the second auxiliary groove 126 are formed at symmetric positions relative to the center line L1, which serves as a symmetric axis.

Cross-sections of the first and second auxiliary grooves 125 and 126 in a direction perpendicular to the axis are U-shaped, and the bottom surfaces 125a and 126a are flat. The bottom surfaces 125a and 126a are formed right angles relative to side surfaces extending radially outward from two sides of the bottom surfaces 125a and 126a.

Therefore, since the bottom surfaces 125a and 126a of the first and second auxiliary grooves 125 and 126 are flat, the cross-sectional shape in the direction perpendicular to the axis is not arcuate about the center axis O of the rotation shaft 103. As a result, the cross-sectional shape of the radially outer surface f1 including the bottom surfaces 125a and 126a of the first and second auxiliary grooves 125 and 126 of the first magnetic pole portion 124 in the direction perpendicular to the axis is not circular about the center axis O of the rotation shaft 103 as a whole.

Figure 32A:
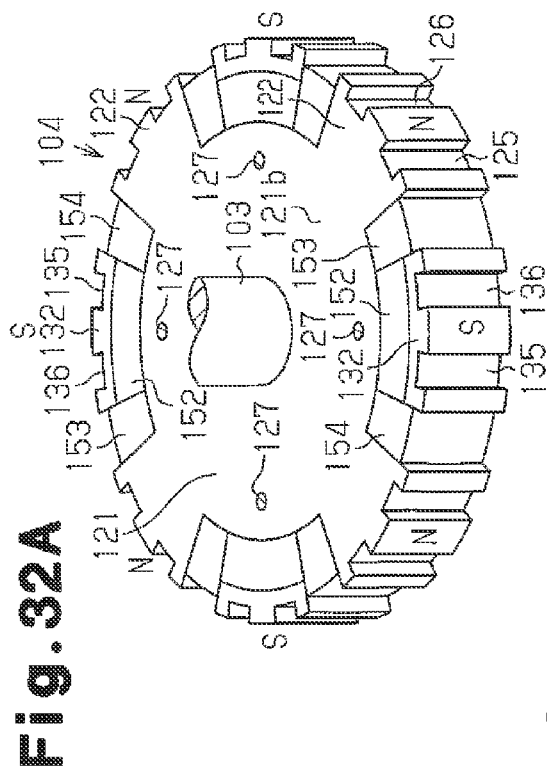
FIG. 32A is a perspective view of the rotor shown in FIG. 31 as viewed from a first rotor core.

As shown in FIGS. 32A and 35, four positioning engagement holes (first engagement holes) 127 are arranged at equal angular intervals in a non-facing surface 121b of the first core base 121 along a circle extending about the center axis O. The four positioning engagement holes 127 are formed at intermediate positions between adjacent first claw-shaped magnetic pole portions 122 formed on the first core base 121.

As shown in FIG. 35, a second rotor core 130 is made of the same material as that of the first rotor core 120 and has the same shape as that of the first rotor core 120. The second rotor core 130 has a disk-shaped second core base 131. A through hole 130a to which the rotation shaft 103 is inserted and fixed is formed in the second core base 131. Four second claw-shaped magnetic pole portions 132 project radially outward from an outer circumferential surface 131c of the second core base 131 at equal intervals. The second claw-shaped magnetic pole portions 132 extend in the axial direction. Here, a portion of each of the second claw-shaped magnetic pole portions 132 which projects radially outward from the outer circumferential surface 131c of the second core base 131 is referred to as a second base portion 133, and a distal end of the second claw-shaped magnetic pole portion 132 which is bent in the axial direction is referred to as a second magnetic pole portion 134.

Circumferential end surfaces 132a and 132b of the second claw-shaped magnetic pole portions 132 formed by the second base portion 133 and the second magnetic pole portion 134 are flat surfaces that extend in the radial direction. The angle between the second claw-shaped magnetic pole portions 132 in the circumferential direction, that is, the angle between the circumferential end surfaces 132a and 132b is set to be smaller than the angle of a gap between adjacent ones of the second claw-shaped magnetic pole portions 132 in the circumferential direction.

A radially outer surface f2 of the second magnetic pole portion 134 has a cross-section shape in a direction perpendicular to the axis that is arcuate and extends about the center axis O of the rotation shaft 103. The radially outer surface f2 includes two grooves, namely, a first auxiliary groove 135 and a second auxiliary groove 136.

More specifically, as shown in FIG. 33, a straight line extending from the center axis O of the rotation shaft 103 and through a circumferentially intermediate position of the radially outer surface f2 of the second magnetic pole portion 134 is defined as a center line L2. Straight lines extending from the center axis O and extending through positions separated from the center line L2 by an angle θ2 in the clockwise direction and the counterclockwise direction is defined as a first straight line L2a and a second straight line L2b. Here, the angle θ2 was obtained using the following equation based on a cogging torque cycle φ like the above-described example $$\theta 2=(\tfrac{1}{2}+n)\times\phi$$

Here, n represents an integer and, in the present embodiment, n=0. The cogging torque cycle φ is 15 (=360/24) degrees like in the above-described example.

Therefore, angle θ2 is 7.5 (=15/2) degrees like angle θ1.

The first straight line L2a and the second straight line L2b extend through positions deviated from the center line L2 by 7.5° in the clockwise direction and the counterclockwise direction. Grooves having constant widths are formed in the radially outer surface f2 in the axial direction, with the first straight line L2a and the second straight line L2b at circumferentially intermediate positions.

The groove having the circumferentially intermediate position corresponding to the first straight line L2a is the first auxiliary groove 135, and the groove having the circumferentially intermediate position corresponding to the second straight line L2b is the second auxiliary groove 136. Therefore, the angle between the first auxiliary groove 135 and the second auxiliary groove 136 about the center axis O of the rotation shaft 103 conforms to the cogging torque cycle φ (=15 degrees).

That is, the angle between the center line L2 and the first straight line L2a and the angle between the center line L2 and the second straight line L2b are equal to one half of a cogging torque cycle (=7.5 degrees), and the first auxiliary groove 135 and the second auxiliary groove 136 are formed at symmetric positions relative to the center line L2, which serves as a symmetric axis.

Cross-section shapes of the first and second auxiliary grooves 135 and 136 in a direction perpendicular to the axis are U-shaped, and the bottom surfaces 135a and 136a are flat. The bottom surfaces 135a and 136a are formed at right angles relative to side surfaces extending radially outward from two sides of the bottom surfaces 135a and 136a.

Therefore, since the bottom surfaces 135a and 136a of the first and second auxiliary grooves 135 and 136 are flat, the cross-sectional shape in the direction perpendicular to the axis is not arcuate about the center axis O of the rotation shaft 103. As a result, the cross-sectional shape of the radially outer surface f2 including the bottom surfaces 135a and 136a of the first and second auxiliary grooves 135 and 136 of the second magnetic pole portion 134 in the direction perpendicular to the axis is not circular about the center axis O of the rotation shaft 103 as a whole.

Figure 32B:
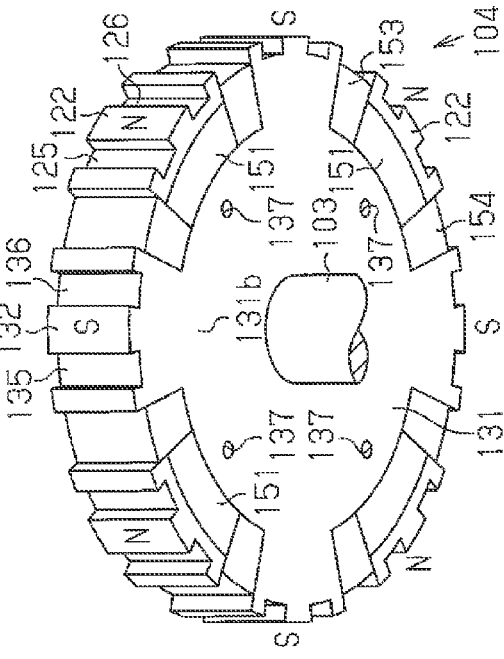
FIG. 32B is a perspective view of the rotor shown in FIG. 31 as viewed from a second rotor core.

As shown in FIG. 32B, four positioning engagement holes (second engagement holes) 137 are arranged at equal angular intervals in a non-facing surface 131b of the second core base 131 along a circle extending about the center axis O. The four positioning engagement holes 137 are formed between intermediate positions of adjacent ones of the second claw-shaped magnetic pole portions 132 in the second core base 131.

The second claw-shaped magnetic pole portions 132 of the second rotor core 130 are located between the corresponding first claw-shaped magnetic pole portions 122. Here, the second rotor core 130 is coupled to the first rotor core 120 so that the field magnet 140 (see FIG. 34) is located (sandwiched) between the first core base 121 and the second core base 131 in the axial direction.

Figure 34:
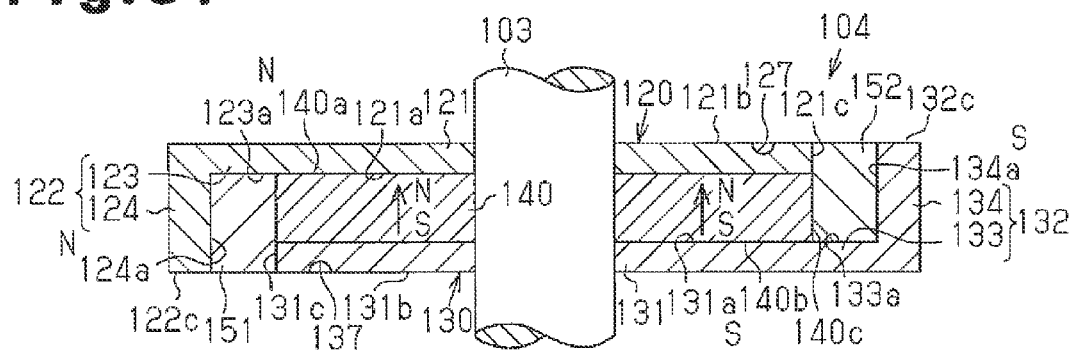
FIG. 34 is a combined cross-sectional view taken along line a-o-b in FIG. 33.

As shown in FIGS. 34 and 35, the field magnet 140 sandwiched between the first rotor core 120 and the second rotor core 130 is a disk-shaped permanent magnet formed by a neodymium magnet.

As shown in FIG. 35, a through hole 141 is formed in a central position of the field magnet 140, and the rotation shaft 103 extends through the through hole 141. One side surface 140a of the field magnet 140 abuts against a facing surface 121a of the first core base 121, another side surface 140b of the field magnet 140 abuts against a facing surface 131a of the second core base 131, and the field magnet 140 is sandwiched and fixed between the first rotor core 120 and the second rotor core 130.

An outer diameter of the field magnet 140 conforms to outer diameters of the first and second core bases 121 and 131, and a thickness of the field magnet 140 is set to a predetermined thickness.

Specifically, as shown in FIG. 34, when the field magnet 140 is located between the first rotor core 120 and the second rotor core 130, a distal end surface 122c of the first claw-shaped magnetic pole portion 122 (first magnetic pole portion 124) is flush with a non-facing surface 131b of the second core base 131. In the same manner, a distal end surface 132c of the second claw-shaped magnetic pole portion 132 (second magnetic pole portion 134) is flush with a non-facing surface 121b of the first core base 121 are flush. Further, an outer circumferential surface 140c of the field magnet 140 is flush with outer circumferential surfaces 121c and 131c of the first and second core bases 121 and 131.

As shown in FIG. 34, the field magnet 140 is magnetized in the axial direction so that a side of the field magnet 140 closer to the first rotor core 120 is the north pole (first magnetic pole) and a side of the field magnet 140 closer to the second rotor core 130 is the south pole (second magnetic pole). Therefore, due the field magnet 140, the first claw-shaped magnetic pole portions 122 of the first rotor core 120 function as north poles (first magnetic poles) by the field magnet 140, and the second claw-shaped magnetic pole portions 132 of the second rotor core 130 function as south poles (second magnetic poles).

Therefore, the rotor 104 of the present embodiment is a rotor having a so-called Lundell-type structure that uses the field magnet 140. In the rotor 104, the first claw-shaped magnetic pole portions 122 that become north poles and the second claw-shaped magnetic pole portions 132 that become south poles are alternately arranged in the circumferential direction. The number of magnetic poles of the rotor 104 is eight.

As shown in FIG. 34, a first back surface auxiliary magnet 151 is arranged in a space formed by a back surface 124a (radially inner surface) of the first magnetic pole portion 124, the outer circumferential surface 131c of the second core base 131, the outer circumferential surface 140c of the field magnet 140, and a surface 123a of the first base portion 123 at the side of the second rotor core 130.

A cross-section of the first back surface auxiliary magnet 151 in a direction perpendicular to the axis has a sectoral shape that is substantially rectangular parallelepiped. To reduce magnetic flux leakage at this portion, the first back surface auxiliary magnet 151 is magnetized in the radial direction so that a portion of the auxiliary magnet 151 abutting against the back surface 124a of the first claw-shaped magnetic pole portions 122 (first magnetic pole portion 124) becomes the north pole that is the same as the first claw-shaped magnetic pole portion 122, and a portion of the auxiliary magnet 151 abutting against the second core base 131 becomes the south pole that is the same as the second core base 131.

As shown in FIG. 34, a second back surface auxiliary magnet 152 is located in a space formed by a back surface 134a (radially inner surface) of the second magnetic pole portion 134, the outer circumferential surface 121c of the first core base 121, the outer circumferential surface 140c of the field magnet 140, and a surface 133a of the second base portion 133 at the side of the first rotor core 120.

A cross-section of the second back surface auxiliary magnet 152 in a direction perpendicular to the axis has a sectoral shape that is substantially rectangular parallelepiped. To reduce magnetic flux leakage at this portion, the second back surface auxiliary magnet 152 is magnetized in the radial direction so that a portion of the auxiliary magnet 152 abutting against the back surface 134a of the second claw-shaped magnetic pole portions 132 (second magnetic pole portion 134) becomes the south pole that is the same as the second claw-shaped magnetic pole portion 132, and a portion of the auxiliary magnet 152 abutting against the first core base 121 becomes the north pole that is the same as the first core base 121.

First and second interpolar magnets 153 and 154 are arranged in the circumferential direction between the first claw-shaped magnetic pole portion 122 where the first back surface auxiliary magnet 151 is located and the second claw-shaped magnetic pole portion 132 where the second back surface auxiliary magnet 152 is located. Cross-sections of the first and second interpolar magnets 153 and 154 in the direction perpendicular to the axis have sectoral shapes that are substantially rectangular parallelepiped.

More specifically, the first interpolar magnet 153 is located between a flat surface that is formed by a circumferential end surface 122a of the first claw-shaped magnetic pole portion 122 and a circumferential end surface of the first back surface auxiliary magnet 151 and a flat surface that is formed by a circumferential end surface 132b of the second claw-shaped magnetic pole portion 132 and a circumferential end surface of the second back surface auxiliary magnet 152.

In the same manner, the second interpolar magnet 154 is located between a flat surface that is formed by a circumferential end surface 122b of the first claw-shaped magnetic pole portion 122 and a circumferential end surface of the first back surface auxiliary magnet 151 and a flat surface that is formed by the circumferential end surface 132a of the second claw-shaped magnetic pole portion 132 and a circumferential end surface of the second back surface auxiliary magnet 152.

The first and second interpolar magnets 153 and 154 are magnetized in the circumferential direction so that they have the same magnetic poles as the first and second claw-shaped magnetic pole portions 122 and 132 (first claw-shaped magnetic pole portion 122 becomes north pole and second claw-shaped magnetic pole portion 132 becomes south pole).

The rotor cover 160 is attached to the rotor 104 which is assembled as described above.

As shown in FIGS. 30 and 31, the rotor cover 160 is includes a first plate 161 located at the side of the first rotor core 120 (axially outer surface) and a second plate 162 located at the side of the second rotor core 130 (axially outer surface). The first plate 161 and second plate 162 are both made of non-magnetic material and, in the present embodiment, made of brass.

The first plate 161 is formed to have a circular-shape. An inner diameter of the first plate 161 is set to be the same as a diameter of a circle extending about the center axis O through a center position of the four positioning engagement holes 127 in the non-facing surface 121b of the first core base 121. Four first engagement hooks 163 are arranged on an inner circumferential edge of the first plate 161 at equal intervals extending toward the first rotor core 120. An outer diameter of the first plate 161 is set to have the same diameter as a circle about the center axis O extending through an outer circumferential surface of the second interpolar magnet 154 facing the first plate 161 across the coupled rotation shaft 103.

The first engagement hooks 163 are respectively fitted into the positioning engagement holes 127 formed in the non-facing surface 121b of the first core base 121. At this time, the first plate 161 abuts against a circumferential portion of the non-facing surface 121b of the first core base 121 and abuts against the second back surface auxiliary magnet 152 and outer surfaces of the first and second interpolar magnets 153 and 154 at the side of the first core base 121.

An engagement flange (flange portion) 164 is formed on an outer circumferential edge of the first plate 161 extending in a direction opposite to the first engagement hook 163.

The second plate 162 is formed to have the shape of an annular plate. An inner diameter of the second plate 162 is set to be the same as a diameter of a circle about the center axis O extending through a center position of the four positioning engagement holes 137 in the non-facing surface 131b of the second core base 131. Four second engagement hooks 165 are formed on an inner circumferential edge of the second plate 162 at equal intervals extending toward the second rotor core 130. An outer diameter of the second plate 162 is set to be the same as a diameter of a circle about the center axis O extending through an outer circumferential surface of the first interpolar magnet 153, which faces the second plate 162 across the assembled rotation shaft 103.

The second engagement hooks 165 are respectively fitted into the positioning engagement holes 137 in the non-facing surface 131b of the second core base 131. At this time, the second plate 162 abuts against a circumferential portion of the non-facing surface 131b of the second core base 131 and against the first back surface auxiliary magnet 151 and outer surfaces of the first and second interpolar magnets 153 and 154 at the side of the second core base 131.

Eight fixing members 166 (first fixing members) are formed on an outer circumferential edge of the second plate 162 so that the fixing members 166 extend in the same direction as the second engagement hooks 165. When the second engagement hooks 165 of the second plate 162 are fitted into the positioning engagement holes 137 of the second core base 131, the eight fixing members 166 are located between the first magnetic pole portions 124 of the first claw-shaped magnetic pole portions 122 and the second magnetic pole portions 134 of the second claw-shaped magnetic pole portions 132.

Each of the fixing members 166 extends toward the first plate 161 in the axial direction to where the engagement flange 164 of the first plate 161 is located. At this time, a radially inner surface of each of the fixing members 166 covers an entire radially outer surface of the first interpolar magnet 153 or the second interpolar magnet 154, which is coupled between the first magnetic pole portion 124 of the first claw-shaped magnetic pole portion 122 and the second magnetic pole portion 134 of the second claw-shaped magnetic pole portion 132.

As shown in FIG. 31, a swaging hook (coupling hook) 167 is provided on a distal end of each of the fixing members 166. As shown in FIG. 30, the swaging hook 167 is swaged and engaged with the engagement flange 164 of the first plate 161 to couple the first plate 161 and the second plate 162 to each other. This couples the rotor cover 160 to the rotor 104. FIG. 31 shows the swaging hooks 167 in a swaged state. However, the swaging hooks 167 extend in the axial direction before being swaged.

Next, the operation of the fifth embodiment having the above-described structure will be described.

In the brushless motor M, when three-phase power-supply voltage is applied to the three-phase windings 113u, 113v and 113w of the stator core 110 to form a rotating field in the stator 102, the rotor 104, which is fixed to the rotation shaft 103 and arranged in the stator 102, is rotated by the rotating field.

Since the two side surfaces of the rotor 104 in the axial direction are covered by the first plate 161 and the second plate 162 of the rotor cover 160, the first and second interpolar magnets 153 and 154 and the first and second back surface auxiliary magnets 151 and 152 do not pop out in the axial direction when the rotor 104 rotates.

In addition, the fixing members 166 of the rotor cover 160 press the radially outer surfaces of the corresponding first and second interpolar magnets 153 and 154. Thus, even when a centrifugal force produced by rotation is applied to the first and second interpolar magnets 153 and 154, the first and second interpolar magnets 153 and 154 do not pop out from the first and second rotor cores 120 and 130.

If the application of three-phase power-supply voltage to the three-phase windings 113u, 113v and 113w is stopped, the rotating field is lost and the rotor 104 stops rotating. At this time, the rotor 104 stops at a rotation position where the magnetic flux flowing from the first magnetic pole portion 124 of the first rotor core 120 into the teeth 111 of the stator core 110 and the magnetic flux flowing from the teeth 111 of the stator core 110 into the second magnetic pole portion 134 of the second rotor core 130 are most stable.

At this stop position, a circumferentially intermediate position that intersects the center line L1 (center line L2) on the radially outer surface f1 (radially outer surface f2) of one of the first and second magnetic pole portions 124 and 134 faces a circumferentially intermediate position of a radial inner circumferential surfaces 111a of the opposed tooth 111.

FIG. 29 shows a case in which a circumferentially intermediate position that intersects the center line L1 on the radially outer surface f1 of the first magnetic pole portion 124 is located at a circumferentially intermediate position of the radially inner circumferential surface 111a of the faced tooth 111. At this time, in the brushless motor M, the number of magnetic poles of the rotor 104 is eight and the stator 102 has twelve slots. Therefore, the center line L2 on the radially outer surface f2 of the second magnetic pole portion 134 is located at an intermediate position of a tooth 111 and a tooth 111.

If the rotor 104 (rotation shaft 103) is rotated in this state, the radially outer surface f1 of the first magnetic pole portion 124 moves in the circumferential direction relative to the radial inner circumferential surfaces 111a of the faced tooth 111.

At this time, since the first and second auxiliary grooves 125 and 126 are formed in the radially outer surface f1 of the first magnetic pole portion 124, a cross-section shape of the radially outer surface f1 in the direction perpendicular to the axis does not become circular about the center axis O of the rotation shaft 103 as a whole. Further, since the first and second auxiliary grooves 135 and 136 are formed in the radially outer surface f2 of the second magnetic pole portion 134, a cross-sectional shape of the radially outer surface f2 in the direction perpendicular to the axis does not become circular about the center axis O of the rotation shaft 103 as a whole. Hence, changes in the magnetic flux caused by movement becomes significantly greater that a structure having a radially outer surface in which first and second claw-shaped magnetic pole portions form a circle about the center axis of the rotation shaft 103.

A holding force (detent torque) acting to return a magnetic flux into its stable state is opposed to a magnetic field. As a result, in the structure of the present embodiment, since the change in the magnetic field is significantly large, the holding force (detent torque) increases.

Further, the first auxiliary grooves 125 and 135 and the second auxiliary grooves 126 and 136 are formed at symmetric position relative to the center lines L1 and L2 serving as a symmetric axis. Therefore, the same holding force (detent torque) is generated in any rotation direction of the rotor 104 (rotation shaft 103).

An angle formed between the first auxiliary groove 125 (first straight line L1a) and the second auxiliary groove 126 (second straight line L1b) conforms to a cogging torque cycle $\phi$ (=15 degrees). In the same manner, the angle formed between the first auxiliary groove 135 (first straight line L2a) and the second auxiliary groove 136 (second straight line L2b) conforms to a cogging torque cycle $\phi$ (=15 degrees).

Figure 36:
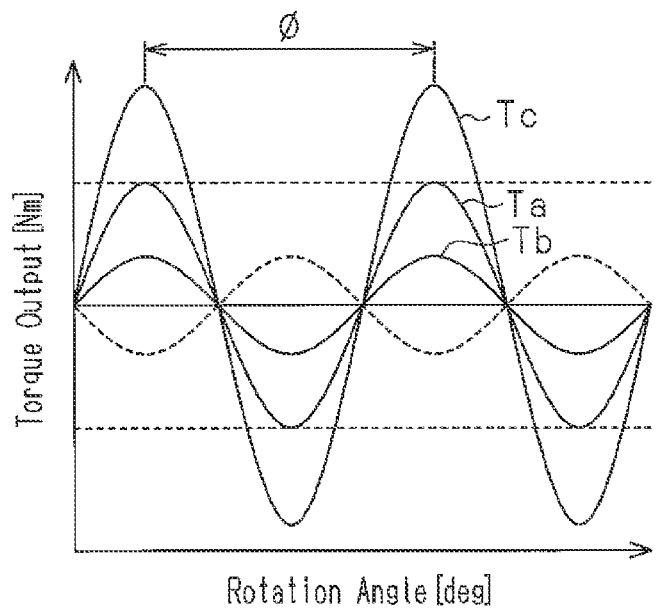
FIG. 36 shows the relationship of detent torques.

That is, as shown in FIG. 36, the original detent torque Ta prior to the formation of the first auxiliary grooves 125 and 135 and the second auxiliary grooves 126 and 136 has the same phase as the auxiliary groove detent torque Tb. Thus, the auxiliary groove detent torque Tb is superimposed on the detent torque Ta prior to groove formation and increased to obtain the total detent torque Tc shown in FIG. 36.

Next, a method for coupling the rotor cover 160 to the rotor 104 will be described.

First, when the first plate 161 is faced to the non-facing surface 121b of the first core base 121, the first engagement hooks 163 of the first plate 161 are fitted into the positioning engagement holes 127 in the first core base 121. At this time, outer surfaces of the second back surface auxiliary magnet 152 and the first and second interpolar magnets 153 and 154 at the side of the first core base 121 are covered with the first plate 161.

Since the first engagement hooks 163 are fitted into the positioning engagement holes 127, the first plate 161 is positioned so that it cannot move in the radial direction or the circumferential direction relative to the first core base 121. A surface of the first plate 161 and the non-facing surface 121b of the first core base 121 that face to each other are crimped to each other by fitting the first engagement hooks 163 into the positioning engagement holes 127.

Therefore, as long as a force greater than necessary is not applied, the first plate 161 cannot move in the axial direction, that is, the first plate 161 is not separated from the first core base 121.

Next, when the second plate 162 is faced to the non-facing surface 131b of the second core base 131, the second engagement hooks 165 of the second plate 162 are fitted into the positioning engagement holes 137 in the second core base 131. At this time, outer surfaces of the first back surface auxiliary magnet 151 and the first and second interpolar magnets 153 and 154 at the side of the second core base 131 are covered by the second plate 162.

In the same manner, by fitting the second engagement hooks 165 into the positioning engagement holes 137, the second plate 162 is positioned so that it cannot move in the radial direction or the circumferential direction relative to the second core base 131. Since a surface of the second plate 162 and the non-facing surface 131b of the second core base 131 which face to each other are crimped to each other by fitting the second engagement hooks 165 into the positioning engagement holes 137. Thus, as long as a force greater than necessary is not applied, the second plate 162 cannot move in the axial direction, that is, the second plate 162 is not separated from the second core base 131.

At this time, the eight fixing members 166 formed on the circumferential portion of the second plate 162 cover the entire radially outer surface of the corresponding first interpolar magnet 153 or second interpolar magnet 154, and distal ends of the fixing members 166 reach the engagement flange 164 of the first plate 161.

The swaging hooks 167 on the distal ends of the fixing members 166 are swaged to the engagement flange 164, and the swaging hooks 167 and the engagement flange 164 are swaged and fixed to each other. Thus, the first plate 161 and the second plate 162 are coupled and fixed to each other so that the rotor cover 160 is coupled to the rotor 104.

The advantages of the fifth embodiment in addition to above advantage (1) will now be described.

(14) In the fifth embodiment, the rotor cover 160 is coupled to the rotor 104. The fixing members 166 provided on the second plate 162 cover the radially outer surfaces of the first and second interpolar magnets 153 and 154. Therefore, since the fixing members 166 press down the radially outer surfaces of the first and second interpolar magnets 153 and 154, even if a centrifugal force caused by rotation of the rotor 104 is applied to the first and second interpolar magnets 153 and 154, the magnets 153 and 154 do not pop out of the first and second rotor cores 120 and 130.

Moreover, the two axial side surfaces of the rotor 104 are covered by the first plate 161 and the second plate 162 of the rotor cover 160. Hence, the first and second interpolar magnets 153 and 154 and the first and second back surface auxiliary magnets 151 and 152 do not break and fragments do not pop out in the axial direction.

(15) In the fifth embodiment, the first engagement hooks 163 of the first plate 161 are fitted into the positioning engagement holes 127 formed in the first core base 121, and the second engagement hooks 165 of the second plate 162 are fitted into the positioning engagement holes 137 formed in the second core base 131. Further, the rotor cover 160 may be coupled to the rotor 104 just by swaging and fixing the swaging hooks 167 on the distal ends of the fixing member 166 on and to the engagement flange 164 of the first plate 161. Therefore, the assembling time of the rotor 104 and, consequently, the brushless motor M may be shortened.

(16) In the fifth embodiment, by just fitting the second engagement hooks 165 into the positioning engagement holes 137 formed in the second core base 131, the second engagement hooks 165 and the fixing members 166 are opposed to the second plate 162 so that the fixing members 166 are located on the radially outer surfaces of the first and second interpolar magnets 153 and 154. Therefore, it becomes significantly easy to assemble the second plate 162 to the second core base 131, and the assembling time of the rotor 104 and, consequently, the brushless motor M may be further shortened.

The fifth embodiment may be modified as described below.

In the fifth embodiment, the present invention is embodied in the rotor 104 that includes the first auxiliary grooves 125, 135 and the second auxiliary grooves 126 and 136 formed in the radially outer surfaces f1 and f2 of the first and second magnetic pole portions 124 and 134. However, the present invention may be applied to the rotor 104 that does not includes the first auxiliary grooves 125 and 135 and the second auxiliary grooves 126 and 136 in the radially outer surfaces f1 and f2 of the first and second magnetic pole portions 124 and 134.

Figure 37:
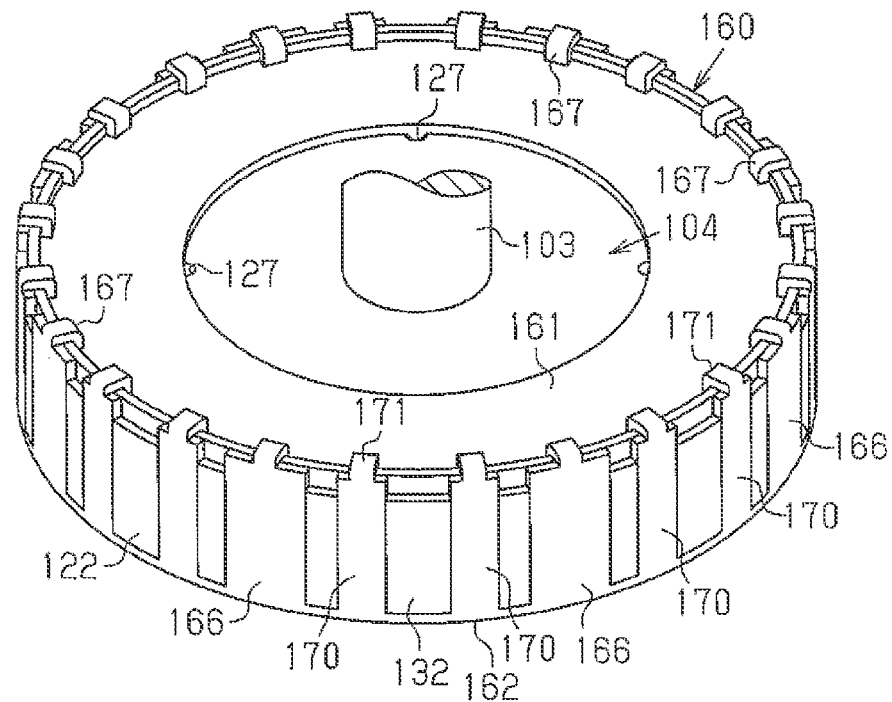
FIG. 37 is a perspective view showing another example of the fifth embodiment in which a rotor cover is attached to a rotor.
Figure 38:
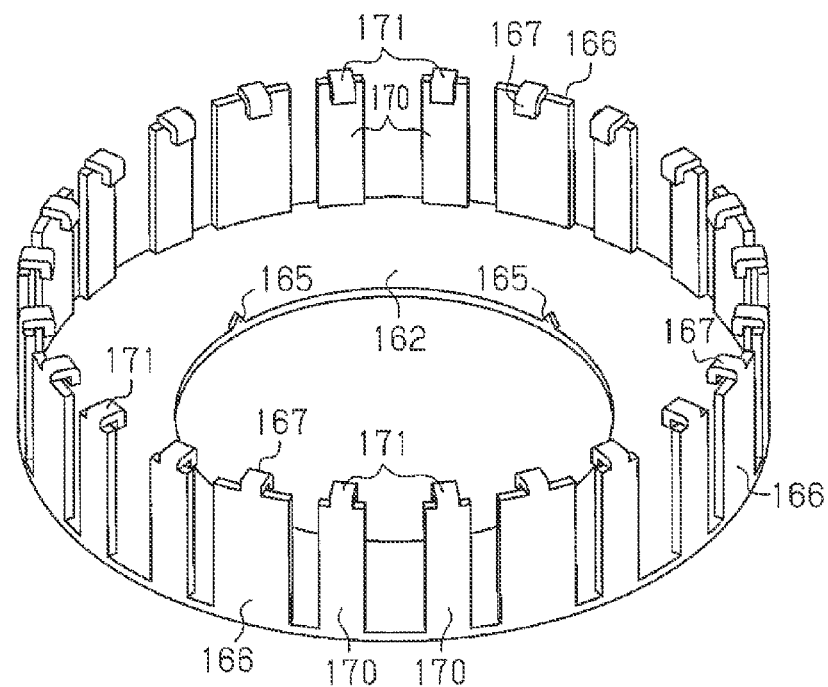
FIG. 38 is a perspective view of the rotor cover.

In the fifth embodiment, the rotor cover 160 includes the fixing members 166 that cover the radially outer surfaces of the first and second interpolar magnets 153 and 154. Instead, the second plate 162 may include a plurality of second fixing members 170, with two second fixing members 170 arranged between adjacent ones of the fixing members 166 as shown in FIGS. 37 and 38. The second fixing members 170 are fitted into the first auxiliary grooves 125 and 135 and the second auxiliary grooves 126 and 136 formed in the radially outer surfaces f1 and f2 of the first and second magnetic pole portions 124 and 134. Thus, the bottom surfaces 125a, 135a, 126a and 136a are covered. At this time, second swaging hooks (coupling hooks) 171 formed on distal ends of the second fixing members 170 are swaged and fixed to the engagement flange 164 of the first plate 161.

In this case, the first plate 161 and the second plate 162 are coupled and fixed to each other by the newly added second fixing members 170. Thus, a holding force (detent torque) may be generated, and a constant radial air gap may be held between the rotor 104 and the stator 102, while increasing the fixing strength of the rotor cover 160.

In the fifth embodiment, the rotor cover 160 is made of brass. However, it is only necessary that the rotor cover be made of non-magnetic material. For example, the rotor cover may be made of stainless steel or synthetic resin.

Figure 39:
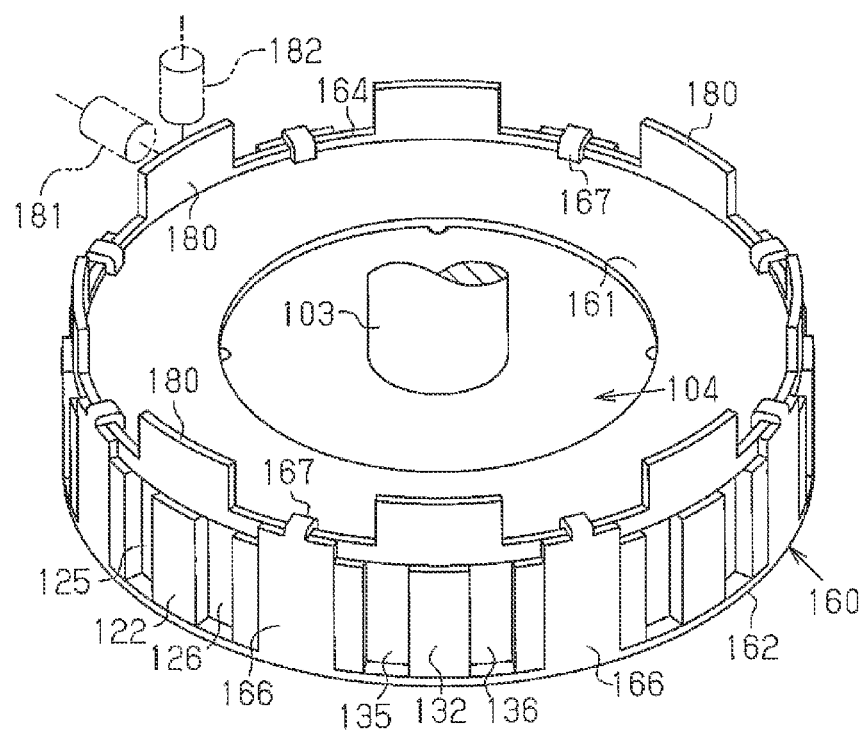
FIG. 39 is a perspective view showing another example of the fifth embodiment in which a rotor cover is attached to a rotor.
Figure 40:
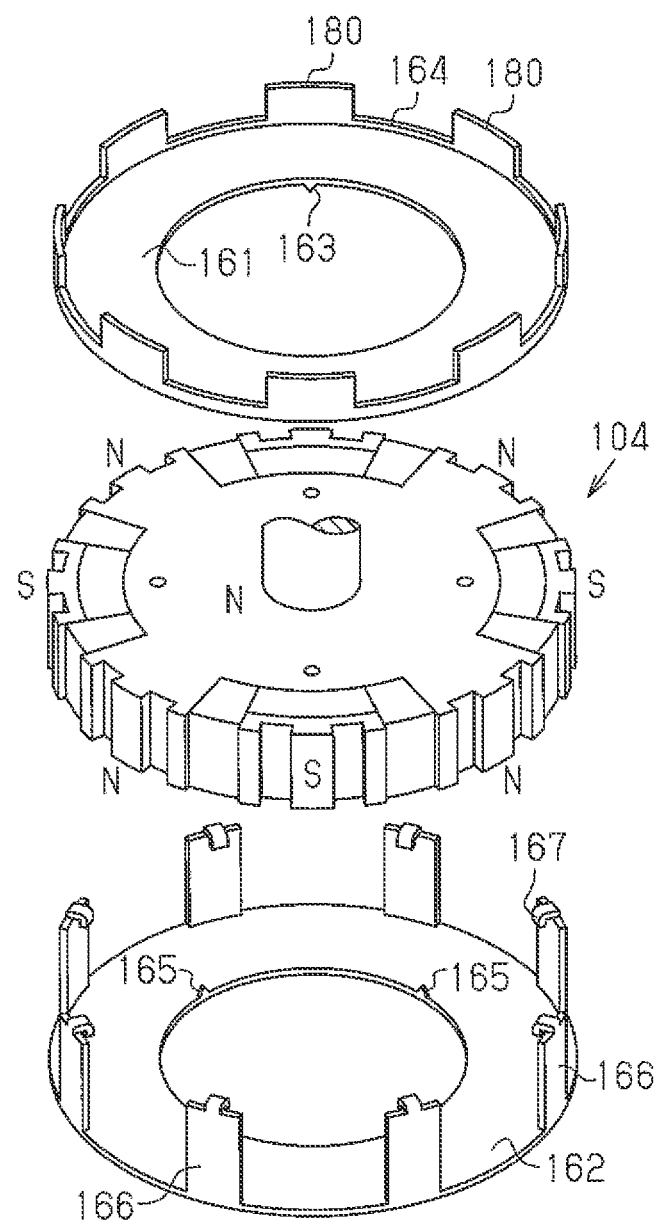
FIG. 40 is a perspective view of a first plate shown in FIG. 39.

In the fifth embodiment, the engagement flange 164 of the first plate 161 may be provided with a plurality of (eight in FIGS. 39 and 40) detected pieces 180 which are located at equal intervals in the circumferential direction and extend in the axial direction as shown in FIGS. 39 and 40. The detected pieces 180 are used to detect a rotation angle (rotation position) or the number of rotations of the rotor 104.

As shown by the double-dashed lines in FIG. 39, the motor housing 101 includes a photosensor 181, formed by a light emitting element and a light receiving element, or a magnetic sensor 182, formed by a hall IC. The photosensor 181 or the magnetic sensor 182 is faced to the detected piece 180 and separated by a certain distance. More specifically, the photosensor 181 is arranged to face to a radial outer circumferential surface of the detected piece 180. When using the magnetic sensor 182, the magnetic sensor 182 is faced to a distal end surface (axially outer surface) of the detected piece 180.

As the rotor 104 rotates, the photosensor 181 or the magnetic sensor 182 detects each of the detected pieces 180 that passes in front of the photosensor 181 or the magnetic sensor 182, and outputs a detection signal to a control circuit (not shown). The control circuit calculates the rotation angle (rotation position) of the rotor 104 based on the detection signal from the photosensor 181 or the magnetic sensor 182, and calculates the number of rotations.

When the magnetic sensor 182 detects the detected pieces 180, an iron material is used instead of non-magnetic material as the material of the first plate 161. In this case, since the first plate 161 is a thin plate, the amount of magnetic flux leakage is small.

Thus, the plurality of detected pieces 180 are formed integrally with the first plate 161 (rotor cover 160). That is, since the first plate 161 (rotor cover 160) also functions as a detected member used to detect the rotation angle and the number of rotations, it is possible to reduce the number of parts. Further, the detected pieces 180 may be processed at the same time as when punching and bending operations are performed on the first plate 161, and manufacturing of the detected member performed separately may be omitted. Further, a manufacturing step for coupling the detected member may be omitted.

Although the detected pieces 180 are formed on the first plate 161 in FIGS. 39 and 40, the detected pieces 180 may be formed on the second plate 162.

A sixth embodiment will now be described with reference to FIGS. 41 to 44. The feature of the sixth embodiment is in that the rotor cover 160 of the fifth embodiment includes a permanent magnet for detecting a rotation angle (rotation position) and the number of rotations of the rotor 104. The features of the sixth embodiment will be described in detail, and portions in common with the fifth embodiment will not be described for the sake of convenience.

Figure 41:
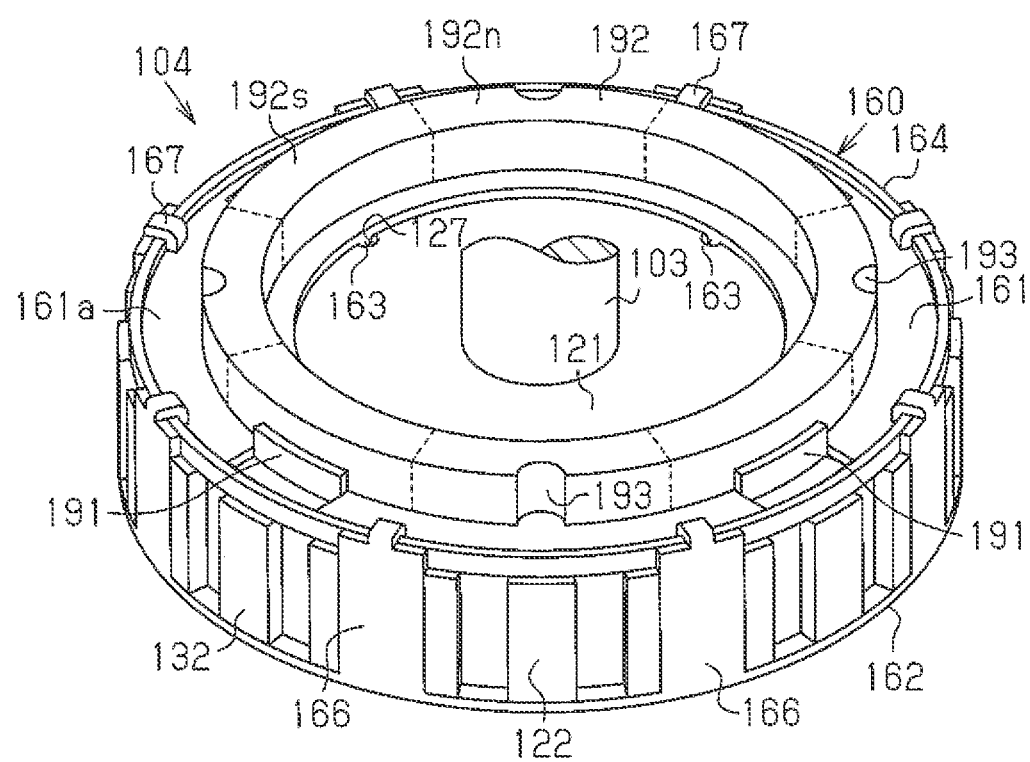
FIG. 41 is a perspective view of a rotor according to a sixth embodiment of the present disclosure to which a rotor cover is attached.
Figure 42:
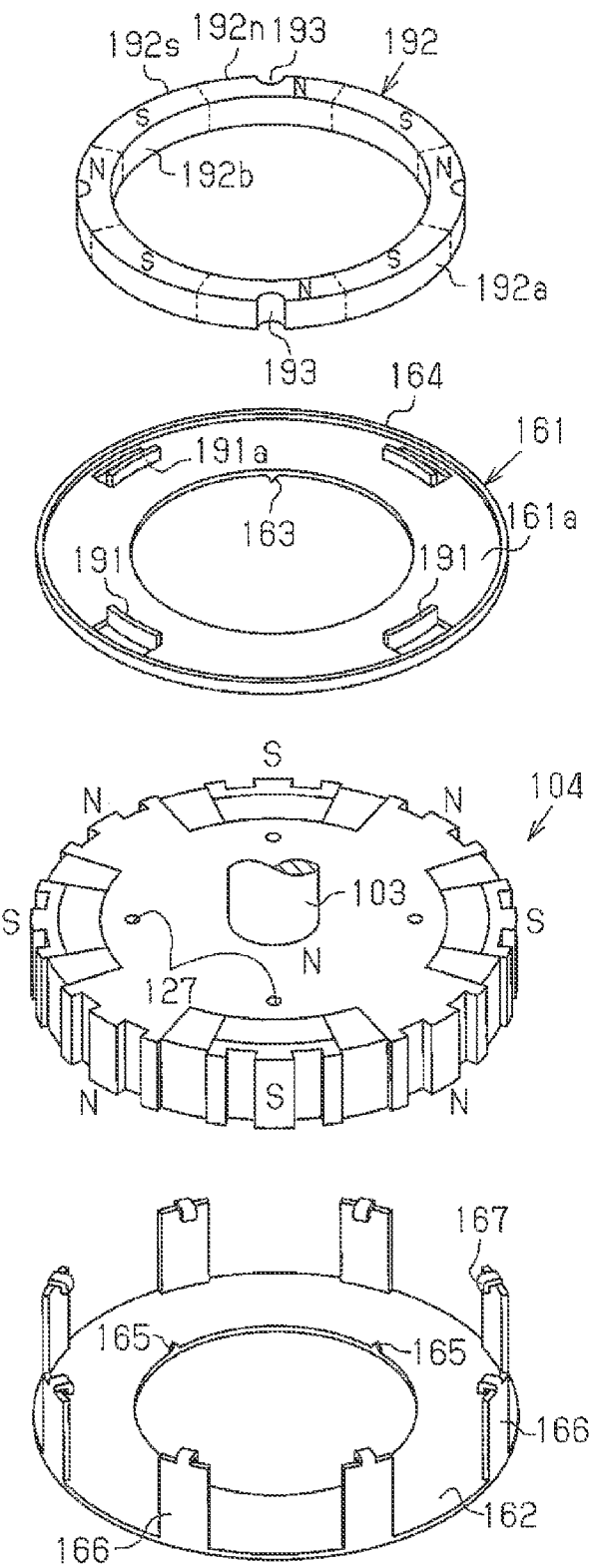
FIG. 42 is an exploded perspective view of the rotor cover shown in FIG. 41.

As shown in FIGS. 41 and 42, four fixed projecting pieces 191 are formed on an axially outer surface 161a of a first plate 161 at equal intervals. The fixed projecting pieces 191 extend in a direction opposite from a first rotor core 120. Each of the fixed projecting pieces 191 is formed by cutting and bending an axially outer surface 161a of a first plate 161 in a direction opposite from a first rotor core 120. A radially inner side surface 191a of each of the four fixed projecting pieces 191 is arcuate about the center axis O, and the radially inner side surfaces 191a have the same inner diameters.

Figure 43:
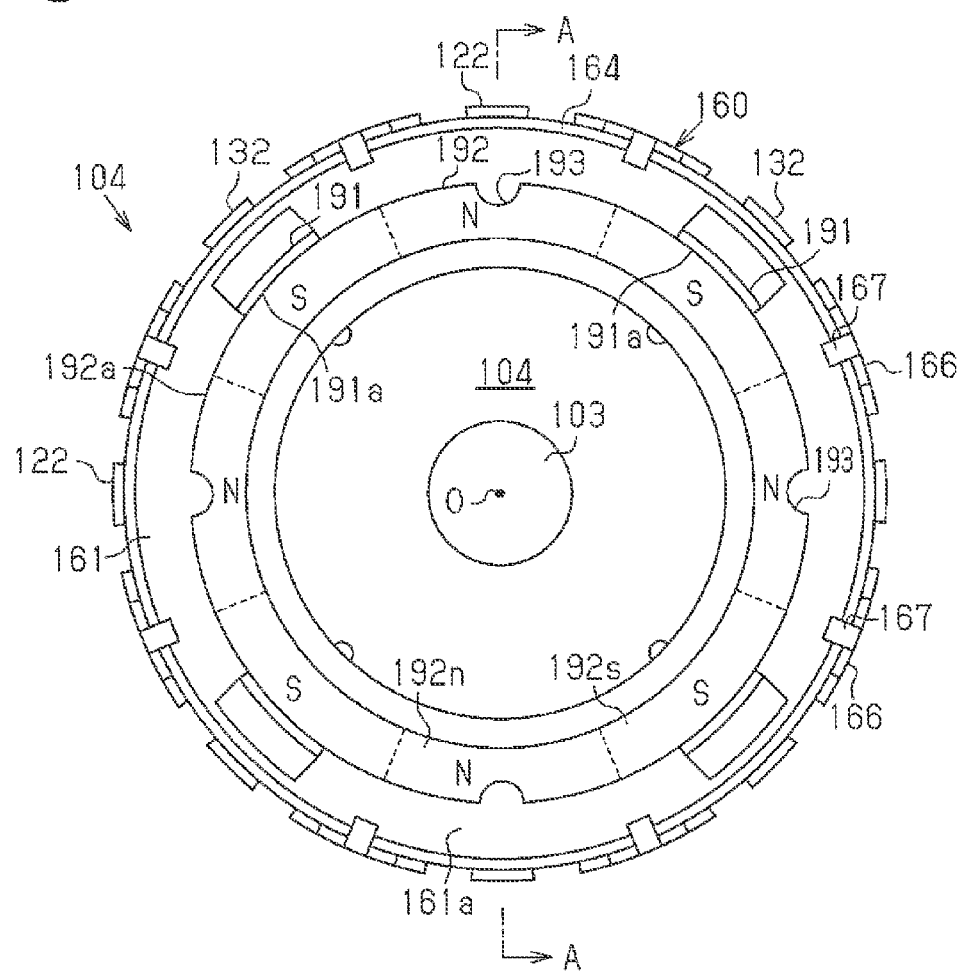
FIG. 43 is a front view of the rotor shown in FIG. 41 as viewed from the axial direction.
Figure 44:
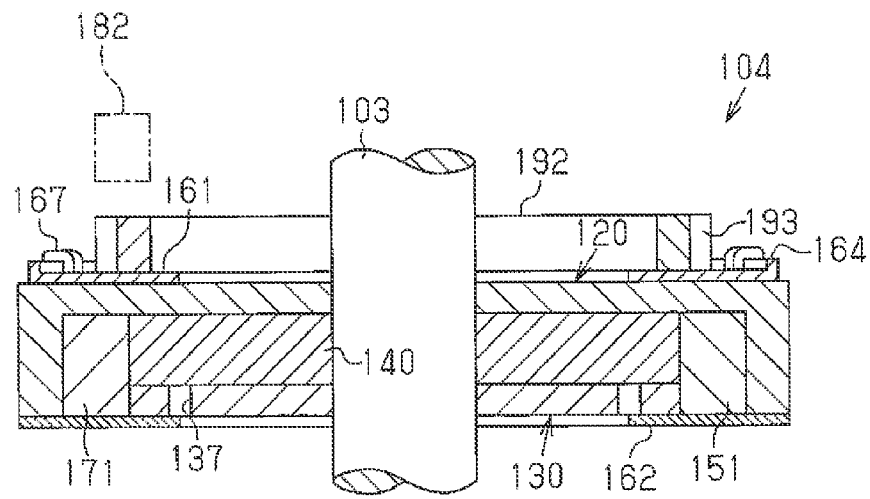
FIG. 44 is a cross-sectional view taken along line A-A in FIG. 43.

As shown in FIGS. 43 and 44, the four fixed projecting pieces 191 are formed at positions where they are superposed on a radially extending second claw-shaped magnetic pole portions 132, i.e., at positions where a second back surface auxiliary magnet 152 is not exposed from holes formed by cutting and bending the fixed projecting pieces 191.

As shown in FIG. 41, the axially outer surface 161a of the first plate 161 includes a ring-shaped sensor magnet 192. The sensor magnet 192 functions as a detected portion. As shown in FIG. 43, a radially outer surface 192a of the sensor magnet 192 is fitted into and fixed to the radially inner side surface 191a of each of the fixed projecting pieces 191. At this time, the sensor magnet 192 is fixed to the first plate 161 so that a center axis of the ring-like sensor magnet 192 is aligned with a center axis O of the rotation shaft 103.

As shown in FIG. 43, north poles and south poles are alternately magnetized in the sensor magnet 192 at equal angular distances in the circumferential direction. More specifically, at the side of the first rotor core 120 of the sensor magnet 192, the sensor magnet 192 is magnetized so that portions facing the first claw-shaped magnetic pole portions 122 in the axial direction are north poles, and portions of the sensor magnet 192 facing the second claw-shaped magnetic pole portions 132 in the axial direction are south poles. That is, at the side of the first rotor core 120 of the ring-shaped sensor magnet 192, north pole portions 192$n$ magnetized to north poles and south pole portions 192$s$ magnetized to south poles are magnetized so that the north pole portions 192$n$ and south pole portions 192$s$ correspond to magnetic poles of the first claw-shaped magnetic pole portions 122 and magnetic poles of the second claw-shaped magnetic pole portions 132.

Recesses 193 are formed at circumferentially center positions of the north pole portions 192$n$ in the radially outer surface 192$a$ of the sensor magnet 192. The recesses 193 function as marks indicative of the north pole portions 192$n$. In addition, when the sensor magnet 192 is held by a jig and fitted to the fixed projecting pieces 191, the recesses 193 are portions to which the jig is fitted. This facilitates the holding. The north pole of the sensor magnet 192 generates a slightly weak magnetic flux due to the recess 193. However, the sensor magnet 192 is located proximal to the first rotor core 120 that generates north poles in the rotor 104. Therefore, since the sensor magnet 192 receives influence of magnetic flux of the first rotor core 120, the strength of the magnetic flux is equalized.

The motor housing 101 includes a magnetic sensor 182 (see FIG. 44) including a hall IC so that the magnetic sensor 182 is faced to the sensor magnet 192 and separated by a certain distance in the axial direction. Thus, as the rotor 104 rotates, the north pole portions 192$n$ magnetized to north poles and the south pole portions 192$s$ magnetized to south poles alternately pass by the front of the magnetic sensor 182 in the sensor magnet 192.

The sixth embodiment has the following operation in addition to the operation of the fifth embodiment.

During rotation, the ring-shaped sensor magnet 192 fixed to the first plate 161 also rotates around the rotation shaft 103. As the sensor magnet 192 rotates, the magnetic sensor 182 detects that the north pole portions 192$n$ and the south pole portions 192$s$ of the sensor magnet 192 pass by alternatively. This obtains an accurate detection signal.

The magnetic sensor 182 outputs the detection signal to the control circuit (not shown). The control circuit calculates the rotation angle (rotation position) of the rotor 104 based on the detection signal from the magnetic sensor 182, and calculates the number of rotations. The control circuit controls operation of the brushless motor M using the calculated rotation angle (rotation position) and the number of rotations.

In addition to the advantages of the fifth embodiment, the sixth embodiment has the advantages described below.

(17) In the sixth embodiment, the axially outer surface 161$a$ of the first plate 161 includes the fixed projecting pieces 191. The sensor magnet 192, which detects the rotation angle and the number of rotations by the fixed projecting piece 191, is fixed to the first plate 161 (rotor cover 160).

Therefore, since the first plate 161 (rotor cover 160) also functions as a part that supports the sensor magnet 192, the number of parts may be reduced. The fixed projecting piece 191 may be processed at the same time as when punching and bending the first plate 161. Thus, there is no need to separately manufacture a coupling component for the sensor magnet 192. Further, a manufacturing step for coupling the sensor magnet 192 may be omitted, and the brushless motor M may be obtained at a low cost.

Further, since the sensor magnet 192 is fixed to the axially outer surface 161$a$ of the first plate 161, the in the axial direction may be shortened. This allows for the brushless motor M to be reduced in size.

(18) In the sixth embodiment, the sensor magnet 192 for detecting rotation is formed by the ring-shaped permanent magnet in which the north pole portions 192$n$ and the south pole portions 192$s$ are alternately magnetized in the circumferential direction. Therefore, the magnetic sensor 182 may continuously detect the alternate passage of the north pole portion 192$n$ and the south pole portion 192$s$ of the sensor magnet 192. This allows for the detection signal to be obtained with high accuracy.

(19) In the sixth embodiment, the four fixed projecting pieces 191 are formed by cutting and bending the axially outer surface 161$a$ of the first plate 161 to the side opposite to the first rotor core 120. The radially inner side surfaces 191$a$ of the four fixed projecting pieces 191 have the same inner diameters, and each of the fixed projecting pieces 191 has an arcuate surface of a circle about the center axis O. The sensor magnet 192 is fitted into and fixed to the radially inner side surfaces 191$a$ of the four fixed projecting pieces 191. Therefore, the ring-shaped sensor magnet 192 is accurately coupled.

The positions where the four fixed projecting pieces 191 are formed are set to positions superposing the radially extending second claw-shaped magnetic pole portions 132, that is, positions where the second back surface auxiliary magnet 30 152 is not exposed from the holes formed by cutting and bending the fixed projecting pieces 191. Therefore, there is no influence of magnetic flux leakage from the second back surface auxiliary magnet 152, and the magnetic sensor 182 may accurately detect the north pole portions 192$n$ and the south pole portions 192$s$ of the sensor magnet 192.

The sixth embodiment may be modified as described below.

In the sixth embodiment, the fixed projecting pieces 191 are provided on the first plate 161, and the sensor magnet 192 is fixed to the first plate 161. Alternatively, the fixed projecting pieces 191 may be provided on the second plate 162 and the sensor magnet 192 may be fixed to the second plate 162 in accordance with the specification of the brushless motor M.

In the sixth embodiment, the fixed projecting piece 191 is formed by cutting and bending the axially outer surface 161$a$ of the first plate 161 to the side opposite to the first rotor core 120.

Figure 45:
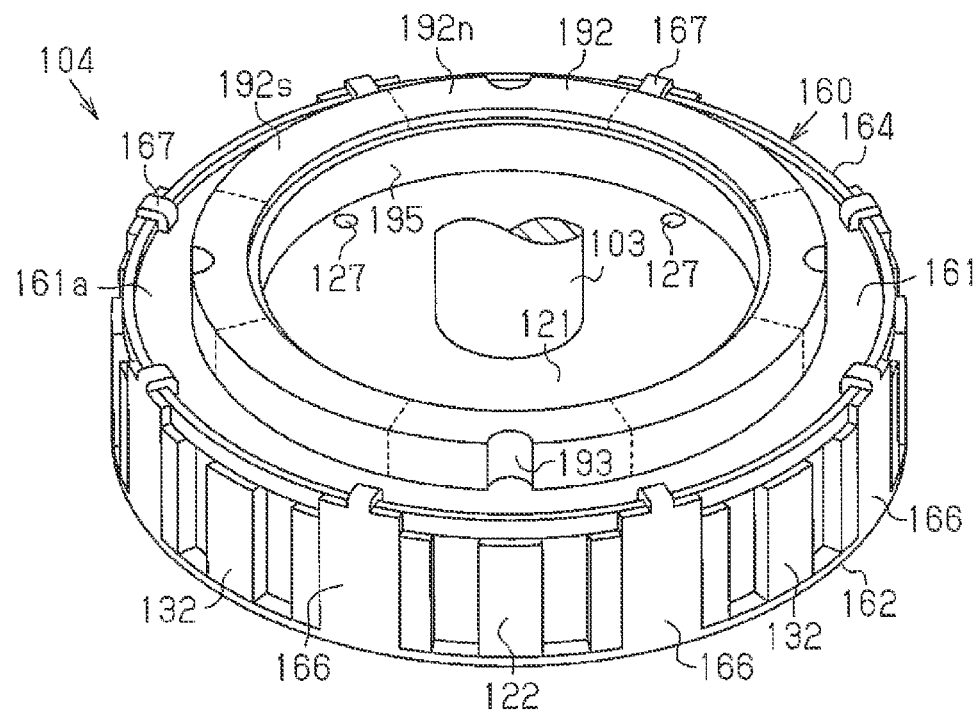
FIG. 45 shows another example of the sixth embodiment and is a perspective view of a rotor to which a rotor cover is attached.
Figure 46:
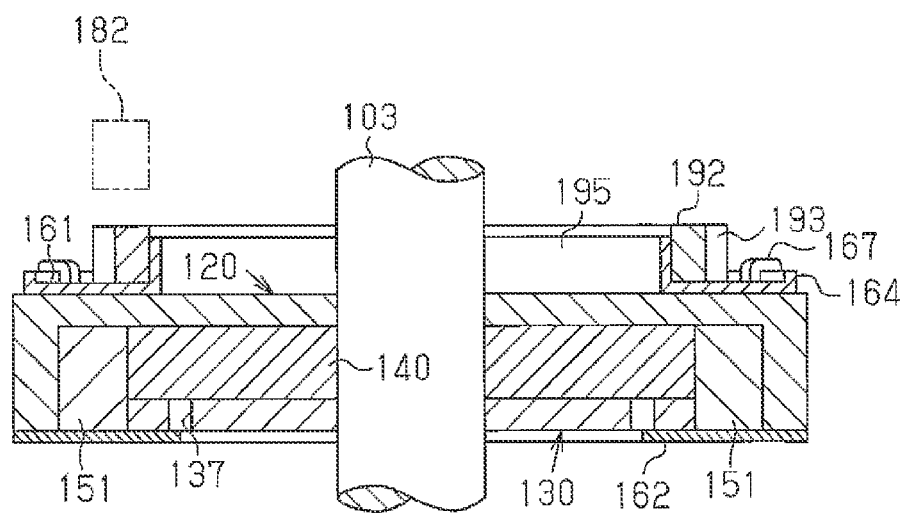
FIG. 46 is a cross-sectional view of the rotor shown in FIG. 45 as viewed from the radial direction.
Figure 47:
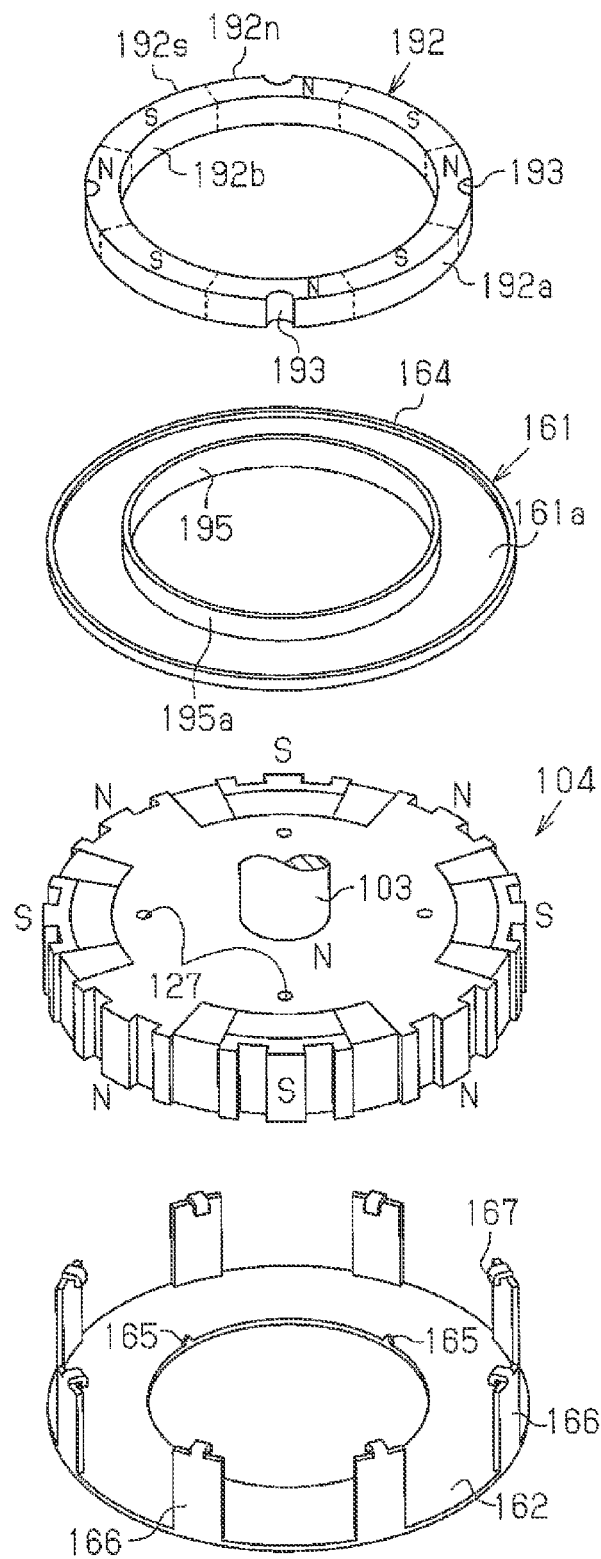
FIG. 47 is an exploded perspective view of the rotor cover shown in FIG. 45.

Instead, a fixed cylindrical wall 195 may be formed as shown in FIGS. 45 to 47. The fixed cylindrical wall 195 is formed by bending an inner circumferential edge of the first plate 161 toward the opposite side from the first rotor core 120. At this time, a radially outer surface 195$a$ of the fixed cylindrical wall 195 is an arcuate surface extending about the center axis O. An inner diameter (inner diameter of fixed cylindrical wall 195) of the first plate 161 after the fixed cylindrical wall 195 is formed is shorter than an outer diameter of an outer circumferential surface 121$c$ of the first core base 121. The sensor magnet 192 is fixed to the first plate 161 (rotor cover 160) by fitting and fixing a radially inner side surface 192$b$ of the sensor magnet 192 into and to the radially outer surface 195$a$ of the fixed cylindrical wall 195.

In this case, the fixed cylindrical wall 195, which supports and fixes the sensor magnet 192, has a rigid cylindrical shape. This ensures the coupling reliability of the sensor magnet 192 and allows for accurate coupling of the sensor magnet 192.

Further, an inner diameter (inner diameter of fixed cylindrical wall 195) of the first plate 161 is smaller than an outer diameter of the outer circumferential surface 121c of the first core base 121. Hence, the second back surface auxiliary magnet 152 and the first and second interpolar magnets 153 and 154 are not exposed from the first plate 161. As a result, the second back surface auxiliary magnet 152 and the first and second interpolar magnets 153 and 154 are not scattered.

In this case, since the fixed cylindrical wall 195 is formed on the first plate 161, the four first engagement hooks 163 formed on the inner circumferential edge of the first plate 161 are omitted. This differs from the fifth and sixth embodiments.

Obviously, the fixed cylindrical wall 195 may be arranged on the second plate 162. The second fixing members 170 may be arranged as shown in FIGS. 37 and 38. In this case, the second fixing members 170 are fit to the first auxiliary grooves 125 and 135 and the second auxiliary grooves 126 and 136 formed in the radially outer surfaces f1 and f2 of the first and second magnetic pole portions 124 and 134, and cover the bottom surfaces 125a, 135a, 126a and 136a.

A seventh embodiment of a brushless motor will now be described with reference to FIGS. 48 and 49.

Figure 48:
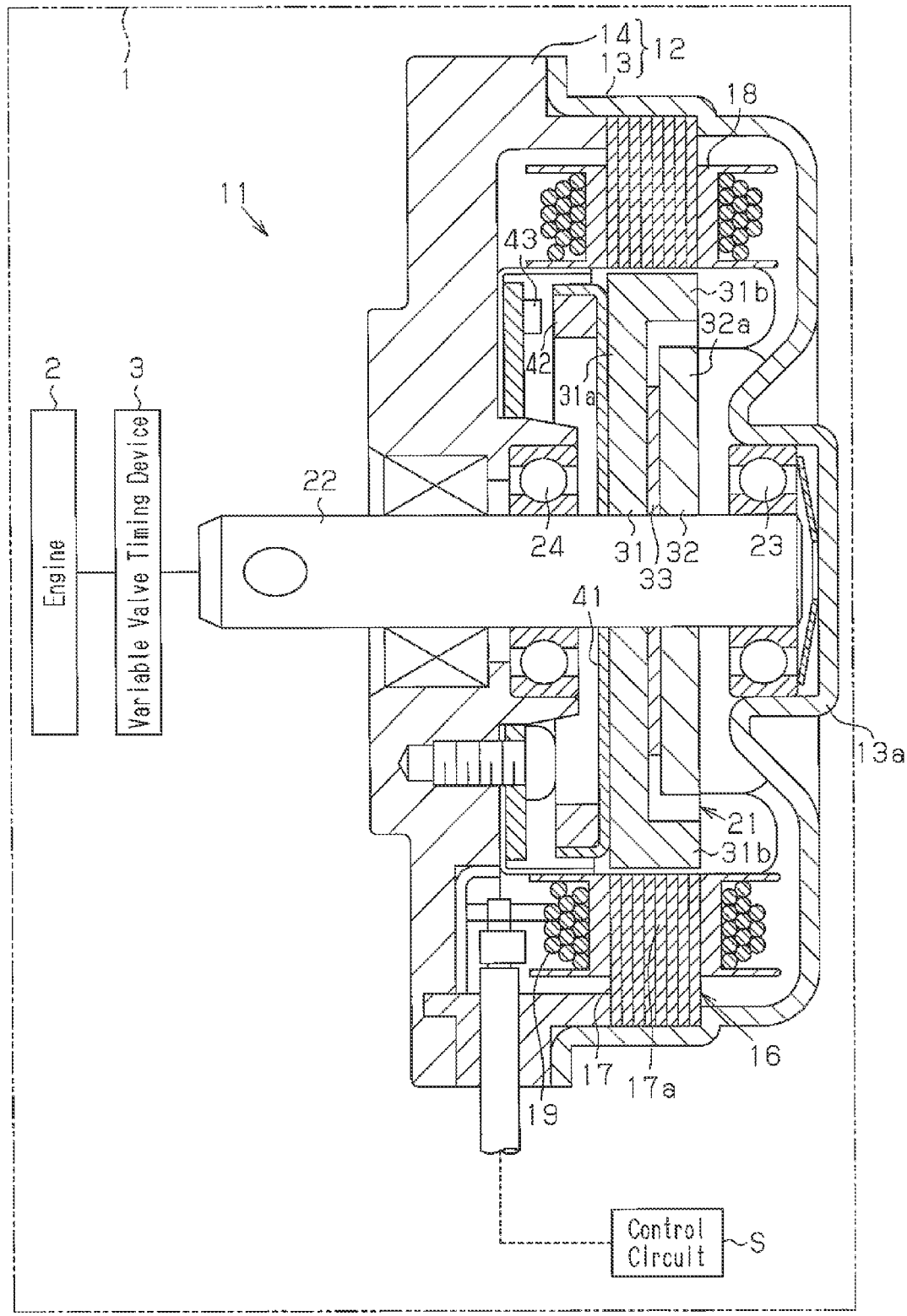
FIG. 48 is a cross-sectional view of a brushless motor according to a seventh embodiment of the present disclosure.
Figure 49:
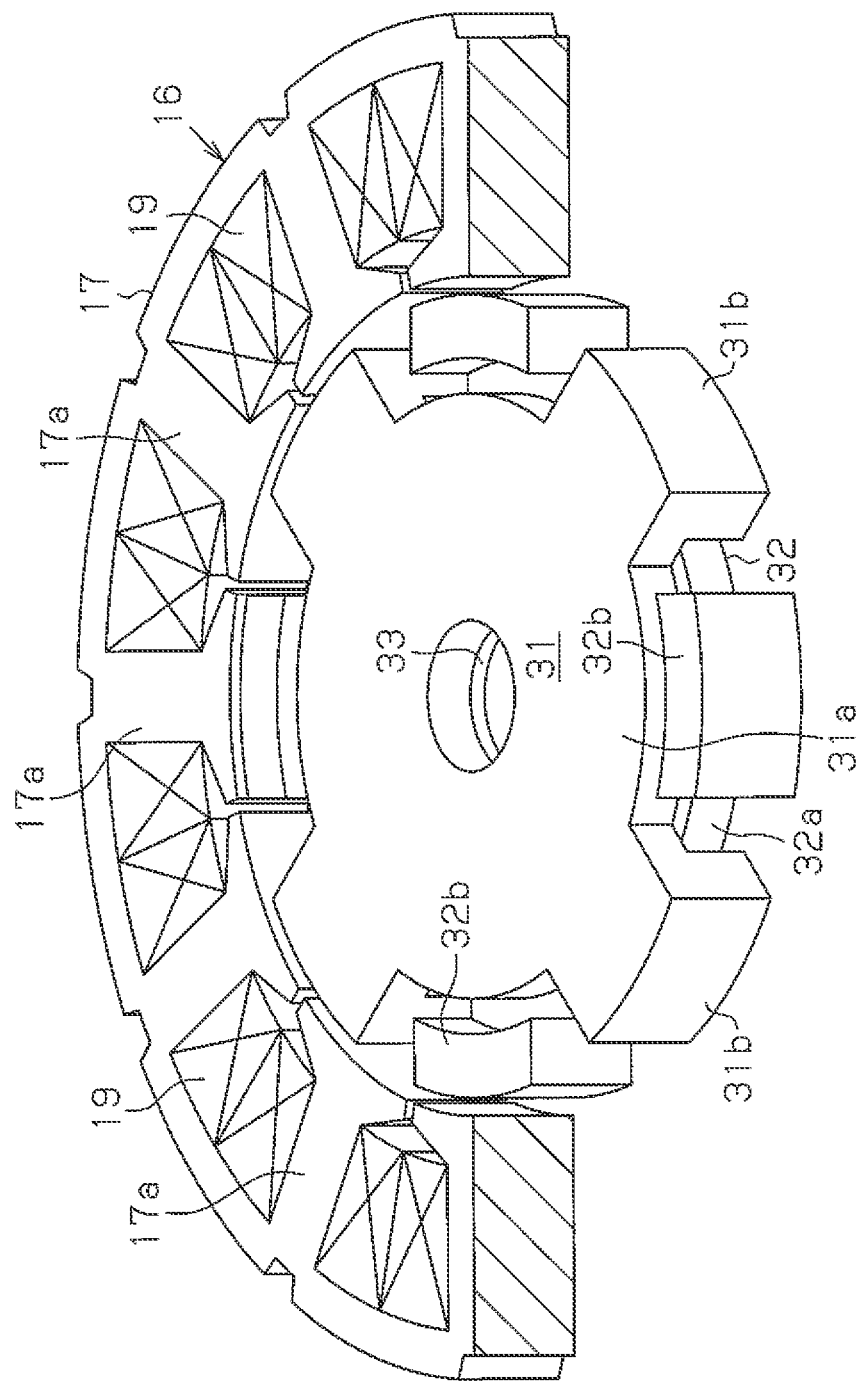
FIG. 49 is a partially cross-sectional perspective view of the brushless motor shown in FIG. 48.

As shown in FIG. 48, the brushless motor 11 of the present embodiment is for use with a position control device arranged in a vehicle engine room 1, more specifically, for a variable valve timing device 3 connected to an engine 2.

As shown in FIG. 48, the variable valve timing device 3 is connected to a distal end of a rotation shaft 22 projecting outward of the brushless motor 11. Valve timing (relative rotation phase of cam shaft with respect to crankshaft of engine 2) is appropriately varied in accordance with an operating state of the engine 2 by rotating and driving the rotation shaft 22.

As shown in FIG. 48, an annular magnet 33 of the seventh embodiment is a neodymium magnet and located radially inward from the outer circumferences of first and second core bases 31a and 32a. More specifically, the outer diameter of the annular magnet 33 is set to be smaller than that of the first and second core bases 31a and 32a.

In the seventh embodiment, the diameters of the coupled first and second core bases 31a and 32a and annular magnet 33 are four times or greater than their axial lengths. Specifically, the diameter is set to be 100 mm or less.

As shown in FIG. 48, a magnet fixing member 41 is fitted to a rotation shaft 22 at a side of a first rotor core 31 opposite to a second rotor core 32. A sensor magnet 42 serving as a detected member is fixed to a circumferential portion of the magnet fixing member 41. The sensor magnet 42 is formed so that north poles and south poles are alternately formed in the circumferential direction (rotation direction) at predetermined angle intervals. In the front end plate 14, a hall IC 43 is arranged at a position facing the sensor magnet 42 in the axial direction. If the hall IC 43 detects the sensor magnet 42, the rotation position of the rotor 21 can be detected.

Next, the operation of the brushless motor 11 having the above-described structure will be described.

For example, when control is executed to change the valve timing in accordance with the driving state when the vehicle is driven, three phase drive current is supplied from the control circuit S to the windings 19 thereby generating a rotating field. This rotates and drives the rotor 21, and the variable valve timing device 3 varies the valve timing (rotation phase of cam shaft relative to crankshaft of engine 2).

The advantages of the seventh embodiment in addition to above advantage (1) will now be described.

(20) The variable valve timing device 3 located in a vehicular engine room 1 has the brushless motor 11. The annular magnet 33 of the rotor 21 in the brushless motor 11 is located between the first rotor core 31 and the second rotor core 32 in the axial direction. The annular magnet 33 is less likely to be affected by external environments. Thus, even when the temperature in the vehicle engine room 1 becomes high, the annular magnet 33 is less likely to be demagnetized (irreversible temperature variation). This allows for stable position control, that is, the varying of the valve timing.

(21) The first and second claw-shaped magnetic pole portions 31b and 32b serving as the first and second magnetic pole portions project radially outward from the outer circumferences of the substantially disk-shaped first and second core bases 31a and 32a, and extend in the axial direction to cover a radially outer surface of the annular magnet 33. Hence, the annular magnet 33 is further less likely to be affected by external environments. Therefore, even when the temperature in the vehicle engine room 1 becomes high, the annular magnet 33 is further less likely to be demagnetized (irreversible temperature variation).

(22) The annular magnet 33 is located further radially inward from the outer circumferences of the disk-shaped first and second core bases 31a and 32a of the first and second rotor cores 31 and 32. Hence, the annular magnet 33 is further less likely to be affected by external environments. Therefore, even if the temperature in the vehicle engine room 1 becomes high, and the annular magnet 33 is further less likely to be demagnetized (irreversible temperature variation).

(23) The number of poles of the rotor 21 is set to 2×n (wherein, n is a natural number), and the number of teeth 17a of the stator 16 is set to 3×n. Hence, a lowest common multiple becomes small, more first and second claw-shaped magnetic pole portions 31b and 32b and more teeth 17a can be faced to each other, and detent torque can be increased. Hence, it is possible to limit rotation of the rotor 21 caused by vibration in the vehicle engine room 1 when the motor is not driven.

The seventh embodiment may be modified as described below.

Although the annular magnet 33 is located radially inward from the outer circumferences of the disk-shaped first and second core bases 31a and 32a of the first and second rotor cores 31 and 32 in the seventh embodiment, this structure may be changed.

Figure 50A:
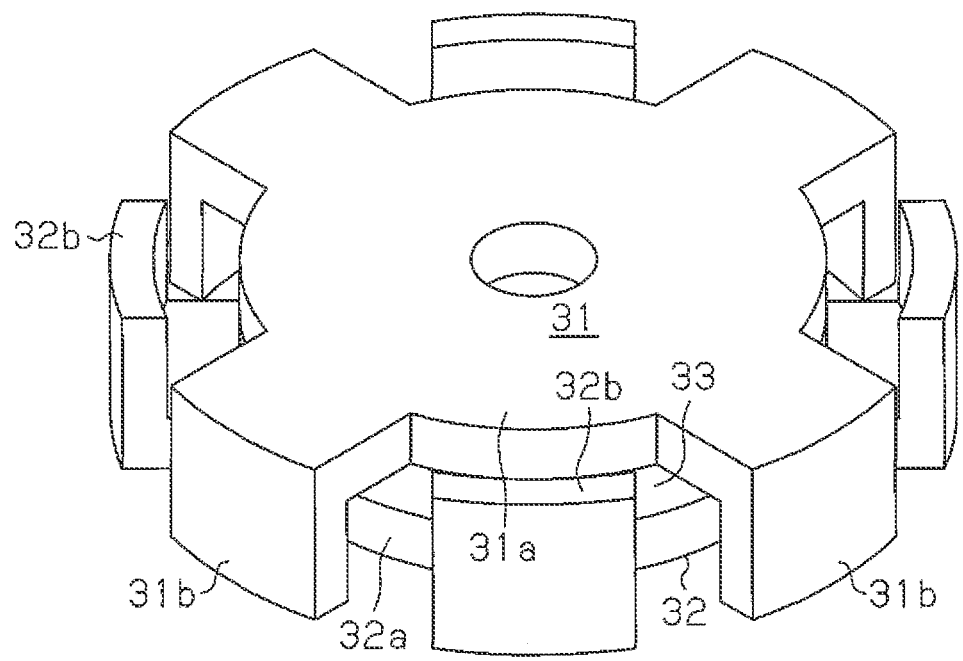
FIG. 50A is a perspective view of a rotor in another example of the seventh embodiment.
Figure 50B:
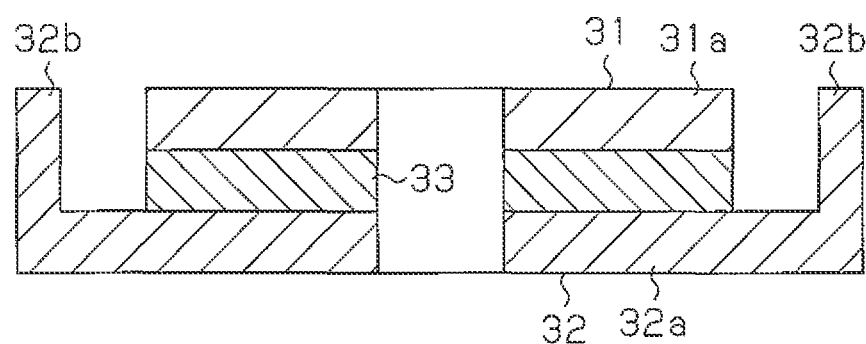
FIG. 50B is a cross-sectional view of the rotor shown in FIG. 50A.

For example, the outer diameter of the annular magnet 33 may be the same as the first and second core bases 31a and 32a as shown in FIGS. 50A and 50B. In this example (see FIGS. 50A and 50B), the thickness and the like of the members are also changed.

In the rotor 21 of the seventh embodiment, only the annular magnet 33 is a permanent magnet. However, the rotor may include other permanent magnets.

Figure 51A:
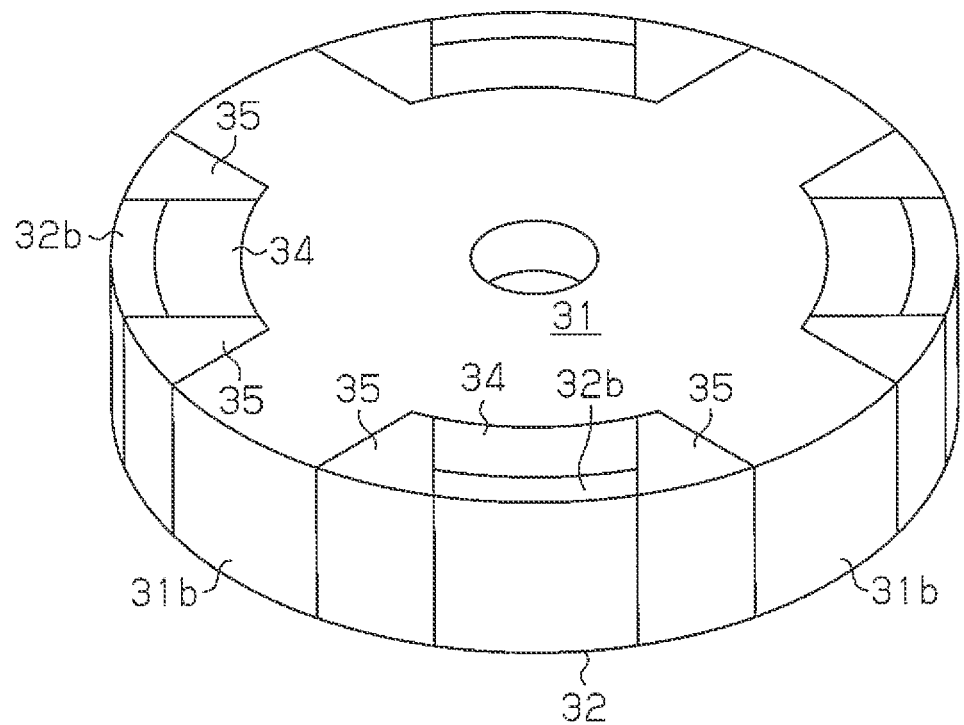
FIG. 51A is a perspective view of a rotor in another example of the seventh embodiment.
Figure 51B:
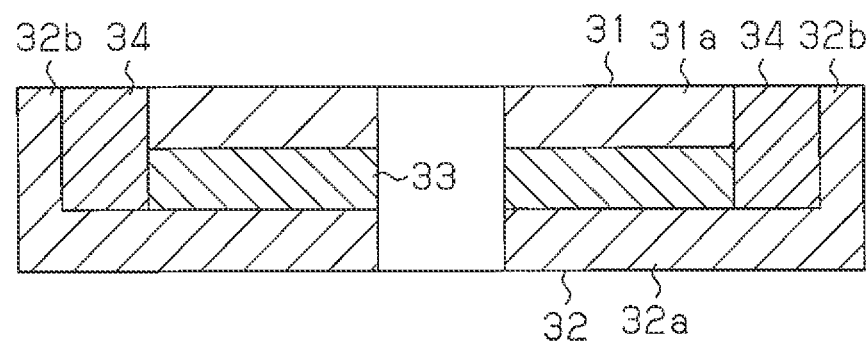
FIG. 51B is a cross-sectional view of the rotor shown in FIG. 51A.

For example, as shown in FIGS. 51A and 51B, back surface auxiliary magnets 34 which are magnetized in the radial direction may be added to back surfaces (radially inner side surface) of the first and second claw-shaped magnetic pole portions 31b and 32b in the above example (see FIGS. 50A and 50B). Alternatively, interpolar magnets 35 magnetized in the circumferential direction may be added between the first claw-shaped magnetic pole portion 31*b* and the second claw-shaped magnetic pole portion 32*b* in the circumferential direction.

In the seventh embodiment, the first magnetic pole portions and the second magnetic pole portions are the first and second claw-shaped magnetic pole portions 31*b* and 32*b*. However, the first magnetic pole portions and the second magnetic pole portions may be changed to magnetic pole portions having other shapes.

Figure 52A:
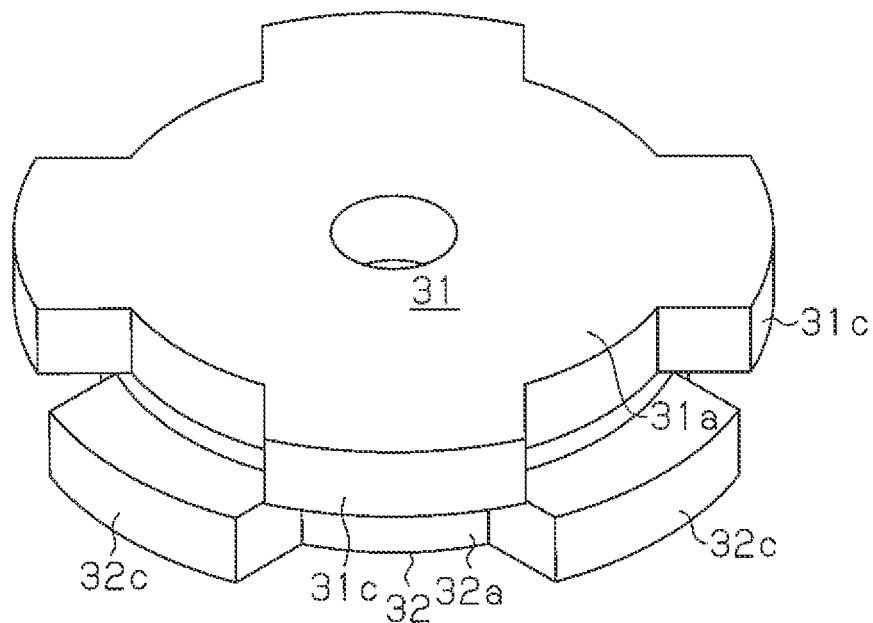
FIG. 52A is a perspective view of a rotor in another example of the seventh embodiment.
Figure 52B:
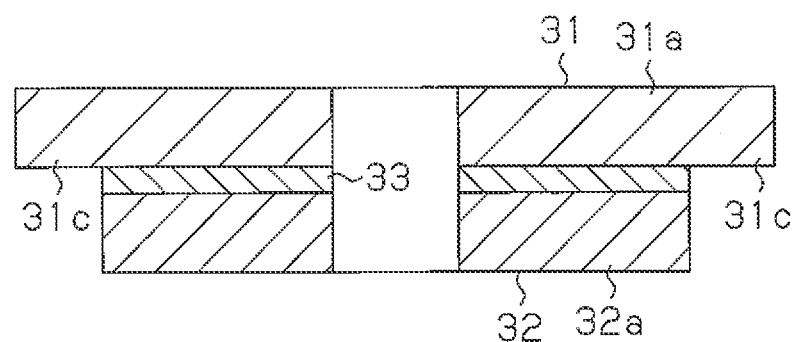
FIG. 52B is a cross-sectional view of the rotor shown in FIG. 52A.

For example, as shown in FIGS. 52A and 52B, the first magnetic pole portions and the second magnetic pole portions may be first and second projecting magnetic pole portions 31*c* and 32*c* that project radially outward from the outer circumferences of the first and second core bases 31*a* and 32*a* (magnetic pole portions 31*c* and 32*c* do not extend in axial direction).

Cross-sectional shapes of the first and second claw-shaped magnetic pole portions 31*b* and 32*b* (first magnetic pole portions and second magnetic pole portions) in a direction perpendicular to the axis of the radially outer surface in the seventh embodiment do not have to extend along circles about the center axis of the rotation shaft 22 of the rotor 21.

Figure 53:
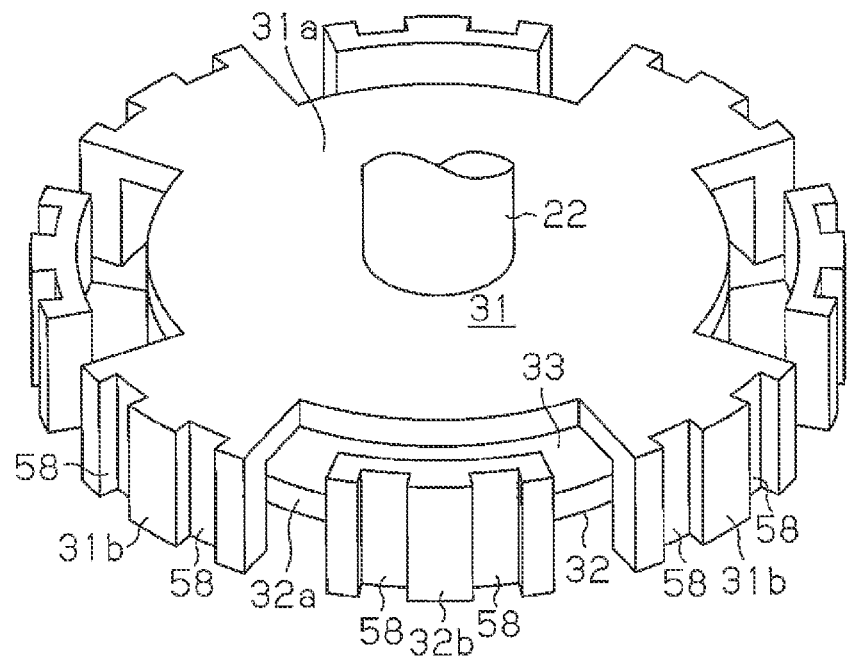
FIG. 53 is a perspective view of a rotor in another example of the seventh embodiment.

For example, the cross cross-sectional shapes may be changed as shown in FIG. 53. In this example, the radially outer surfaces of the first and second claw-shaped magnetic pole portions 31*b* and 32*b* have arcuate surfaces about the center axis of the rotation shaft 22, and the radially outer surfaces have two auxiliary grooves 58 which recessed from the arcuate surfaces. In this example, the radially outer surfaces have the auxiliary grooves 58. However, the radially outer surfaces may be formed so that the surfaces are not entirely circular.

In this structure, the distances between the stator 16 (teeth 17*a*) and the surfaces of the first and second claw-shaped magnetic pole portions 31*b* and 32*b* acting to rotate are varied. As the distance varies, the magnetic field varies greatly and produces a load during rotation that increases the detent torque. Hence, when the motor is not driven, rotation of the rotor 21 caused by vibration in the vehicle engine room 1 is limited.

In the seventh embodiment, the first and second core bases 31*a* and 32*a* are fixed to the annular magnet 33 through adhesive and coupled to the annular magnet 33. Instead, the first and second core bases 31*a* and 32*a* may be coupled through other structures.

Figure 54:
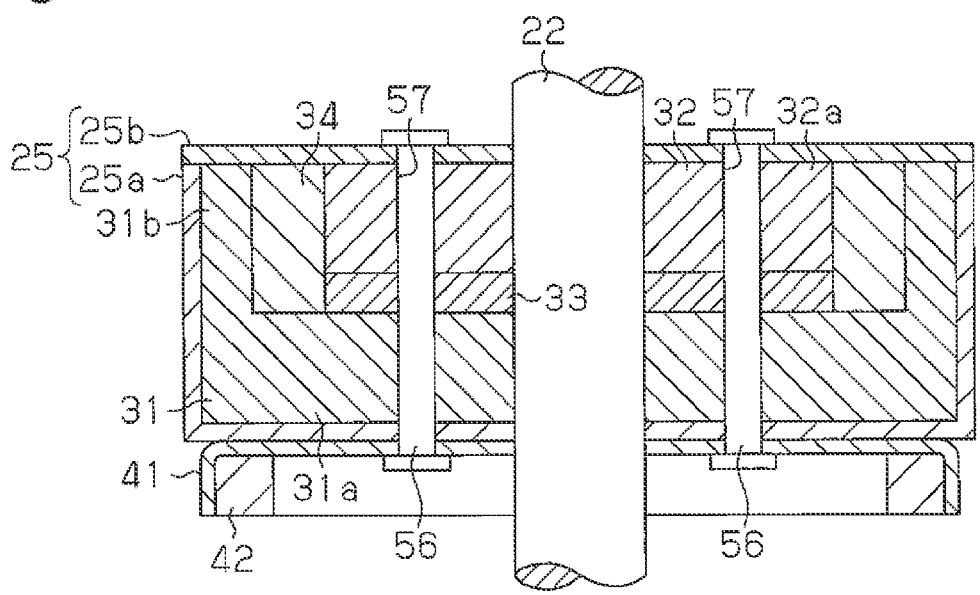
FIG. 54 is a cross-sectional view of a rotor in another example of the seventh embodiment.

As shown in FIG. 54 for example, the first rotor core 31 and the second rotor core 32 may be fastened and fixed to each other by rivets 56 serving as fastening members. More specifically, in this example, a plurality of through holes 57 are formed in the first and second rotor cores 31 and 32, the annular magnet 33, a rotor case 25 accommodating these members, and the magnet fixing member 41 at positions overlapping the rotor in the axial direction. The through holes 57 in this example are formed concentrically with a circle about the rotation shaft 22 at predetermined intervals (90° intervals in the circumferential direction in the present embodiment). The rivets 56 are inserted through the through holes 57. Then, the ends of the rivets 56 are swaged to fasten the first and second rotor cores 31 and 32, the annular magnet 33, and the rotor case 25 accommodating these members. The rotor case 25 in this example includes a cylindrical housing 25*a*, which has a closed end, and a lid 25*b*, which closes the open end of the cylindrical housing 25*a*. Obviously, the rotor case 25 may be omitted. The rivets 56 in this example are made of non-magnetic material. The rivets 56 may be replaced by other fastening members such as bolts and nuts.

Thus, the first and second core bases 31*a* and 32*a* are rigidly fixed as compared with when they are fixed using adhesive, and even if the temperature in the vehicle engine room 1 becomes high, the adhered portions are not separated.

Although the number of poles of the rotor 21 is set to "eight", and the number of the teeth 17*a* of the stator 16 is set to "twelve" in the seventh embodiment, the numbers may be changed. For example, the number of poles of the rotor 21 may be set to "four", and the number of the teeth 17*a* of the stator 16 may be set to "six". Alternatively, the number of poles of the rotor 21 may be set to "six", and the number of the teeth 17*a* of the stator 16 may be set to "nine". Further, either one of the following conditions does not have to be satisfied, namely, the condition in which the number of poles of the rotor 21 is set to 2×n (wherein, n is a natural number), and the condition in which the number of teeth 17*a* of the stator 16 is set to 3×n.

In the seventh embodiment, the present invention is embodied in the brushless motor 11 for the variable valve timing device 3. However, the present invention may be embodied in a brushless motor for other position control apparatuses (e.g., throttle valve control apparatus) located in the vehicle engine room 1.

The invention claimed is:

1. A rotor comprising:
    a first rotor core including a substantially disk-shaped first core base and a plurality of first claw-shaped magnetic pole portions arranged in a circumferential portion of the first core base at equal intervals, wherein each of the first claw-shaped magnetic pole portions project radially outward and extend in an axial direction;
    a second rotor core including a substantially disk-shaped second core base and a plurality of second claw-shaped magnetic pole portions arranged in a circumferential portion of the second core base at equal intervals, wherein each of the second claw-shaped magnetic pole portions project radially outward and extend in the axial direction, the first and second core bases face to each other, and the first and second claw-shaped magnetic pole portions are alternately arranged in a circumferential direction;
    a field magnet arranged between the first and second core bases in the axial direction, wherein the field magnet is magnetized in the axial direction so that the first claw-shaped magnetic pole portions function as first magnetic poles and the second claw-shaped magnetic pole portions function as second magnetic poles; and
    a detected portion that generates magnetic flux for detecting rotation positions of the first rotor core and the second rotor core, wherein
    each of the first rotor core and the second rotor core includes an inner axial end surface, which faces the field magnet in the axial direction, and an outer axial end surface, which is located at an opposite side of the inner axial end surface,
    the detected portion is arranged at the outer axial end surface of the first rotor core,
    the detected portion is an annular sensor magnet located at a position deviated from the first and second rotor cores in the axial direction, the sensor magnet includes a first sensor magnet portion, which faces the first and second claw-shaped magnetic pole portions in the axial direction, and a second sensor magnet portion, which is located at an opposite side of the first sensor magnet portion in the axial direction, and the sensor magnet is formed so that magnetized directions in the axial direction differ alternately in the circumferential direction, and the sensor magnet has an inner diameter that is larger than outer diameters of the first and second core bases, the first sensor magnet portion includes a plurality of first magnetic pole portions and a plurality of second magnetic pole portions alternately arranged in the circumferential direction, the first magnetic pole portions and the second magnetic pole portions have different magnetic poles, and the magnetic poles of the first magnetic pole portions and the magnetic poles of the second magnetic pole portions are respectively same as the magnetic poles of the first and second claw-shaped magnetic pole portions that face the first magnetic pole portions and the second magnetic pole portions.

2. The rotor according to claim 1, wherein the magnetized directions in the axial direction differ at equal angular intervals in the circumferential direction, and each of the first and second magnetic pole portions includes a circumferential center aligned with a circumferential center of each of the first and second claw-shaped magnetic pole portions.

3. A brushless motor comprising:
the rotor according to claim 1,
a stator that generates a rotating field, and
a magnetic sensor facing the second sensor magnet portion of the sensor magnet in the axial direction.

4. The rotor according to claim 1, wherein
the sensor magnet is located at an opposite side of the second core base relative to the first core base in the axial direction, the first magnetic pole portion has the same magnetic pole as that at a portion of the field magnet proximal to the sensor magnet, and the second magnetic pole portion has the same magnetic pole as that at a portion of the field magnet distal from the sensor magnet, and an angle of the first magnetic pole portion in the circumferential direction is set to be smaller than an angle of the second magnetic pole portion in the circumferential direction.

5. The rotor according to claim 4, wherein each of the first and second magnetic pole portions includes a circumferential center aligned with a circumferential center of the one of the claw-shaped magnetic pole portion having the same magnetic pole.

6. A brushless motor comprising:
the rotor according to claim 4,
a stator that generates a rotating field, and
a magnetic sensor facing the sensor magnet in the axial direction.

7. The brushless motor according to claim 6, wherein angles of the first and second magnetic pole portions in the circumferential direction are set so that a level of a detection signal detected by the magnetic sensor is switched at equal pitches.

8. The rotor according to claim 1, wherein
the sensor magnet is located at an opposite side of the second core base relative to the first core base in the axial direction,
the sensor magnet includes an annular core member and a plurality of permanent magnets, the core member includes a plurality of iron core portions arranged in the circumferential direction, the permanent magnets are arranged on the core member and have first magnetic poles, the permanent magnets having the first magnetic poles are arranged between adjacent ones of the iron core portions so that the iron core portions function as second magnetic poles, and the first magnetic poles and the second magnetic poles are alternately arranged on the sensor magnet.

9. The rotor according to claim 8, wherein each of the permanent magnets includes a first permanent magnet portion facing the first core base, the field magnet includes a first field magnet portion facing the permanent magnet, and the first permanent magnet portion has the same magnetic pole as that of the first field magnet portion.

10. The rotor according to claim 9, wherein an angle of the iron core portion in the circumferential direction is set to be smaller than an angle of the permanent magnet in the circumferential direction.

11. The rotor according to claim 8, wherein each of the permanent magnets and the iron core portions includes a circumferential center aligned with circumferential centers of the first and second claw-shaped magnetic pole portions.

12. A brushless motor comprising:
the rotor according to claim 8,
a stator that generates a rotating field, and
a magnetic sensor facing the sensor magnet in the axial direction.

13. The brushless motor according to claim 12, wherein angles of the iron core portions and the permanent magnets in the circumferential direction are set so that a level of a detection signal detected by the magnetic sensor is switched at equal pitches.

14. A brushless motor comprising:
the rotor according to claim 1;
a stator that generates a rotating field, wherein the stator is arranged radially outward from the rotor so as to face the rotor, and
a magnetic sensor fixed to the stator, wherein the magnetic sensor detects a rotation position of the rotor,
wherein the magnetic sensor is located at a position facing the rotor in the axial direction and aligned with the first and second claw-shaped magnetic pole portions in the radial direction.

15. The brushless motor according to claim 14, wherein a surface facing the magnetic sensor on at least either one of the first and second claw-shaped magnetic pole portions includes a projection projected in the axial direction.

16. The brushless motor according to claim 15, wherein the projection is formed integrally with at least either one of the first and second claw-shaped magnetic pole portions.

17. The brushless motor according to claim 15, wherein the projection is one of projections formed on portions of the first and second claw-shaped magnetic pole portions that extend in the axial direction.

18. The brushless motor according to claim 17, wherein a height of the projections of the first claw-shaped magnetic pole portions differs from a height of the projections of the second claw-shaped magnetic pole portion so that magnetic flux density of a magnetic flux passing through the magnetic sensor is switched in a substantially uniform manner.

19. The rotor according to claim 1, further comprising two plates arranged on axially outer surfaces of the first and second rotor cores, wherein the sensor magnet arranged on the axially outer surface of either one of the plates.

* * * * *